United States Patent [19]

Bissett et al.

[11] Patent Number: 5,185,877
[45] Date of Patent: Feb. 9, 1993

[54] PROTOCOL FOR TRANSFER OF DMA DATA

[75] Inventors: Thomas D. Bissett, Derry, N.H.; William Bruckert, Northboro, Mass.; Ajai Thirumalai, Marlboro, Mass.; Jay Amirmokri, Lowell, Mass.

[73] Assignee: Digital Equipment Corporation, Maynard, Mass.

[21] Appl. No.: 388,327

[22] Filed: Aug. 1, 1989

Related U.S. Application Data

[63] Continuation-in-part of Ser. No. 93,539, Sep. 4, 1987, Pat. No. 4,916,704.

[51] Int. Cl.[5] ............... G06F 13/28; G06F 13/42
[52] U.S. Cl. .................... 395/425; 395/325; 364/DIG. 1; 364/268.4; 364/240.5; 364/240.7; 364/242.31; 364/242.33
[58] Field of Search ... 364/200 MS File, 900 MS File, 364/DIG. 1, DIG. 2; 395/425, 325

[56] References Cited

U.S. PATENT DOCUMENTS

| | | |
|---|---|---|
| 3,665,173 | 5/1972 | Bouricius et al. |
| 3,761,884 | 9/1973 | Avsan et al. |
| 3,864,670 | 2/1975 | Inoue et al. |
| 3,873,819 | 3/1975 | Greenwald |
| 3,898,621 | 8/1975 | Zelinski et al. |
| 3,961,270 | 6/1976 | Ullman et al. |
| 4,012,717 | 3/1977 | Censier |
| 4,030,074 | 6/1977 | Giorcelli |
| 4,031,372 | 6/1977 | Davis |
| 4,075,691 | 2/1978 | Davis et al. ............ 364/200 |
| 4,099,234 | 7/1978 | Woods et al. |
| 4,099,241 | 7/1978 | Ossfeldt |
| 4,141,066 | 2/1979 | Keiles |
| 4,153,318 | 5/1979 | Bishop et al. |
| 4,196,470 | 4/1980 | Berg |
| 4,200,226 | 4/1980 | Piras |
| 4,228,496 | 10/1980 | Katzman et al. |
| 4,245,344 | 1/1981 | Richter |
| 4,251,873 | 2/1981 | Joby |
| 4,253,147 | 2/1981 | Macdougall et al. |
| 4,268,902 | 5/1981 | Berglund et al. |
| 4,270,168 | 5/1981 | Murphy et al. |
| 4,271,466 | 6/1981 | Yamamoto et al. ......... 364/200 |
| 4,271,518 | 6/1981 | Birzele et al. |
| 4,298,928 | 11/1981 | Etoh et al. |
| 4,313,160 | 1/1982 | Kaufman et al. .......... 364/260 |
| 4,350,255 | 9/1982 | Sakata et al. |
| 4,356,546 | 10/1982 | Whiteside et al. |
| 4,358,823 | 11/1982 | McDonald et al. |
| 4,365,293 | 12/1982 | Holtz |
| 4,371,754 | 2/1983 | De et al. |
| 4,377,843 | 3/1983 | Garringer et al. |
| 4,388,683 | 6/1983 | Beifuss et al. |
| 4,400,792 | 8/1983 | Strelow |

(List continued on next page.)

FOREIGN PATENT DOCUMENTS

| | | |
|---|---|---|
| 0077154 | 4/1983 | European Pat. Off. |
| 0120384 | 10/1984 | European Pat. Off. |
| 0306211 | 3/1989 | European Pat. Off. |
| 0306244 | 3/1989 | European Pat. Off. |
| 0306348 | 3/1989 | European Pat. Off. |

(List continued on next page.)

OTHER PUBLICATIONS

M. Euringer et al., "Fault-Tolerant and Fail-Safe Process Control with Redundant Automation Systems," Siemens Power Engineering & Automation VIII, No. 6, Nov./Dec. 1986, pp. 408–410.

(List continued on next page.)

Primary Examiner—David L. Clark
Assistant Examiner—Matthew C. Fagen
Attorney, Agent, or Firm—Denis Maloney; Barry Young; Ronald Myrick

[57] ABSTRACT

A process for transferring data via DMA between a system resource and a controller via switching logic. During a setup write transaction, the switching logic is set up to enable DMA data to be transferred between a particular system memory and a selected system resource. The setup write transaction also is used to initialize the DMA byte counter. During a subsequent write transaction, DMA pointer registers are initialized with appropriate starting addresses. The controller then transmits a DMA start code and the system resource responds by transmitting an acknowledge code. At that time, DMA data is transmitted between the controller and the system resource via the switching logic.

31 Claims, 34 Drawing Sheets

U.S. PATENT DOCUMENTS

| | | |
|---|---|---|
| 4,403,282 | 9/1983 | Holberger et al. ............... 364/200 |
| 4,418,343 | 11/1983 | Ryan et al. ...................... 340/723 |
| 4,424,565 | 1/1984 | Larson ............................ 364/200 |
| 4,428,044 | 1/1984 | Liron .............................. 364/200 |
| 4,453,215 | 6/1984 | Reid . |
| 4,455,620 | 6/1984 | Watanabe et al. ............... 364/900 |
| 4,467,447 | 8/1984 | Takahashi et al. .............. 364/900 |
| 4,481,572 | 11/1984 | Ochsner .......................... 364/200 |
| 4,486,826 | 12/1984 | Wolff et al. . |
| 4,495,571 | 1/1985 | Staplin, Jr. et al. ............. 364/200 |
| 4,502,117 | 2/1985 | Kihara ............................ 364/200 |
| 4,541,094 | 9/1985 | Stiffler . |
| 4,569,017 | 2/1986 | Renner et al. . |
| 4,589,066 | 5/1986 | Lam et al. . |
| 4,597,084 | 6/1986 | Dynneson et al. . |
| 4,602,327 | 7/1986 | Laviolette et al. .............. 364/200 |
| 4,610,013 | 9/1986 | Long . |
| 4,627,055 | 12/1986 | Mori et al. . |
| 4,631,671 | 12/1986 | Kawashita et al. .............. 364/200 |
| 4,654,857 | 3/1987 | Samson et al. . |
| 4,688,166 | 8/1987 | Schneider ....................... 364/200 |
| 4,692,862 | 9/1987 | Cousin et al. ................... 364/200 |
| 4,700,292 | 10/1987 | Campanini . |
| 4,751,702 | 6/1988 | Beier et al. . |
| 4,780,809 | 10/1988 | Woffinden et al. .............. 364/200 |
| 4,821,170 | 4/1989 | Bernick et al. .................. 364/200 |
| 4,837,677 | 6/1989 | Burrus, Jr. et al. ............. 364/200 |
| 4,847,750 | 7/1989 | Daniel ............................ 364/200 |
| 4,907,228 | 3/1990 | Bruckert et al. ................ 364/900 |
| 4,916,704 | 4/1990 | Bruckert et al. . |
| 4,920,479 | 4/1990 | Hashiguchi . |
| 5,001,624 | 3/1991 | Hoffman et al. ................ 364/200 |

FOREIGN PATENT DOCUMENTS

| | | |
|---|---|---|
| 0315303 | 5/1989 | European Pat. Off. . |
| 3328405 | 2/1985 | Fed. Rep. of Germany . |
| 1200155 | 7/1970 | United Kingdom . |
| WO81/00925 | 4/1981 | World Int. Prop. O. . |

OTHER PUBLICATIONS

"Continuous Processing System Performs Error Checks in Hardware to Eliminate Complex Software," 8167 Computer Design, vol. 21, No. 1, Jan. 1982, pp. 40 and 42.

G. Fazio et al., "A Fault-Tolerant Microcomputer with Fail-Safe Outputs," 8205 Microprocessing & Microprogramming, vol. 12, No. 5, Dec. 1983, pp. 279-284.

T. Krol, "The '(4,2) Concept' Fault-Tolerant Computer," Philips Technical Review, vol. 41, No. 1, 1983/84, pp. 1-11.

W. Eue et al., "SIMIS-C—Die Kompaktversion des Sicheren Mikrocomputersystems SIMIS," 8190 Signal & Draht, vol. 79, No. 4, Apr. 1987, pp. 81-85.

Sequoia Technical Overview Mar. 1985.

Sequoia Hardware Architecture (1984).

Bernstein, Sequoia, Wang Institute of Graduate Studies (date unknown).

"How Technology is Cutting Fault-Tolerance Costs," Electronics 55-58 (Jan. 13, 1986).

Katsuki, et al., "Pluribus-An Operational Fault-Tolerant Multiprocessor," Proceedings of the IEEE vol. 66, No. 10 (Oct. 1978).

Rennels, "Architectures for Fault-Tolerant Spacecraft Computers," Proceedings of the IEEE, vol. 66, No. 10, pp. 1255-1268 (Oct. 1978).

Parallel 300 (1984).

Inselberg, "Multiprocessor Architecture Ensures Fault-Tolerant Transaction Processing," Many MicroSystems (Apr. 1983).

Anita Borg, "Targon/Nixdorf".

Losq, "A Highly Efficient Redundancy Scheme: Self-Purging Redundancy," IEEE Transactions on Computers, vol. C-25, No. 6 (Jun. 1976).

Su, et al., "A Hardware Redundancy Reconfiguration Scheme for Tolerating Multiple Module Failures," IEEE Transactions on Computers, vol. C-29, No. 3, (Mar. 1980).

Takaoka, et al., "N-Fail-Safe Logical Systems," IEEE Transactions on Computers, vol. C-20, No. 5, pp. 536-542 (May 1971).

"System/88 Technical Overview".

Tandem NonStop Computers, Datapro Research Corporation, Computers M11-822-101 to M11-822-119 (Oct. 1986).

Bartlett, "The Tandem Concept of Fault-Tolerance," (view 1985).

Bernstein, "Sequoia: A Fault-Tolerant Tightly-Coupled Computer for Transaction Processing," Technical Report TR-85-03, pp. 1-43 (May 2, 1985).

Datapro Research Corporation Feature Report (Dec. 1985) M07-100-318 to M07-100-323.

The Evolution of Fault-Tolerant Computing, Proceedings of the 1-day symposium on the Evolution of Fault-Tolerant Computing, Ed. by A. Avizienis, H. Kopetz, and J. Laprie (Jun. 30, 1986).

IBM System/88—The Operating System Reference—Jul. 1985.

Harrison, "S/88 Architecture and Design," S/88 Internals, Share 67 (Aug. 12, 1986).

Chester, "Fault-Tolerant Computers Mature," Systems & Software, pp. 117-129 (Mar. 1985).

Depledge, et al., "Fault-Tolerant Microcomputer Systems for Aircraft," IEEE Conference Proceedings 36, 1977, Proc. Conf. on Computer Systems & Technology Engineering, pp. 205-220 (Mar. 1977).

Beck, et al., "Implementation Issues in Clock Synchronization," Mar. 15, 1986 Draft.

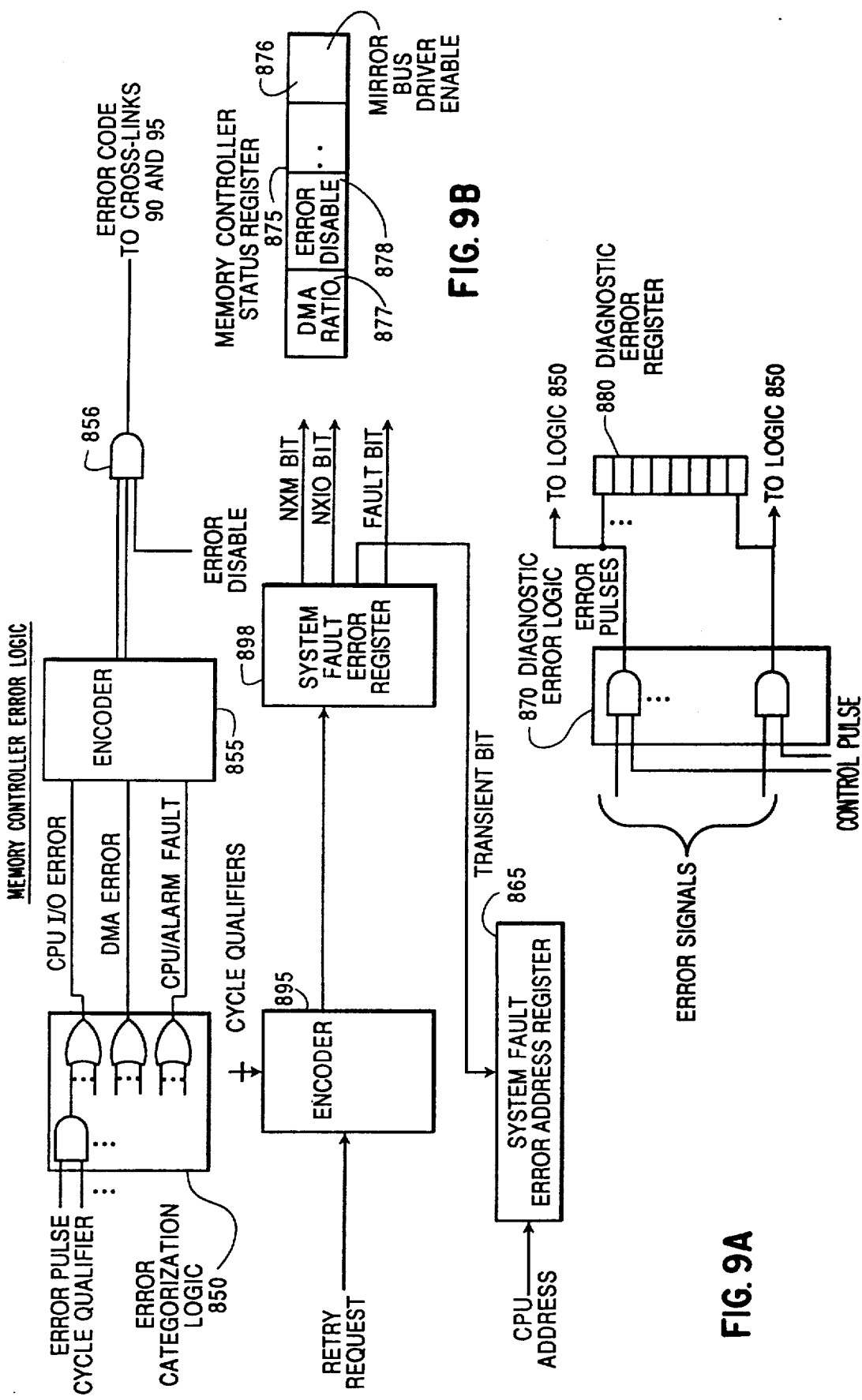

FIG. 13A

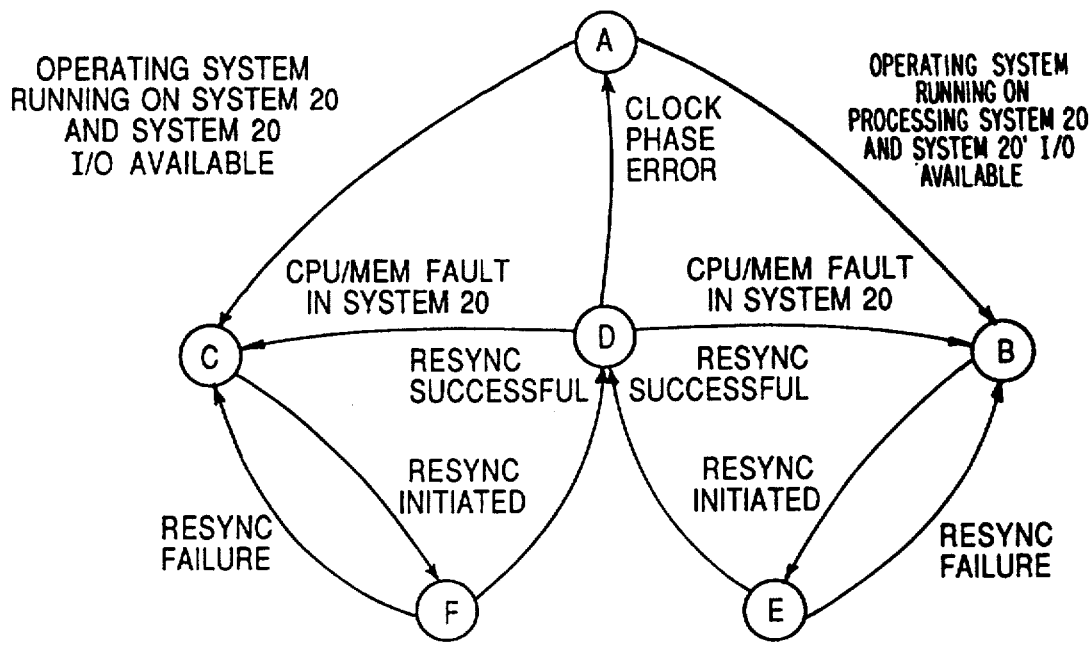

FIG. 13B

| STATE | PROCESSING SYSTEM 20 | PROCESSING SYSTEM 20' | DESCRIPTION |
|---|---|---|---|
| A | OFF | OFF | TWO INDEPENDENT ZONES |
| B | MASTER | SLAVE | PROCESSING SYSTEM 20 HAS OPERATING SYSTEM AND SYSTEM 20' IS OFF-LINE (I/O IS WITH SYSTEM 20) |
| C | SLAVE | MASTER | PROCESSING SYSTEM 20' HAS OPERATING SYSTEM AND SYSTEM 20 IS OFF-LINE (I/O IS WITH SYSTEM 20') |
| D | FULL DUPLEX | FULL DUPLEX | LOCK STEP SYNCHRONIZATION |
| E | RESYNC MASTER | RESYNC SLAVE | PROCESSING SYSTEM 20 IS IN CHARGE OF RESYNC |
| F | RESYNC SLAVE | RESYNC MASTER | PROCESSING SYSTEM 20' IS IN CHARGE OF RESYNC |

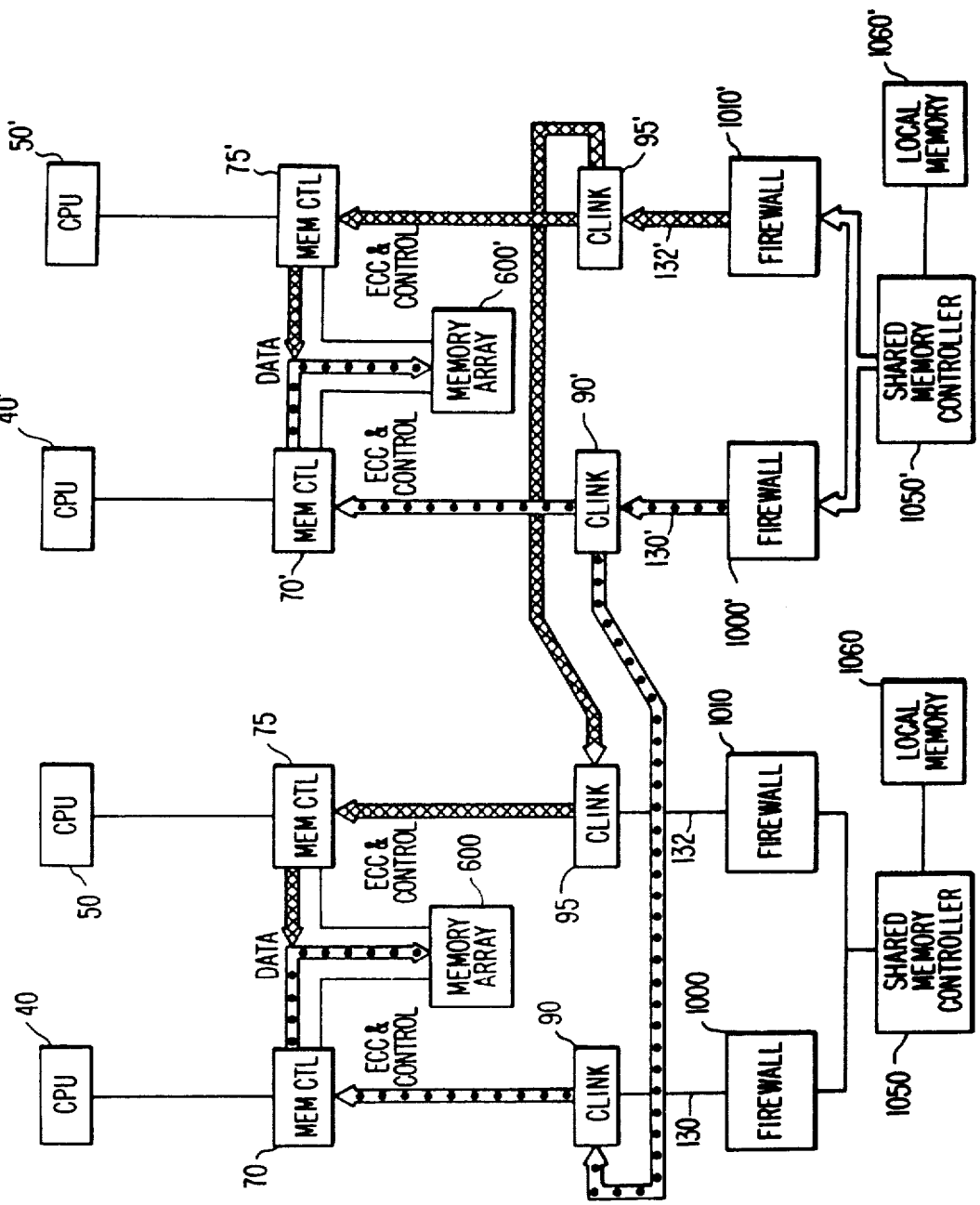

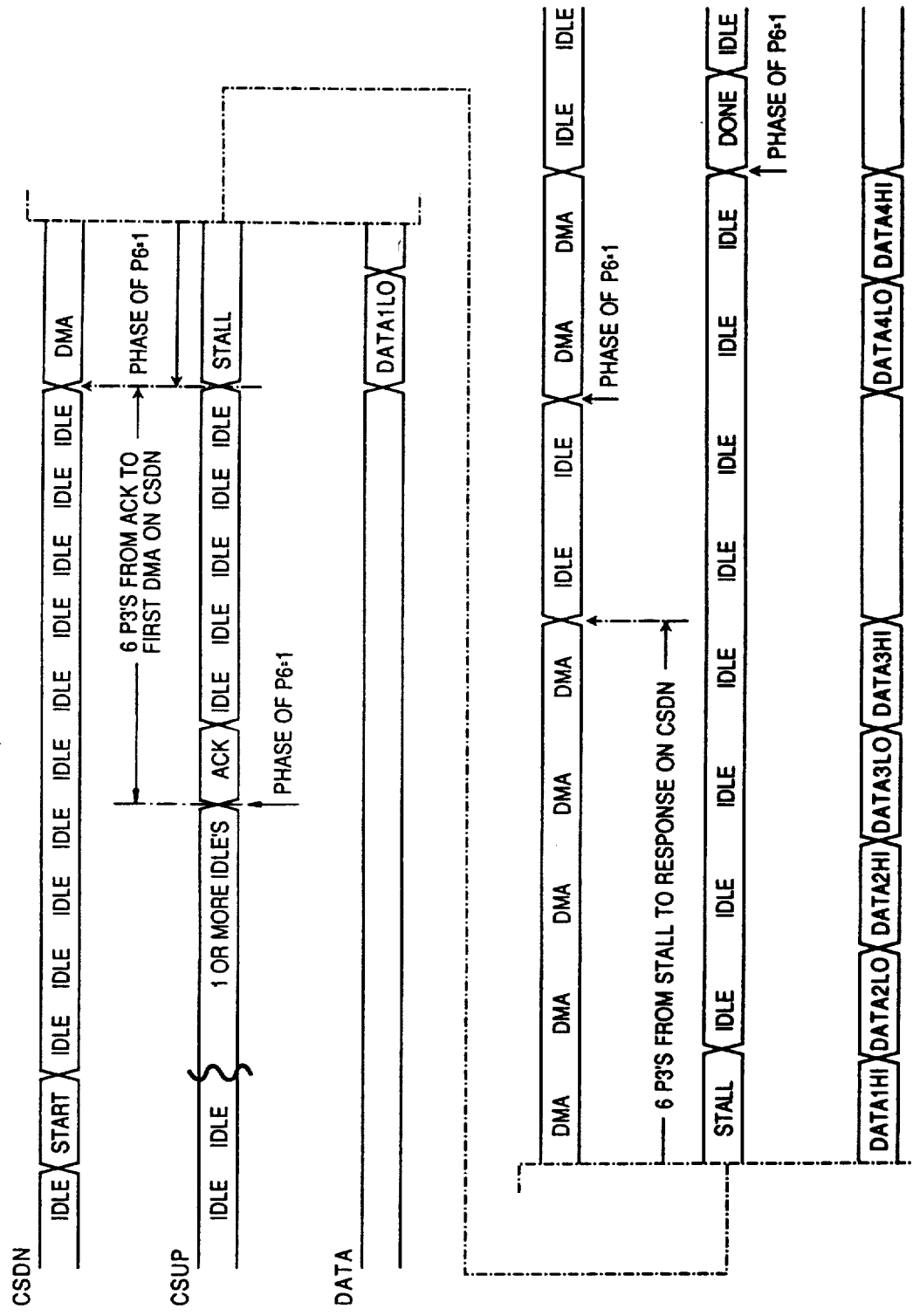

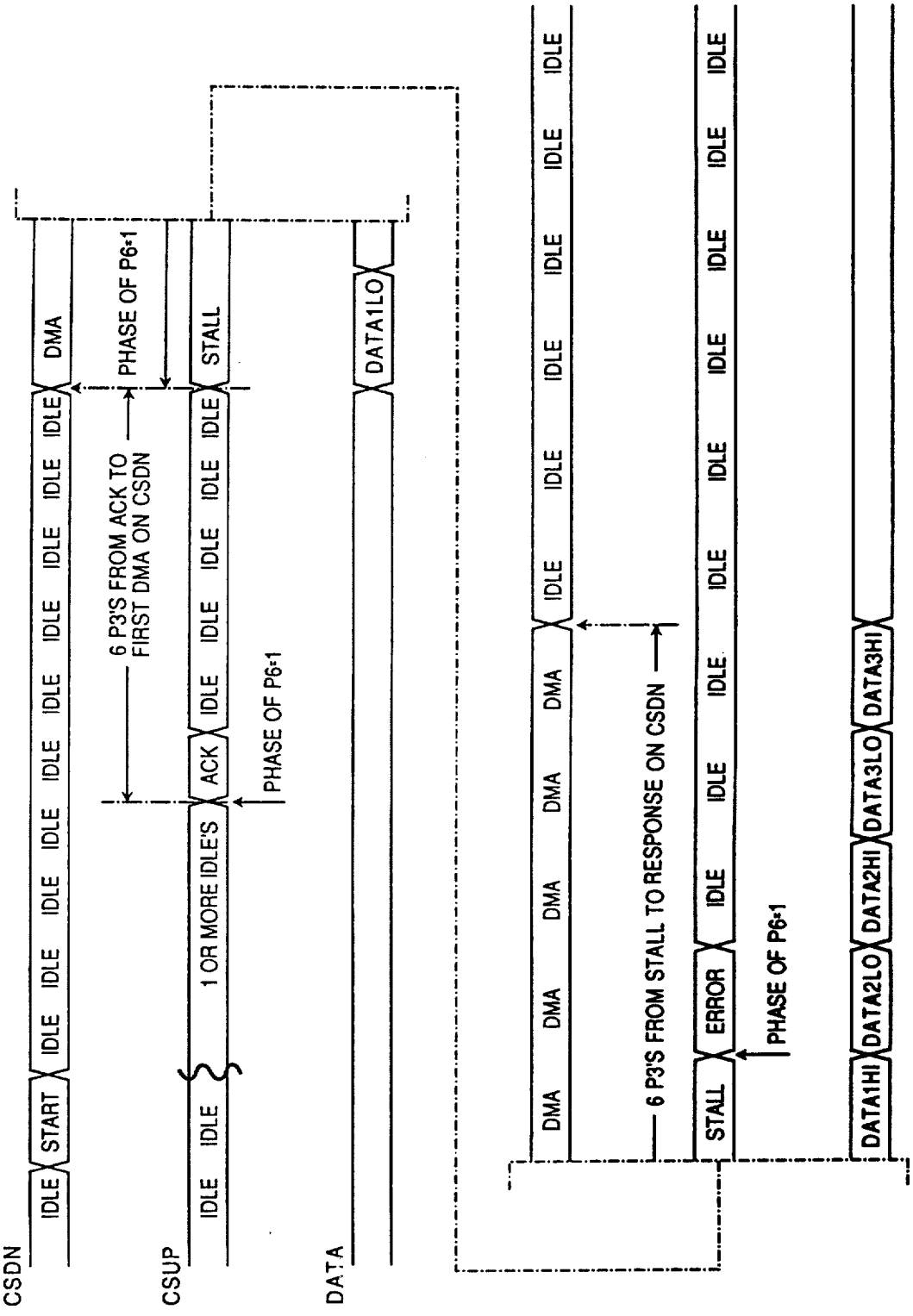

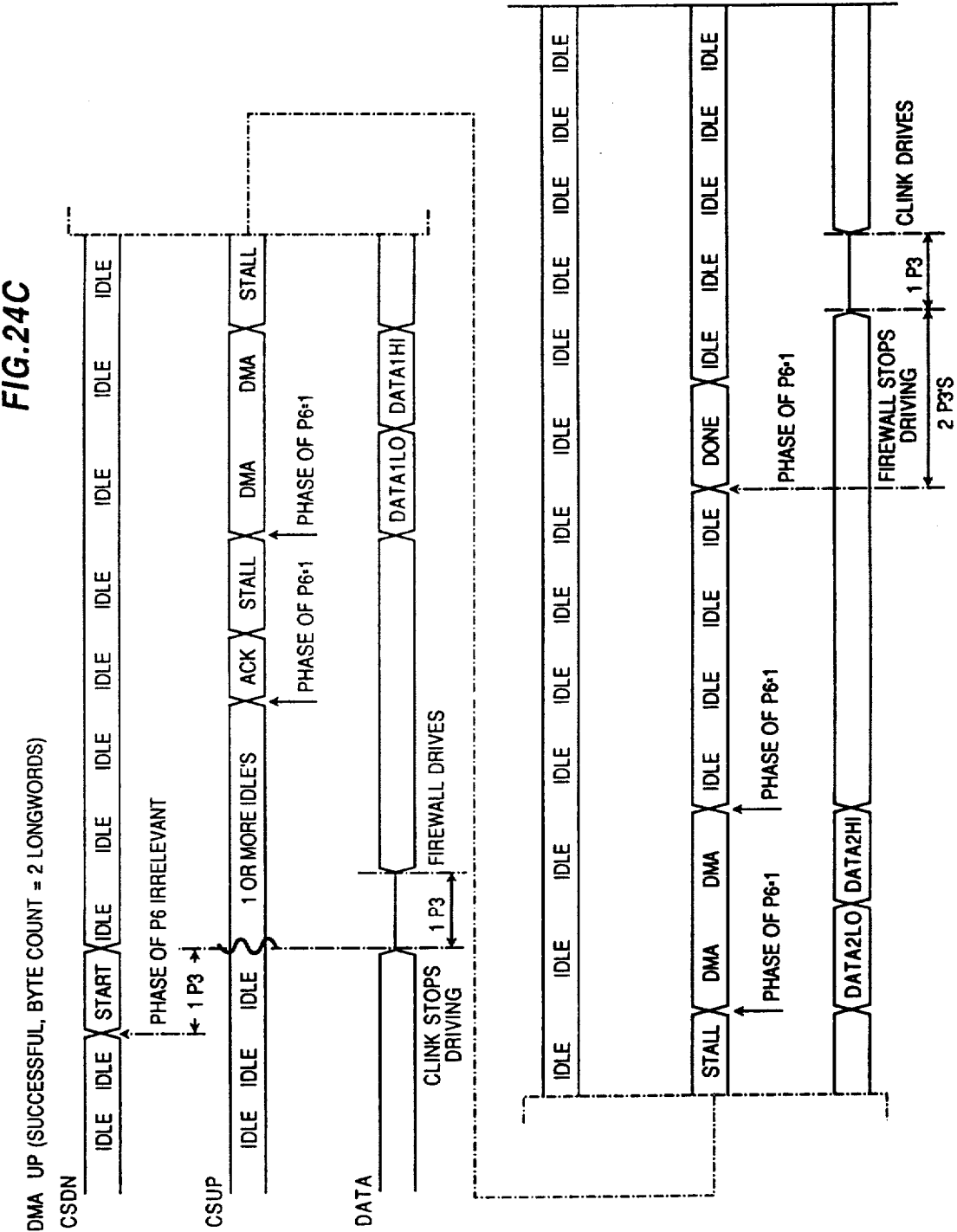

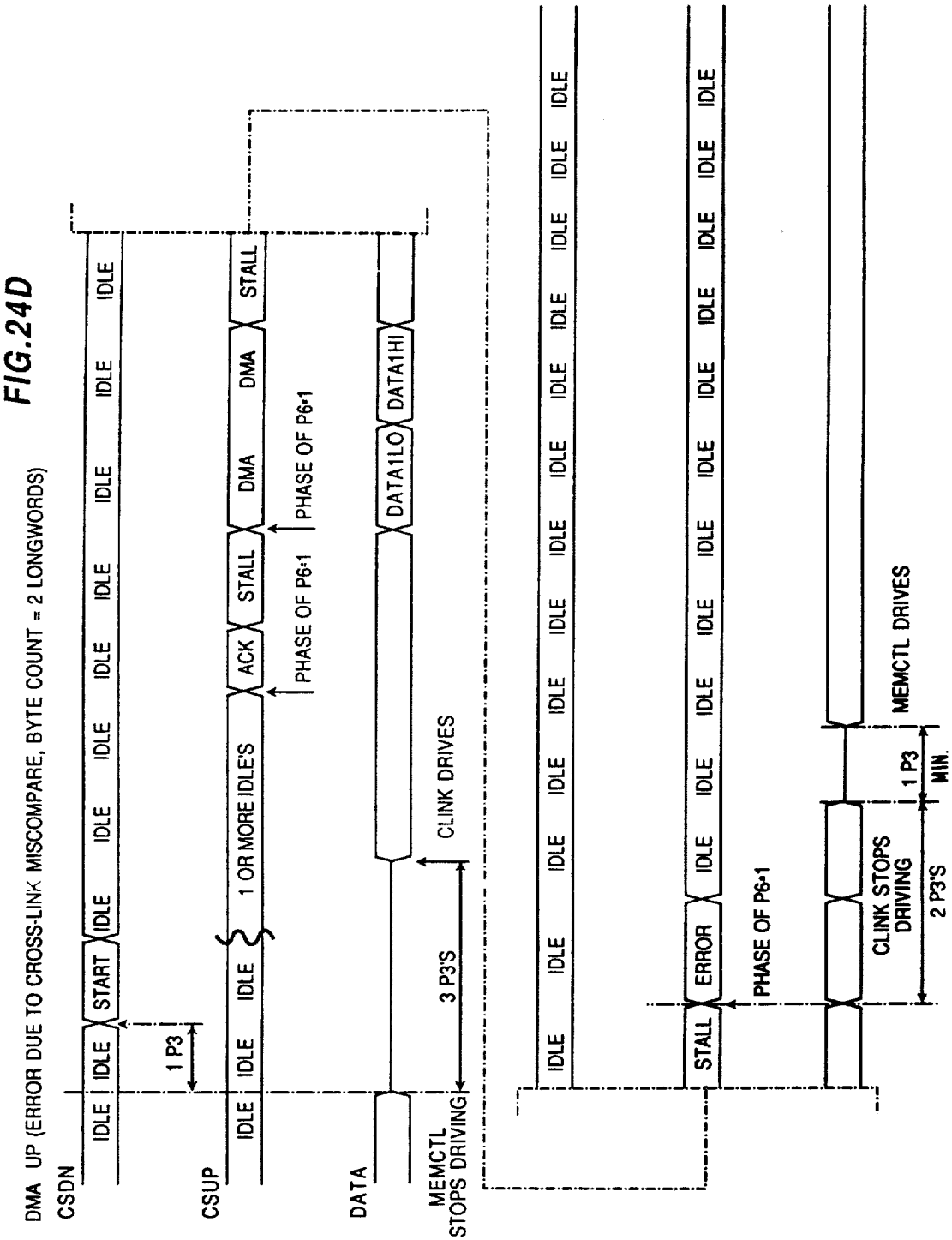

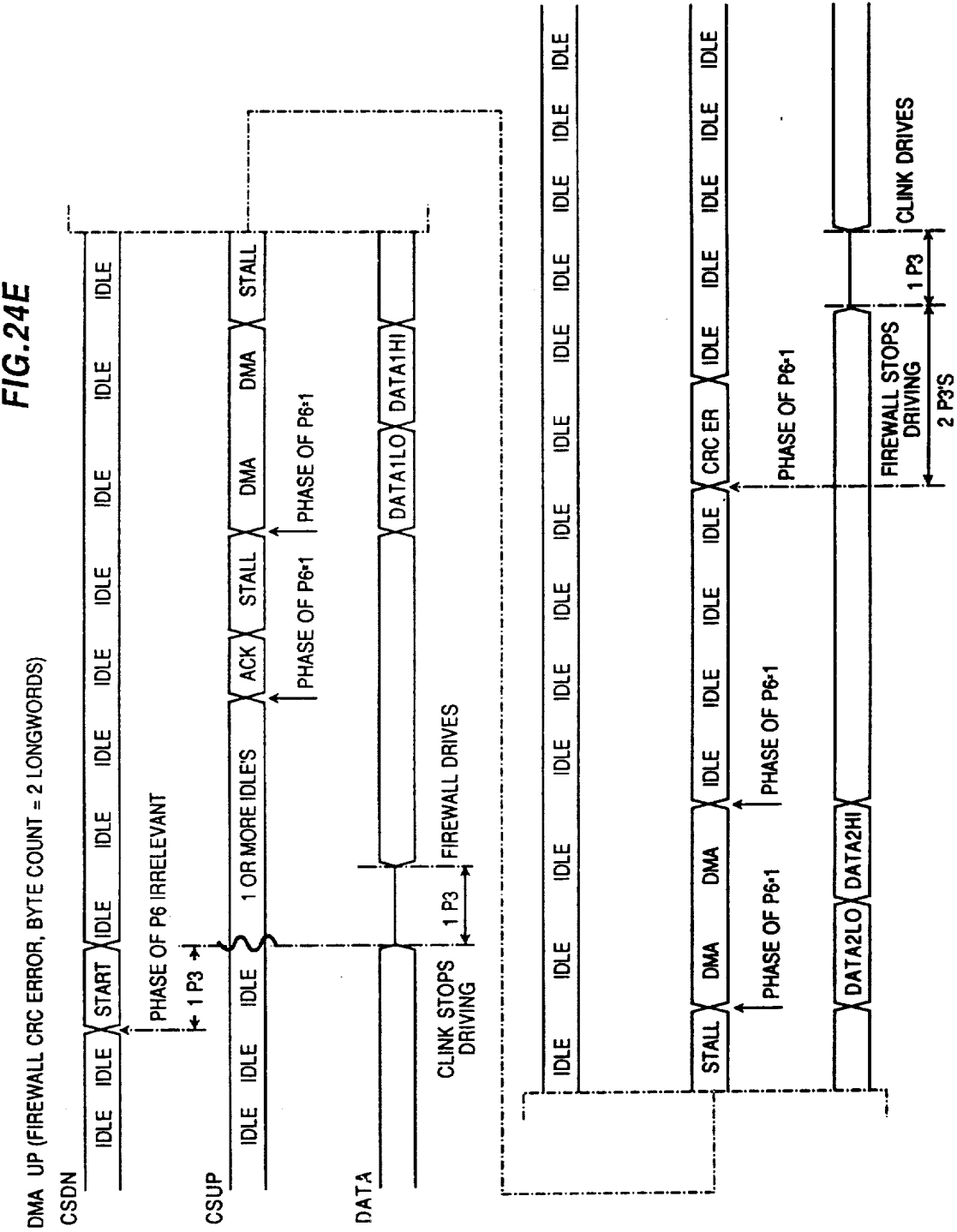

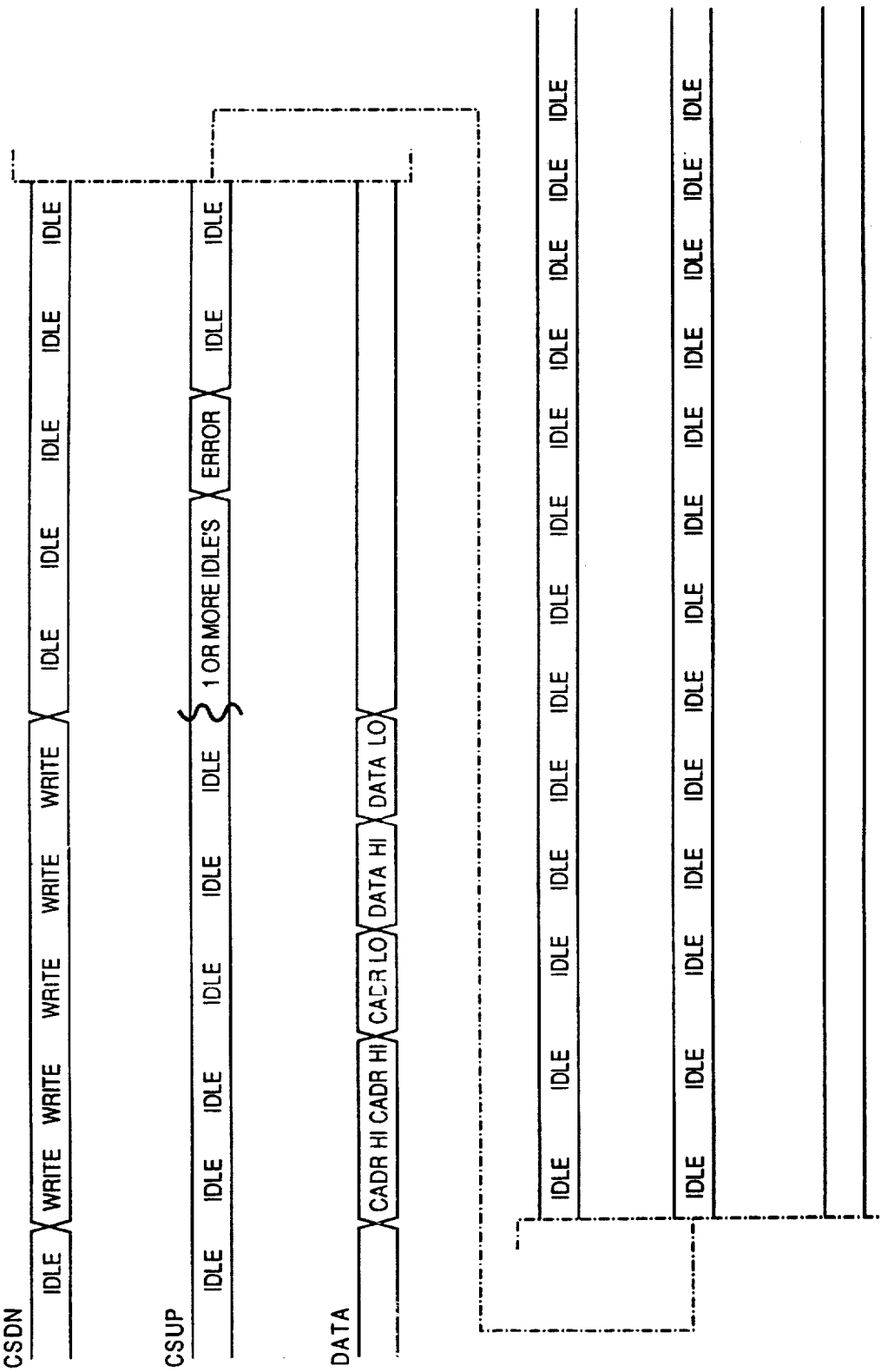

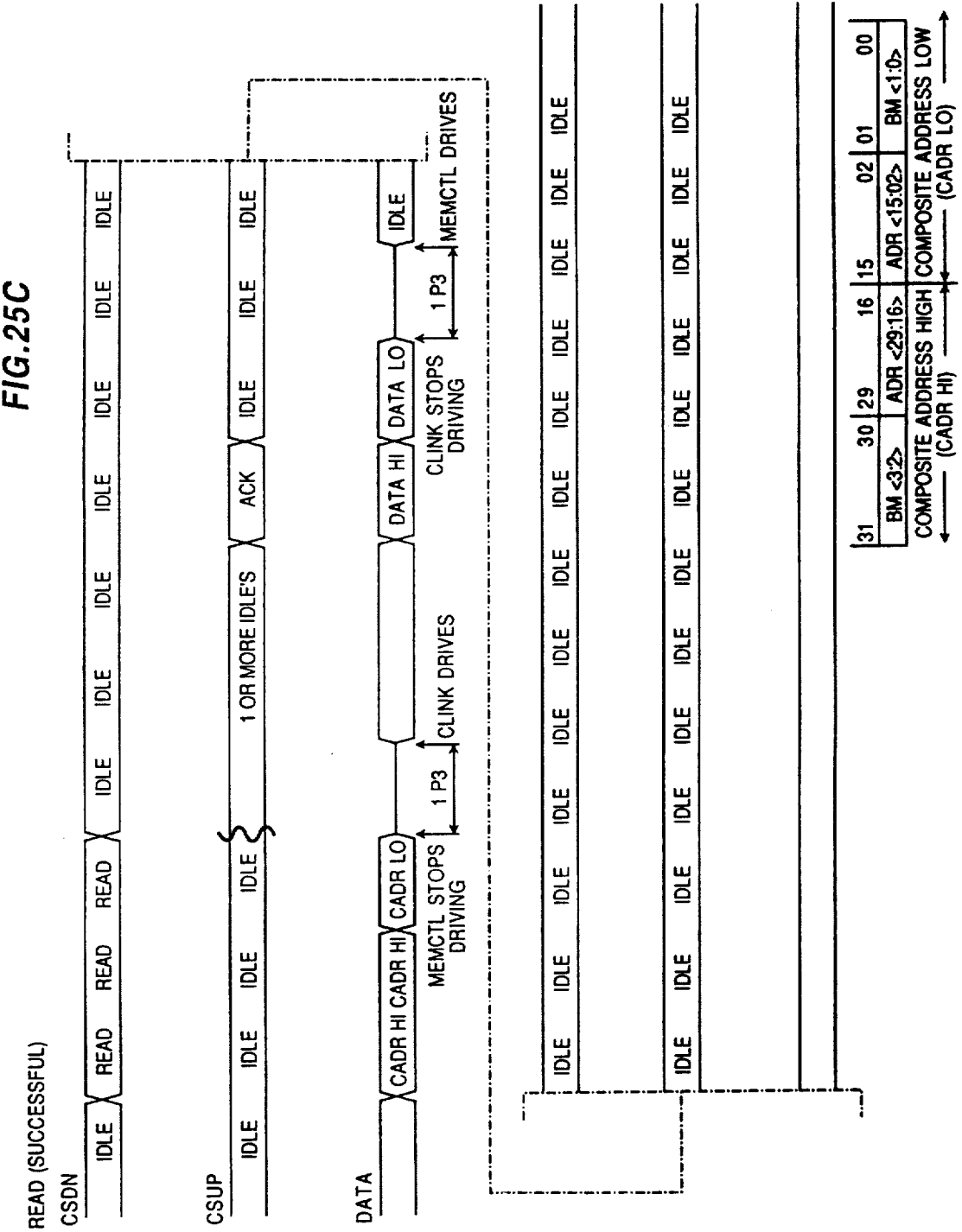

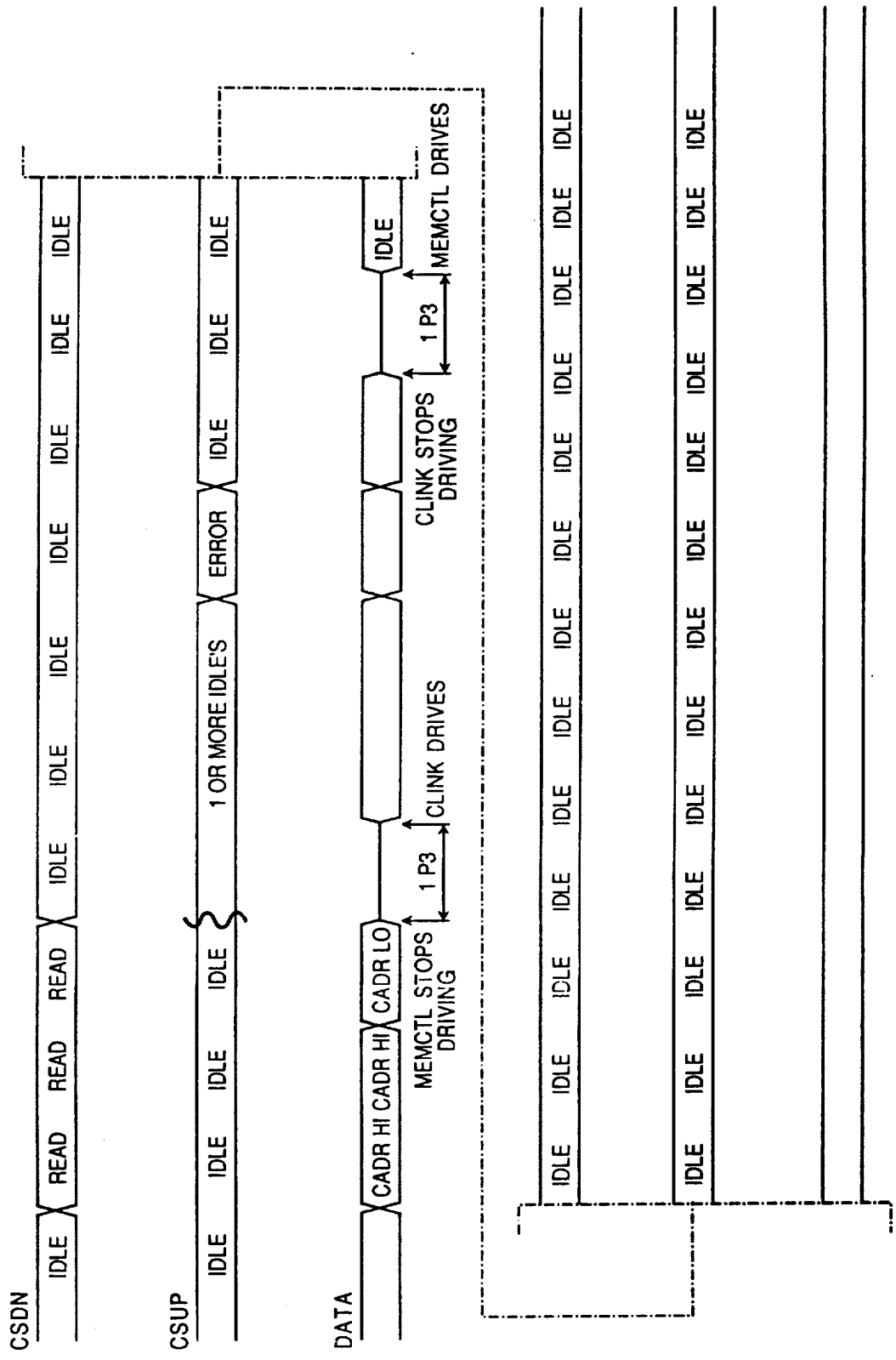

PROTOCOL FOR TRANSFER OF DMA DATA

This application is a continuation-in-part of application Ser. No. 93,539 filed Sep. 4, 1987, now U.S. Pat. No. 4,916,704.

BACKGROUND OF THE INVENTION

The invention relates to the transfer of data via DMA between a system resource and a controller via switching logic.

In computer systems, blocks of data can be quickly transferred between a system resource and a system memory via DMA using a controller. Before the DMA transfer can begin, certain information must be provided for use by the system resource and the controller.

In general, the starting addresses that will be accessed by the system resource and by the memory are stored in pointer registers. The addresses stored in the pointer registers are incremented or decremented by the system resource and by the controller to access the appropriate storage locations. As a result, an entire block of data can be transferred without the intervention of the main processors in the computer system.

A byte or word count also is provided and is stored in a counter before the DMA transfer begins. The count changes as each byte or word of DMA data is transferred. When the counter determines that all of the bytes or words in the DMA data block have been transferred, the DMA operation is complete.

In many computer systems, multiple system resources are present that can perform DMA transfers with a system memory. In these systems, switching logic is necessary in order to couple a particular system memory to a selected system resource.

However, in systems containing switching logic, it may be difficult to set up the required data path rapidly for an imminent DMA data transfer. The difficulty increases if the switching logic must be configured to allow DMA data to be transferred in a either of two directions between the selected system resource and the system memory.

Therefore, there is a need for a computer system in which the switching logic is efficiently set up before a DMA transfer starts to enable DMA data to be transferred between a particular system memory and a selected system resource. There also is a need for a computer system in which a simple protocol is used to rapidly initialize the pointer registers, counters, and switching logic in preparation for a DMA transfer.

SUMMARY OF THE INVENTION

It is an object of the invention to overcome at least some of the problems associated with the prior art.

It is therefore desirable to provide a process for efficiently configuring switching logic in order to transfer data via DMA between two nodes in a network. It is also beneficial to provide a process for rapidly initializing the pointer registers and counters.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the objects and in accordance with the purposes of the invention, as embodied and broadly described herein, a process is provided for transferring data via DMA between components in a computer system, wherein the computer system includes a memory controller, a first system resource bus coupled to a system resource, and a data router. The data router includes switching logic for coupling the memory controller to the first system resource bus. The process includes the step of transmitting DMA setup information designating a setup write transaction, from the memory controller, to the system resource, via the data router and via the first system resource bus coupled to the system resource. The DMA setup information corresponds to a DMA transfer, and indicates a direction of the DMA transfer as either an up direction from the system resource to the memory controller or a down direction from the memory controller to the system resource, indicates whether the DMA transfer will involve the first system resource bus, and indicates whether the DMA transfer will involve a system resource coupled to the first system resource bus. The process also includes the steps of decoding the DMA setup information, in the data router, during the setup write transaction, to determine the direction of the DMA transfer, to determine whether the DMA transfer will involve the first system resource bus, and to determine whether the DMA transfer will involve a system resource coupled to the first system resource bus; transmitting a start DMA code, from the memory controller, to the system resource, via the data router and via the first system resource bus coupled to the system resource; and configuring the switching logic in the data router, in response to transmission of the DMA start code, and in accordance with the DMA setup information decoded by the data router. The switching logic is configured to forward DMA data, from the first system resource bus to the memory controller, at times when the DMA transfer is in the up direction and the DMA transfer will involve the first system resource bus and the DMA transfer will involve a system resource coupled to the first system resource bus; and the switching logic is configured to forward DMA data, from the memory controller, to the first system resource bus, at times when the DMA transfer is in the down direction and the DMA transfer will involve the first system resource bus and the DMA transfer will involve a system resource coupled to the first system resource bus. The process further includes the steps of transmitting an acknowledge code, from the system resource, to the memory controller, via the first system resource bus coupled to the system resource, and via the switching logic in the data router, in response to transmission of the DMA start code; transmitting DMA data, after transmission of the acknowledge code, at times when the DMA transfer is in the up direction, from the system resource, to the memory controller, via the first system resource bus coupled to the system resource, and via the switching logic in the data router; transmitting DMA data, after transmission of the acknowledge code, at times when the DMA transfer is in the down direction, from the memory controller, to the system resource, via the switching logic in the data router, and via the first system resource bus coupled to the system resource; and transmitting a done code, after transmission of DMA data, from the system resource, to the memory controller, via the first system resource bus coupled to the system resource, and via the switching logic in the data router, to indicate successful DMA data transmission.

BRIEF DESCRIPTION OF THE DRAWINGS

The accompanying drawings, which are incorporated in and constitute a part of this specification, illustrate preferred embodiments of the invention and, together with the description of the invention, explain the principles of the invention.

FIGS. 9A and 9B are a diagram of error processing circuitry primary memory controller of the CPU module of FIG. 3;

FIGS. 13A and 13B are a state diagram showing the states for the cross-link of the CPU module shown in FIG. 3;

FIGS. 20A, 20B, 20C, 20D, and 20E are data flow diagrams for the computer system in FIG. 1;

FIGS. 24A, 24B, 24C, 24D, and 24E are timing diagrams for data transfers via DMA.

FIGS. 25A, 25B, 25C, and 25D are timing diagrams for data transfers via read and write cycles.

DESCRIPTION OF THE PREFERRED EMBODIMENT

Reference will now be made in detail to a presently preferred embodiment of the invention, an example of which is illustrated in the accompanying drawings.

A. SYSTEM DESCRIPTION

Figure 1:
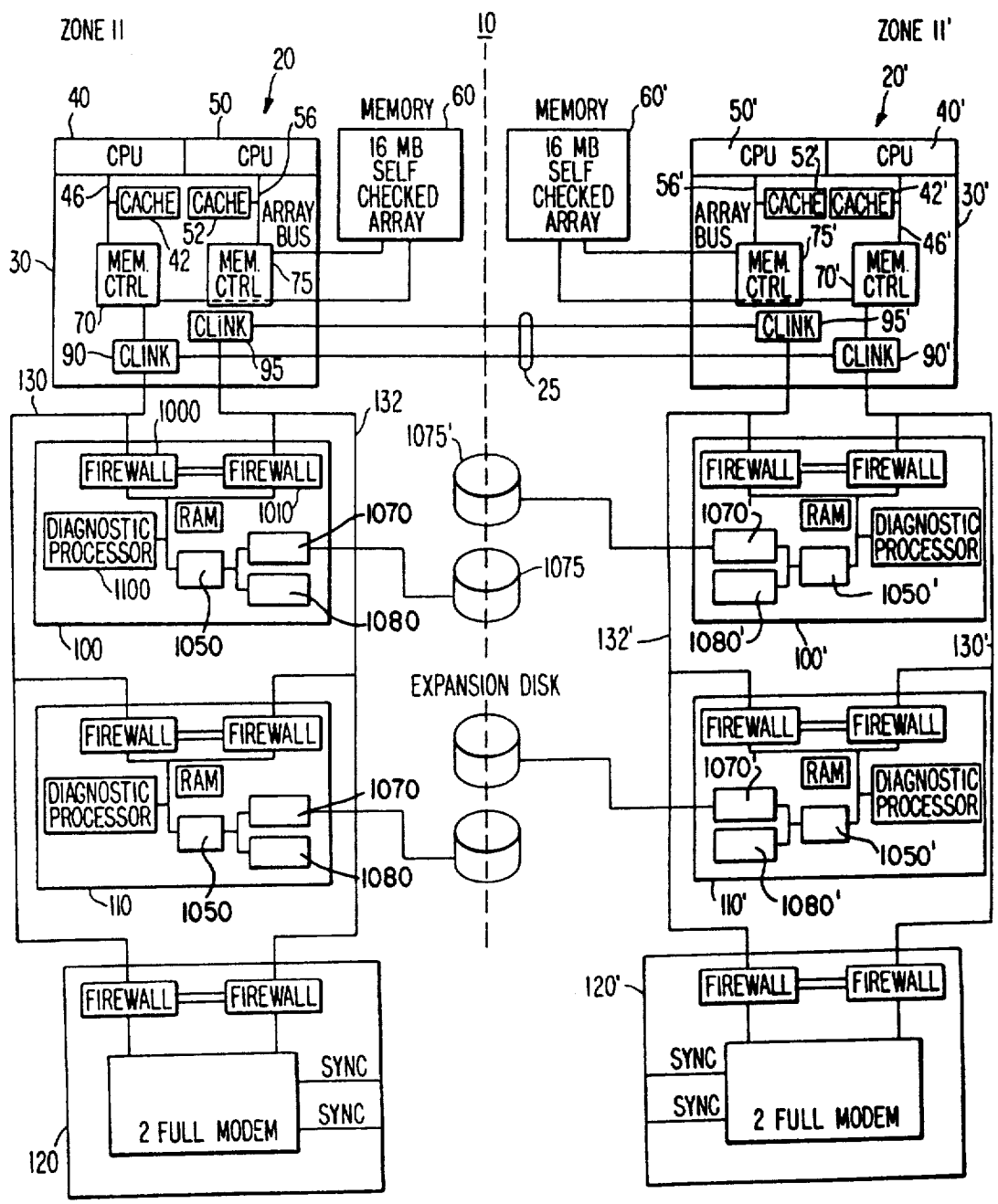
FIG. 1 is a block diagram of a preferred embodiment of fault tolerant computer system which practices the present invention.

FIG. 1 is a block diagram of a fault tolerant computer system 10 in accordance with the present invention. Fault tolerant computer system 10 includes duplicate systems, called zones. In the normal mode, the two zones 11 and 11' operate simultaneously. The duplication ensures that there is no single point of failure and that a single error or fault in one of the zones 11 or 11' will not disable computer system 10. Furthermore, all such faults can be corrected by disabling or ignoring the device or element which caused the fault. Zones 11 and 11' are shown in FIG. 1 as respectively including duplicate processing systems 20 and 20'. The duality, however, goes beyond the processing system.

Figure 2:
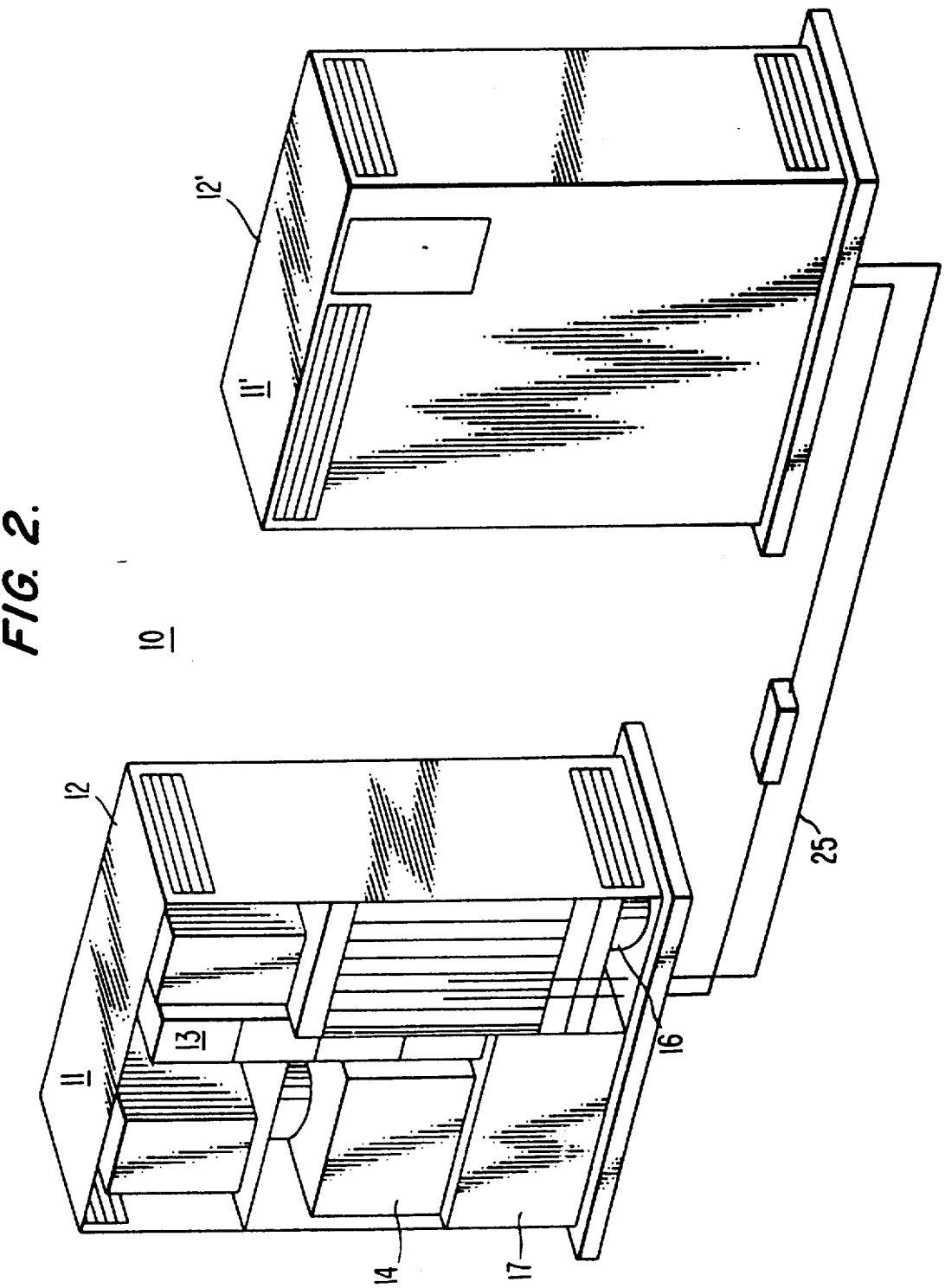
FIG. 2 is an illustration of the physical hardware containing the fault tolerant computer system in FIG. 1.

FIG. 2 contains an illustration of the physical hardware of fault tolerant computer system 10 and graphically illustrates the duplication of the systems. Each zone 11 and 11' is housed in a different cabinet 12 and 12', respectively. Cabinet 12 includes battery 13, power regulator 14, cooling fans 16, and AC input 17. Cabinet 12' includes separate elements corresponding to elements 13, 14, 16 and 17 of cabinet 12.

As explained in greater detail below, processing systems 20 and 20' include several modules interconnected by backplanes. If a module contains a fault or error, that module may be removed and replaced without disabling computing system 10. This is because processing systems 20 and 20' are physically separate, have separate backplanes into which the modules are plugged, and can operate independently of each other. Thus modules can be removed from and plugged into the backplane of one processing system while the other processing system continues to operate.

In the preferred embodiment, the duplicate processing systems 20 and 20' are identical and contain identical modules. Thus, only processing system 20 will be described completely with the understanding that processing system 20' operates equivalently.

Figure 3:
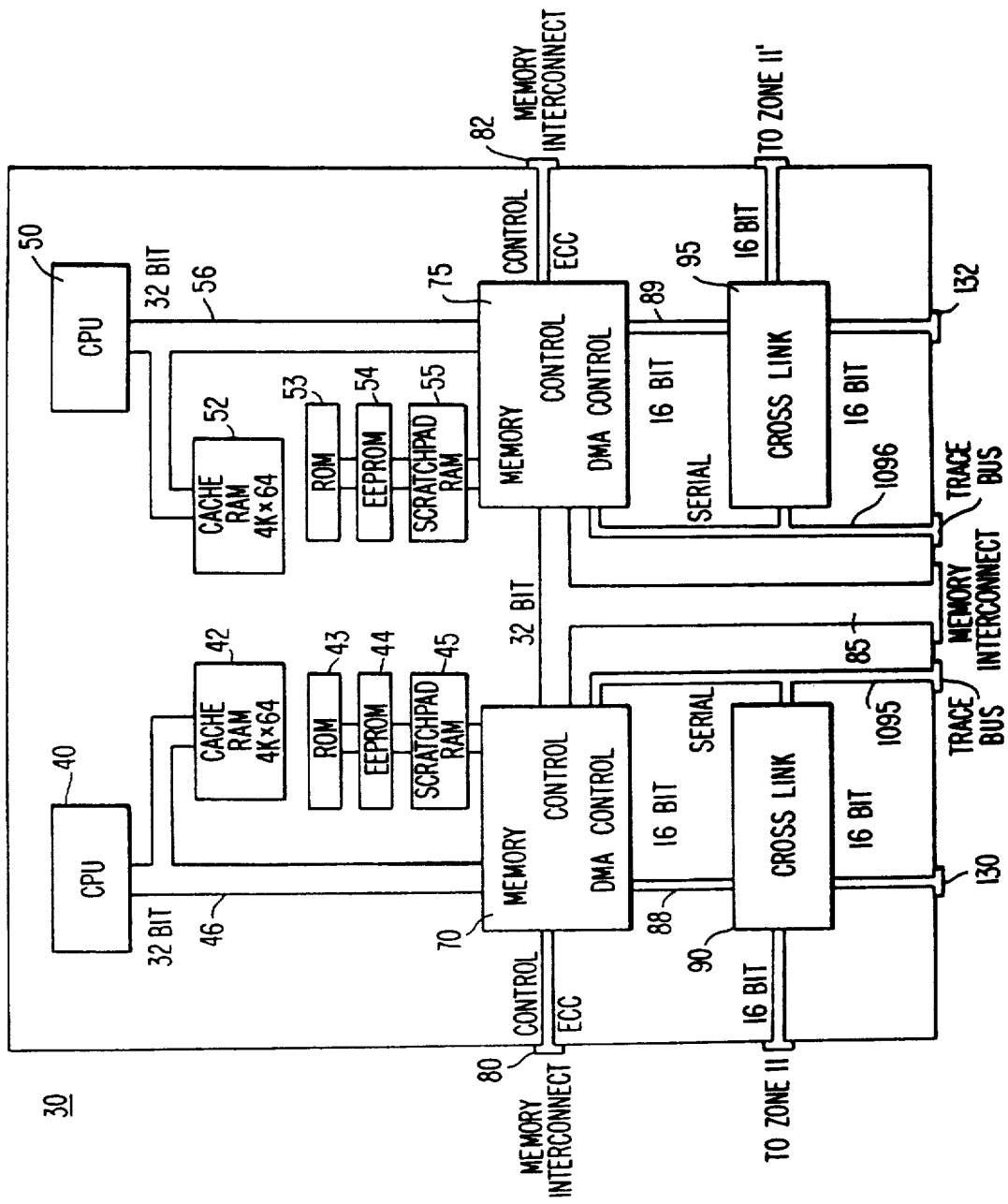
FIG. 3 is a block diagram of the CPU module shown in the fault tolerant computer system shown in FIG. 1.
Figure 4:
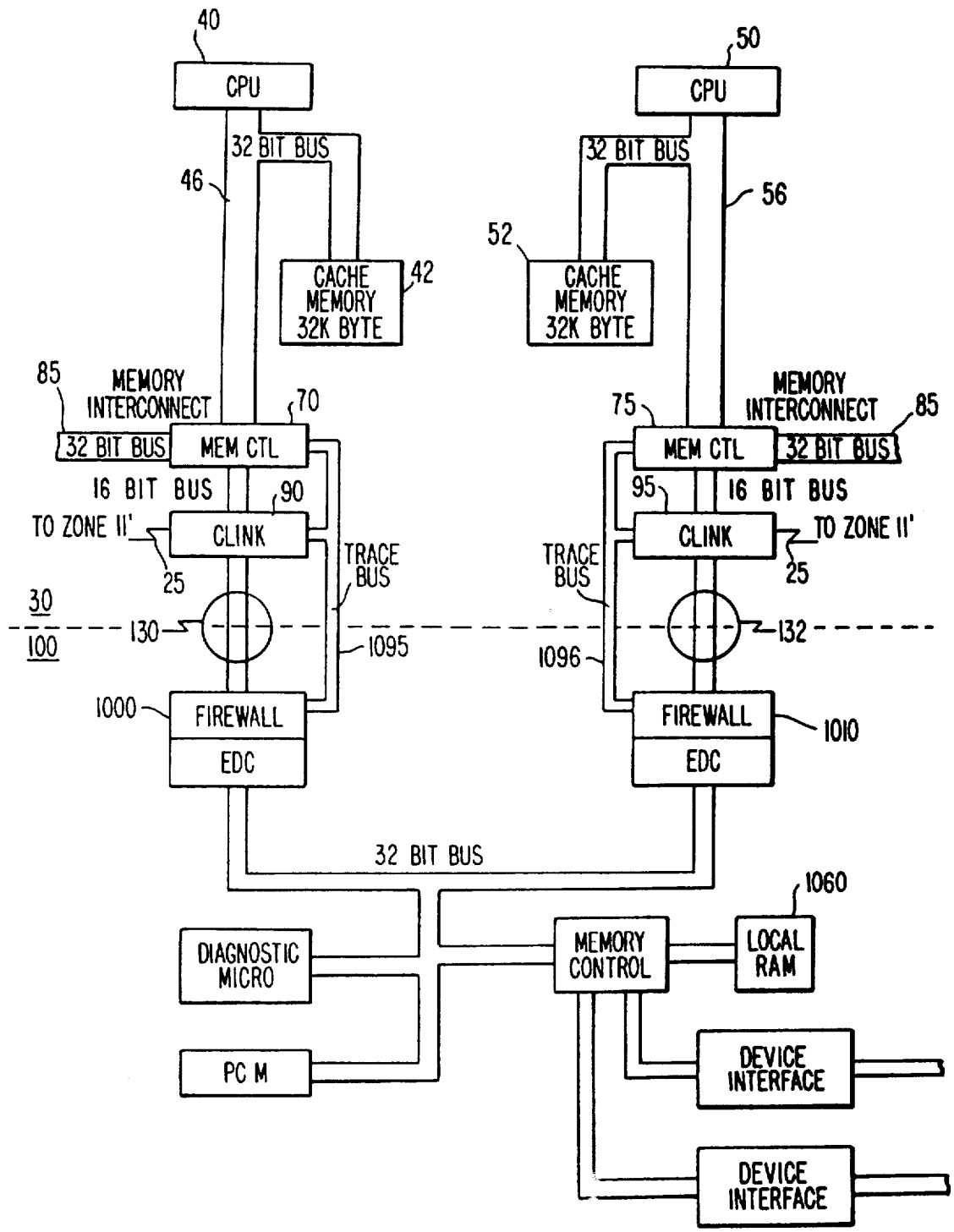
FIG. 4 is a block diagram of an interconnected CPU module and I/O module for the computer system shown in FIG. 1.

Processing system 20 includes CPU module 30 which is shown in greater detail in FIGS. 3 and 4. CPU module 30 is interconnected with CPU module 30' in processing system 20' by a cross-link pathway 25 which is described in greater detail below. Cross-link pathway 25 provides data transmission paths between processing systems 20 and 20' and carries timing signals to ensure that processing systems 20 and 20' operate synchronously.

Processing system 20 also includes I/O modules 100, 110, and 120. I/O modules 100, 110, 120, 100', 110' and 120' are independent devices. I/O module 100 is shown in greater detail in FIGS. 1, 4, and 17. Although multiple I/O modules are shown, duplication of such modules is not a requirement of the system. Without such duplication, however, some degree of fault tolerance will be lost.

Each of the I/O modules 100, 110 and 120 is connected to CPU module 30 by dual rail module interconnects 130 and 132. Module interconnects 130 and 132 serve as the I/O interconnect and are routed across the backplane for processing system 20. For purposes of this application, the data pathway including CPU 40, memory controller 70, cross-link 90 and module interconnect 130 is considered as one rail, and the data pathway including CPU 50, memory controller 75, cross-link 95, and module interconnect 132 is considered as another rail. During proper operation, the data on both rails is the same.

B. FAULT TOLERANT SYSTEM PHILOSOPHY

Fault tolerant computer system 10 does not have a single point of failure because each element is duplicated. Processing systems 20 and 20' are each a fail stop processing system which means that those systems can detect faults or errors in the subsystems and prevent uncontrolled propagation of such faults and errors to other subsystems, but they have a single point of failure because the elements in each processing system are not duplicated.

The two fail stop processing systems 20 and 20' are interconnected by certain elements operating in a defined manner to form a fail safe system. In the fail safe system embodied as fault tolerant computer system 10, the entire computer system can continue processing even if one of the fail stop processing systems 20 and 20' is faulting.

The two fail stop processing systems 20 and 20' are considered to operate in lockstep synchronism because CPUs 40, 50, 40' and 50' operate in such synchronism. There are three significant exceptions. The first is at initialization when a bootstrapping technique brings both processors into synchronism. The second exception is when the processing systems 20 and 20' operate independently (asynchronously) on two different workloads. The third exception occurs when certain errors arise in processing systems 20 and 20'. In this last exception, the CPU and memory elements in one of the processing systems is disabled, thereby ending synchronous operation.

When the system is running in lockstep I/O, only one I/O device is being accessed at any one time. All four CPUs 40, 50, 40' and 50', however, would receive the same data from that I/O device at substantially the same time. In the following discussion, it will be understood that lockstep synchronization of processing systems means that only one I/O module is being accessed.

The synchronism of duplicate processing systems 20 and 20' is implemented by treating each system as a deterministic machine which, starting in the same known state and upon receipt of the same inputs, will always enter the same machine states and produce the same results in the absence of error. Processing systems 20 and 20' are configured identically, receive the same inputs, and therefore pass through the same states. Thus, as long as both processors operate synchronously, they should produce the same results and enter the same state. If the processing systems are not in the same state or produce different results, it is assumed that one of the processing systems 20 and 20' has faulted. The source of the fault must then be isolated in order to take corrective action, such as disabling the faulting module.

Error detection generally involves overhead in the form of additional processing time or logic. To minimize such overhead, a system should check for errors as infrequently as possible consistent with fault tolerant operation. At the very least, error checking must occur before data is outputted from CPU modules 30 and 30'. Otherwise, internal processing errors may cause improper operation in external systems, like a nuclear reactor, which is the condition that fault tolerant systems are designed to prevent.

There are reasons for additional error checking. For example, to isolate faults or errors it is desirable to check the data received by CPU modules 30 and 30' prior to storage or use. Otherwise, when erroneous stored data is later accessed and additional errors result, it becomes difficult or impossible to find the original source of errors, especially when the erroneous data has been stored for some time. The passage of time as well as subsequent processing of the erroneous data may destroy any trail back to the source of the error.

"Error latency," which refers to the amount of time an error is stored prior to detection, may cause later problems as well. For example, a seldom-used routine may uncover a latent error when the computer system is already operating with diminished capacity due to a previous error. When the computer system has diminished capacity, the latent error may cause the system to crash.

Furthermore, it is desirable in the dual rail systems of processing systems 20 and 20' to check for errors prior to transferring data to single rail systems, such as a shared resource like memory. This is because there are no longer two independent sources of data after such transfers, and if any error in the single rail system is later detected, then error tracing becomes difficult if not impossible.

The preferred method of error handling is set forth in an application filed Aug. 1, 1989 entitled, "Software Error Handling", U.S. application Ser. No. 07/388,324, which is herein incorporated by reference.

C. MODULE DESCRIPTION

1. CPU Module

The elements of CPU module 30 which appear in FIG. 1 are shown in greater detail in FIGS. 3 and 4. FIG. 3 is a block diagram of the CPU module, and FIG. 4 shows block diagrams of CPU module 30 and I/O module 100 as well as their interconnections. Only CPU module 30 will be described since the operation of and the elements included in CPU modules 30 and 30' are generally the same.

CPU module 30 contains dual CPUs 40 and 50. CPUs 40 and 50 can be standard central processing units known to persons of ordinary skill. In the preferred embodiment, CPUs 40 and 50 are VAX microprocessors manufactured by Digital Equipment Corporation, the assignee of this application.

Associated with CPUs 40 and 50 are cache memories 42 and 52, respectively, which are standard cache RAMs of sufficient memory size for the CPUs. In the preferred embodiment, the cache RAM is 4K×64 bits. It is not necessary for the present invention to have a cache RAM, however.

2. Memory Module

Figure 5:
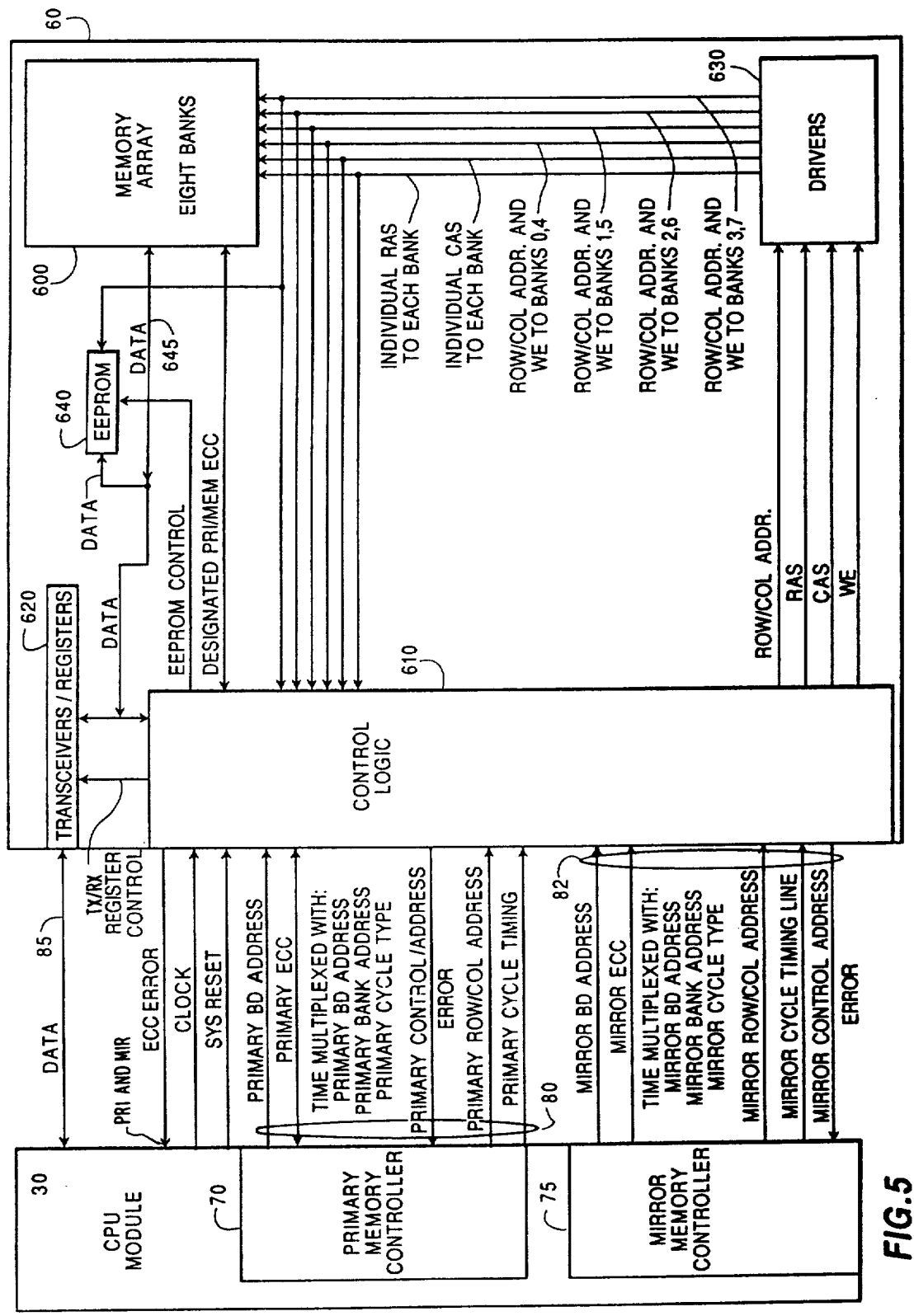
FIG. 5 is a block diagram of a memory module for the fault tolerant computer system shown in FIG. 1.

Preferably, CPU's 40 and 50 can share up to four memory modules 60. FIG. 5 is a block diagram of one memory module 60 shown connected to CPU module 30.

During memory transfer cycles, status register transfer cycles, and EEPROM transfer cycles, each memory module 60 transfers data to and from primary memory controller 70 via a bidirectional data bus 85. Each memory module 60 also receives address, control, timing, and ECC signals from memory controllers 70 and 75 via buses 80 and 82, respectively. The address signals on buses 80 and 82 include board, bank, and row and column address signals that identify the memory board, bank, and row and column address involved in the data transfer.

As shown in FIG. 5, each memory module 60 includes a memory array 600. Each memory array 600 is a standard RAM in which the DRAMs are organized into eight banks of memory. In the preferred embodiment, fast page mode type DRAMs are used.

Memory module 60 also includes control logic 610, data transceivers/registers 620, memory drivers 630, and an EEPROM 640. Data transceivers/receivers 620 provide a data buffer and data interface for transferring data between memory array 600 and the bidirectional data lines of data bus 85. Memory drivers 630 distribute row and column address signals and control signals from control logic 610 to each bank in memory array 600 to enable transfer of a longword of data and its corresponding ECC signals to or from the memory bank selected by the memory board and bank address signals.

EEPROM 640, which can be any type of NVRAM (nonvolatile RAM), stores memory error data for off-line repair and configuration data, such as module size. When the memory module is removed after a fault, stored data is extracted from EEPROM 640 to determine the cause of the fault. EEPROM 640 is addressed via row address lines from drivers 630 and by EEPROM control signals from control logic 610. EEPROM 640 transfers eight bits of data to and from a thirty-two bit internal memory data bus 645.

Control logic 610 routes address signals to the elements of memory module 60 and generates internal timing and control signals. As shown in greater detail in FIG. 6, control logic 610 includes a primary/mirror designator circuit 612.

Primary/mirror designator circuit 612 receives two sets of memory board address, bank address, row and column address, cycle type, and cycle timing signals from memory controllers 70 and 75 on buses 80 and 82, and also transfers two sets of ECC signals to or from the memory controllers on buses 80 and 82. Transceivers/registers in designator 612 provide a buffer and interface for transferring these signals to and from memory buses 80 and 82. A primary/mirror multiplexer bit stored in status registers 618 indicates which one of memory controllers 70 and 75 is designated as the primary memory controller and which is designated as the mirror memory controller, and a primary/mirror multiplexer signal is provided from status registers 618 to designator 612.

Primary/mirror designator 612 provides two sets of signals for distribution in control logic 610. One set of signals includes designated primary memory board address, bank address, row and column address, cycle type, cycle timing, and ECC signals. The other set of signals includes designated mirror memory board address, bank address, row and column address, cycle type, cycle timing, and ECC signals. The primary/mirror multiplexer signal is used by designator 612 to select whether the signals on buses 80 and 82 will be respectively routed to the lines for carrying designated primary signals and to the lines for carrying designated mirror signals, or vice-versa.

A number of time division multiplexed bidirectional lines are included in buses 80 and 82. At certain times after the beginning of memory transfer cycles, status register transfer cycles, and EEPROM transfer cycles, ECC signals corresponding to data on data bus 85 are placed on these time division multiplexed bidirectional lines. If the transfer cycle is a write cycle, memory module 60 receives data and ECC signals from the memory controllers. If the transfer cycle is a read cycle, memory module 60 transmits data and ECC signals to the memory controllers. At other times during transfer cycles, address, control, and timing signals are received by memory module 60 on the time division multiplexed bidirectional lines. Preferably, at the beginning of memory transfer cycles, status register transfer cycles, and EEPROM transfer cycles, memory controllers 70 and 75 transmit memory board address, bank address, and cycle type signals on these timeshared lines to each memory module 60.

Preferably, row address signals and column address signals are multiplexed on the same row and column address lines during transfer cycles. First, a row address is provided to memory module 60 by the memory controllers, followed by a column address about sixty nanoseconds later.

A sequencer 616 receives as inputs a system clock signal and a reset signal from CPU module 30, and receives the designated primary cycle timing, designated primary cycle type, designated mirror cycle timing, and designated mirror cycle type signals from the transceivers/registers in designator 612.

Sequencer 616 is a ring counter with associated steering logic that generates and distributes a number of control and sequence timing signals for the memory module that are needed in order to execute the various types of cycles. The control and sequence timing signals are generated from the system clock signals, the designated primary cycle timing signals, and the designated primary cycle type signals.

Sequencer 616 also generates a duplicate set of sequence timing signals from the system clock signals, the designated mirror cycle timing signals, and the designated mirror cycle type signals. These duplicate sequence timing signals are used for error checking. For data transfers of multi-long words of data to and from memory module 60 in a fast page mode, each set of column addresses starting with the first set is followed by the next column address 120 nanoseconds later, and each long word of data is moved across bus 85 120 nanoseconds after the previous long word of data.

Sequencer 616 also generates tx/rx register control signals. The tx/rx register control signals are provided to control the operation of data transceivers/registers 620 and the transceivers/registers in designator 612. The direction of data flow is determined by the steering logic in sequencer 616, which responds to the designated primary cycle type signals by generating tx/rx control and sequence timing signals to indicate whether and when data and ECC signals should be written into or read from the transceivers/registers in memory module 60. Thus, during memory write cycles, status register write cycles, and EEPROM write cycles, data and ECC signals will be latched into the transceivers/registers from buses 80, 82, and 85, while during memory read cycles, status register read cycles, and EEPROM read cycles, data and ECC signals will be latched into the transceivers/registers from memory array 600, status registers 618, or EEPROM 640 for output to CPU module 30.

Sequencer 616 also generates EEPROM control signals to control the operation of EEPROM 640.

The timing relationships that exist in memory module 60 are specified with reference to the rise time of the system clock signal, which has a period of thirty nanoseconds. All status register read and write cycles, and all memory read and write cycles of a single longword, are performed in ten system clock periods, i.e., 300 nanoseconds. Memory read and write transfer cycles may consist of multi-longword transfers. For each additional longword that is transferred, the memory transfer cycle is extended for four additional system clock periods. Memory refresh cycles and EEPROM write cycles require at least twelve system clock periods to execute, and EEPROM read cycles require at least twenty system clock periods.

The designated primary cycle timing signal causes sequencer 616 to start generating the sequence timing and control signals that enable the memory module selected by the memory board address signals to implement a requested cycle. The transition of the designated primary cycle timing signal to an active state marks the start of the cycle. The return of the designated primary cycle timing signal to an inactive state marks the end of the cycle.

The sequence timing signals generated by sequencer 616 are associated with the different states entered by the sequencer as a cycle requested by CPU module 30 is executed. In order to specify the timing relationship among these different states (and the timing relationship among sequence timing signals corresponding to each of these states), the discrete states that may be entered by sequencer 616 are identified as states SEQ IDLE and SEQ 1 to SEQ 19. Each state lasts for a single system clock period (thirty nanoseconds). Entry by sequencer 616 into each different state is triggered by the leading edge of the system clock signal. The leading edges of the system clock signal that cause sequencer 616 to enter states SEQ IDLE and SEQ 1 to SEQ 19 are referred to as transitions T IDLE and T1 to T19 to relate them to the sequencer states, i.e., TN is the system clock signal leading edge that causes sequencer 616 to enter state SEQ N.

At times when CPU module 30 is not directing memory module 60 to execute a cycle, the designated primary cycle timing signal is not asserted, and the sequencer remains in state SEQ IDLE. The sequencer is started (enters state SEQ 1) in response to assertion by memory controller 70 of the cycle timing signal on bus 80, provided control logic 610 and sequencer 616 are located in the memory module selected by memory board address signals also transmitted from memory controller 70 on bus 80. The rising edge of the first system clock signal following assertion of the designated primary cycle active signal corresponds to transition T1.

As indicated previously, in the case of transfers of a single longword to or from memory array 600, the cycle is performed in ten system clock periods. The sequencer proceeds from SEQ IDLE, to states SEQ 1 through SEQ 9, and returns to SEQ IDLE.

Memory read and write cycles may be extended, however, to transfer additional longwords. Memory array 600 preferably uses "fast page mode" DRAMs. During multi-longword reads and writes, transfers of data to and from the memory array after transfer of the first longword are accomplished by repeatedly updating the column address and regenerating a CAS (column address strobe) signal.

During multi-longword transfer cycles, these updates of the column address can be implemented because sequencer 616 repeatedly loops from states SEQ 4 through SEQ 7 until all of the longwords are transferred. For example, if three longwords are being read from or written into memory array 600, the sequencer enters states SEQ IDLE, SEQ 1, SEQ 2, SEQ 3, SEQ 4, SEQ 5, SEQ 6, SEQ 7, SEQ 4, SEQ 5, SEQ 6, SEQ 7, SEQ 4, SEQ 5, SEQ 6, SEQ 7, SEQ 8, SEQ 9, and SEQ IDLE.

During a memory transfer cycle, the designated primary cycle timing signal is monitored by sequencer 616 during transition T6 to determine whether to extend the memory read or write cycle in order to transfer at least one additional longword. At times when the designated primary cycle timing signal is asserted during transition T6, the sequencer in state SEQ 7 will respond to the next system clock signal by entering state SEQ 4 instead of entering state SEQ 8.

In the case of a multi-longword transfer, the designated primary cycle timing signal is asserted at least fifteen nanoseconds before the first T6 transition and remains asserted until the final longword is transferred. In order to end a memory transfer cycle after the final longword has been transferred, the designated primary cycle timing signal is deasserted at least fifteen nanoseconds before the last T6 transition and remains deasserted for at least ten nanoseconds after the last T6 transition.

During memory transfer cycles, the designated primary row address signals and the designated primary column address signals are presented at different times by designator 612 in control logic 610 to memory drivers 630 on a set of time division multiplexed lines. The outputs of drivers 630 are applied to the address inputs of the DRAMs in memory array 600, and also are returned to control logic 610 for comparison with the designated mirror row and column address signals to check for errors. During status register transfer cycles and EEPROM transfer cycles, column address signals are not needed to select a particular storage location.

During a memory transfer cycle, row address signals are the first signals presented on the timeshared row and column address lines of buses 80 and 82. During state SEQ IDLE, row address signals are transmitted by the memory controllers on the row and column address lines, and the row address is stable from at least fifteen nanoseconds before the T1 transition until ten nanoseconds after the T1 transition. Next, column address signals are transmitted by the memory controllers on the row and column address lines, and the column address is stable from at least ten nanoseconds before the T3 transition until fifteen nanoseconds after the T4 transition. In the case of multi-longword transfers during memory transfer cycles, subsequent column address signals are then transmitted on the row and column address lines, and these subsequent column addresses are stable from ten nanoseconds before the T6 transition until fifteen nanoseconds after the T7 transition.

Generator/checker 617 receives the two sets of sequence timing signals generated by sequencer 616. In addition, the designated primary cycle type and bank address signals and the designated mirror cycle type and bank address signals are transmitted to generator/checker 617 by designator 612. In the generator/checker, a number of primary control signals, i.e., RAS (row address strobe), CAS (column address strobe), and WE (write enable), are generated for distribution to drivers 630, using the primary sequence timing signals and the designated primary cycle type and bank address signals. A duplicate set of these control signals is generated by generator/checker 617 from the duplicate (mirror) sequence timing signals and the designated mirror cycle type and bank address signals. These mirror RAS, CAS, and write enable signals are used for error checking.

When the primary cycle type signals indicate a memory transfer cycle is being performed, the primary bank address signals identify one selected bank of DRAMs in memory array 600. Memory drivers 630 include separate RAS drivers for each bank of DRAMs in memory array 600. In generator/checker 617, the primary RAS signal is generated during the memory transfer cycle and demultiplexed onto one of the lines connecting the generator/checker to the RAS drivers. As a result, only the RAS driver corresponding to the selected DRAM bank receives an asserted RAS signal during the memory transfer cycle. During refresh cycles, the primary RAS signal is not demultiplexed and an asserted RAS signal is received by each RAS driver. During status register transfer cycles and EEPROM transfer cycles, the bank address signals are unnecessary.

Memory drivers 630 also include CAS drivers. In generator/checker 617, the primary CAS signal is generated during memory transfer cycles and refresh cycles. The primary CAS signal is not demultiplexed and an asserted CAS signal is received by each CAS driver.

During memory write cycles, the primary WE signal is generated by generator/checker 617. The asserted WE signal is provided by drivers 630 to each DRAM bank in memory array 600. However, a write can only be executed by the selected DRAM bank, which also receives asserted RAS and CAS signals.

In the preferred embodiment of the invention, during memory transfer cycles the primary RAS signal is asserted during the T2 transition, is stable from at least ten nanoseconds before the T3 transition, and is deasserted during the last T7 transition. The primary CAS signal is asserted fifteen nanoseconds after each T4 transition, and is deasserted during each T7 transition. During memory write cycles the primary WE signal is asserted during the T3 transition, is stable from at least ten nanoseconds before the first T4 transition, and is deasserted during the last T7 transition.

When the primary cycle type signals indicate a memory refresh cycle is being performed, generator/checker 617 causes memory array 600 to perform memory refresh operations in response to the primary sequence timing signals provided by sequencer 616. During these refresh operations, the RAS and CAS signals are generated and distributed by the generator/checker in reverse order. This mode of refresh requires no external addressing for bank, row, or column.

During transfer cycles, ECC signals are transferred on the time division multiplexed bidirectional lines of buses 80 and 82 at times when data is being transferred on bus 85. However, these same lines are used to transfer control (e.g., cycle type) and address (e.g., memory board address and bank address) signals at other times during the transfer cycle.

The transceivers/registers in primary/mirror designator 612 include receivers and transmitters that are responsive to sequence timing signals and tx/rx register control signals provided by sequencer 616. The sequence timing signals and tx/rx register control signals enable multiplexing of ECC signals and address and control signals on the time division multiplexed bidirectional lines of buses 80 and 82.

Preferably, control and address signals, such as cycle type, memory board address, and bank address signals, are transmitted by memory controllers 70 and 75 and presented on the timeshared lines of buses 80 and 82 at the beginning of either single or multi-longword transfer cycles. These signals start their transition (while the sequencer is in the SEQ IDLE state) concurrent with activation of the cycle timing signal, and remain stable through T2. Therefore, in the transceivers/registers of designator 112, the receivers are enabled and the transmitters are set into their tristate mode at least until the end of state SEQ 2.

The cycle type signals identify which of the following listed functions will be performed by memory array 60 during the cycle: memory read, memory write, status register read, status register write, EEPROM read, EEPROM write, and refresh. The designated primary cycle type signals received by designator 612 are provided to sequencer 616 and used in generating tx/rx control signals and sequence timing signals. For example, in data transceivers/registers 620 and in the transceivers/registers of designator 612, the receivers are enabled and the transmitters are set into their tristate mode by sequencer 616 throughout a write cycle. However, in data transceivers/registers 620 and in the transceivers/registers of designator 612 during a read cycle, the receivers are set into their tristate mode and the transmitters are enabled by sequencer 616 after the cycle type, memory board address, and bank address signals have been received at the beginning of the cycle.

In the preferred embodiment, data transferred to or from memory array 600 is checked in each memory module 60 using an Error Detecting Code (EDC), which is preferably the same code required by memory controllers 70 and 75. The preferred code is a single bit correcting, double bit detecting, error correcting code (ECC).

During a memory write cycle, memory controller 70 transmits at least one longword of data on data bus 85 and simultaneously transmits a corresponding set of ECC signals on bus 80. Meanwhile, memory controller 75 transmits a second set of ECC signals, which also correspond to the longword on data bus 85, on bus 82.

As embodied herein, during a memory write cycle the data and the ECC signals for each longword are presented to the receivers of data transceivers/registers 620 and to the receivers of the transceivers/registers of designator 612. The data and the ECC signals, which are stable at least ten nanoseconds before the T4 transition and remain stable until fifteen nanoseconds after the T6 transition, are latched into these transceivers/registers. During this time period, memory controllers 70 and 75 do not provide address and control signals on the timeshared lines of buses 80 and 82.

The designated primary ECC signals received by designator 612 and the longword of data received by transceivers/registers 620 during the memory write cycle are provided to the data inputs of the DRAMs in each of the eight banks of memory array 600 and to ECC generator 623. The generated ECC is compared to the designated primary ECC by comparator 625. The designated primary ECC signals also are provided to ECC comparators 625, together with the designated mirror ECC signals.

As embodied herein, during a memory read cycle, at least one longword of data and a corresponding set of ECC signals are read from memory array 600 and respectively steered to data transceivers/registers 620 and to the transceivers/registers of designator 612. During transition T7 of the memory read cycle, the data and the ECC signals for each longword are available from memory array 600 and are latched into these transceivers/registers. The data is also presented to the ECC generator 623 and its output is compared to the ECC read from memory.

After latching, the data and the ECC signals are presented to data bus 85 and to buses 80 and 82 by the transmitters of data transceivers/registers 620 and by the transmitters of the transceivers/registers of designator 612. The same ECC signals are transmitted from the transceivers/registers in designator 612 to memory controller 70 and to memory controller 75. The data and the ECC signals transmitted on data bus 85 and on buses 80 and 82 are stable from fifteen nanoseconds after the T7 transition until five nanoseconds before the following T6 transition (in the case of a multi-longword transfer) or until five nanoseconds before the following T IDLE transition (in the case of a single longword transfer or the last longword of a multi-longword transfer). During this time period, memory controllers 70 and 75 do not provide address and control signals on the time-shared lines of buses 80 and 82. The transmitters of data transceivers/registers 620 and the transmitters of the transceivers/registers of designator 612 are set into their tristate mode during the following T IDLE transition.

Comparator 614 is provided to compare the address, control, and timing signals originating from controller 70 with the corresponding address, control, and timing signals originating from controller 75. The designated primary cycle timing signals, cycle type signals, memory board address signals, and bank address signals, together with the designated mirror cycle timing signals, cycle type signals, memory board address signals, bank address signals, row address signals, and column address signals, are provided from designator 612 to comparator 614. The designated primary row address signals and column address signals are provided from the outputs of drivers 630 to comparator 614. Both sets of signals are then compared.

Figure 6:
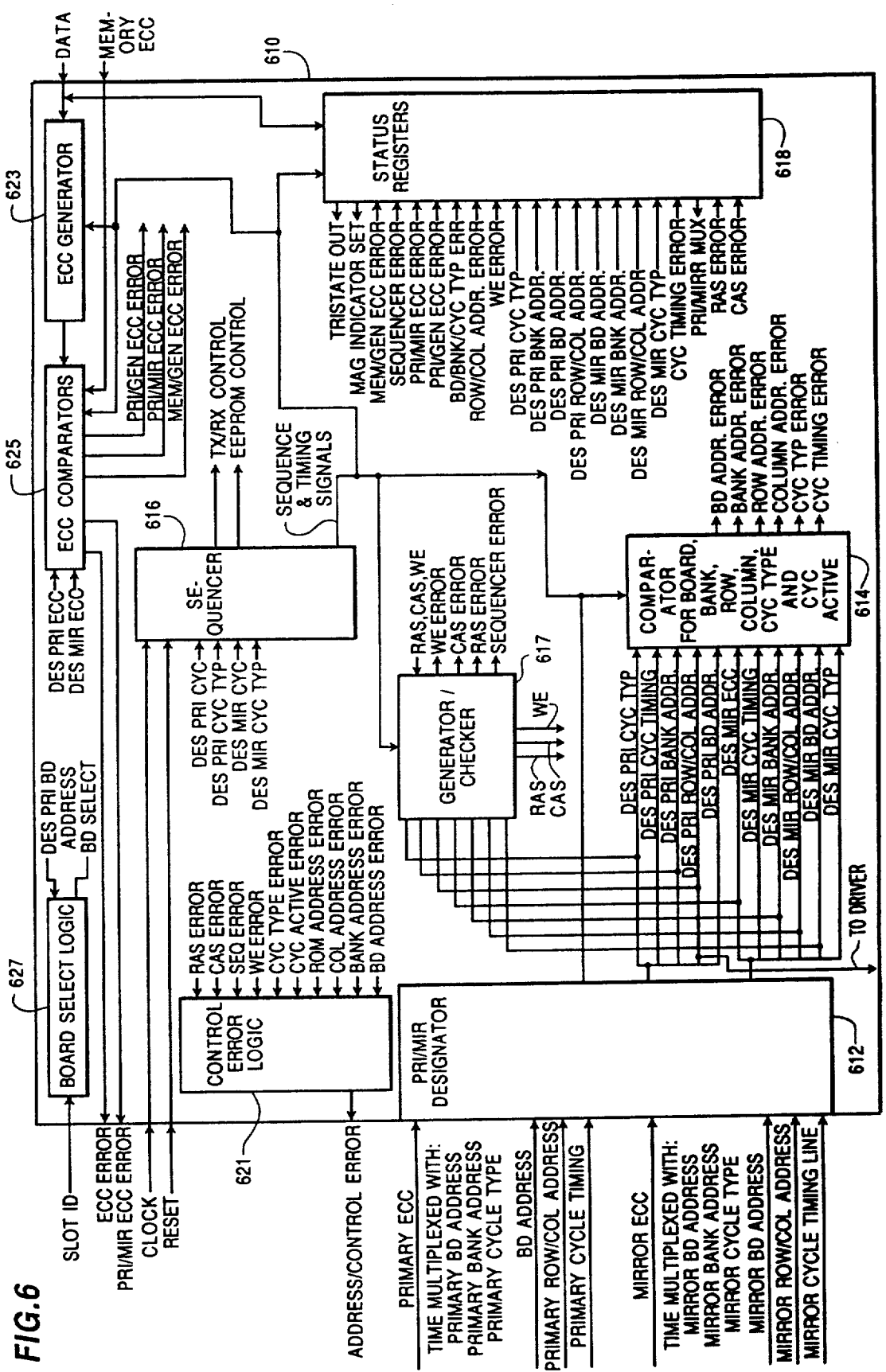
FIG. 6 is a detailed diagram of the elements of the control logic in the memory module shown in FIG. 5.

If there is a miscompare between any of the address, control, and timing signals originating from the memory controllers, comparator 614 generates an appropriate error signal. As shown in FIG. 6, board address error, bank address error, row address error, column address error, cycle type address error and cycle timing error signals may be output by the comparator.

Generator/checker 617 compares the primary control and timing signals generated by sequencer 616 and generator/checker 617 using the designated primary bank address, cycle type, and cycle timing signals with the mirror control and timing signals generated using the designated mirror bank address, cycle type, and cycle timing signals. The two sets of sequence timing signals are provided by sequencer 616 to generator/checker 617. The primary RAS, CAS, and WE signals are provided from the output s of drivers 630 to generator/checker 617. As indicated previously, the mirror RAS, CAS, and WE signals are generated internally by the generator/checker. Generator/checker 617 compares the primary RAS, CAS, WE and sequence timing signals to the mirror RAS, CAS, WE, and sequence timing signals.

If there is a miscompare between any of the control and timing signals originating from sequencer 616 or generator/checker 617, the generator/checker generates an appropriate error signal. As shown in FIG. 6, sequencer error, RAS error, CAS error, and WE error signals may be output by generator/checker 617.

Error signals are provided from comparator 614 and from generator/checker 617 to address/control error logic 621. In response to receipt of an error signal from comparator 614 or from generator/checker 617, address/control error logic 621 transmits an address/control error signal to CPU module 30 to indicate the detection of a fault due to a miscompare between any address, control, or timing signals. The address/control error signal is sent to error logic in memory controllers 70 and 75 for error handling. The transmission of the address/control error signal to CPU module 30 causes a CPU/MEM fault, which is discussed in greater detail in other sections.

The error signals from comparator 614 and from generator/checker 617 also are provided to status registers 618. In the status registers, the error and all of the address, control, timing, data, and ECC signals relevant to the fault are temporarily stored to enable error diagnosis and recovery.

In accordance with one aspect of the invention, only a single thirty-two bit data bus 85 is provided between CPU module 30 and memory module 60. Therefore, memory module 60 cannot compare two sets of data from memory controllers 70 and 75. However, data integrity is verified by memory module 60 without using a duplicate set of thirty-two data lines by checking the two separate sets of ECC signals that are transmitted by memory controllers 70 and 75 to memory module 60.

As shown in FIG. 6, control logic 610 includes ECC generator 623 and ECC comparators 625. The designated primary and mirror ECC signals are provided by designator 612 to the ECC comparators. During a memory write cycle, the designated primary ECC signals are compared to the designated mirror ECC signals. As a result, memory module 60 verifies whether memory controllers 70 and 75 are in agreement and whether the designated primary ECC signals being stored in the DRAMs of memory array 600 during the memory write cycle are correct. Furthermore, the data presented to the data inputs of the DRAMs during the memory write cycle is provided to ECC generator 623. ECC generator 623 produces a set of generated ECC signals that correspond to the data and provides the generated ECC signals to ECC comparators 625. The designated primary ECC signals are compared to the generated ECC signals to verify whether the data transmitted on data bus 85 by memory controller 70 is the same as the data being stored in the DRAMs of memory array 600.

During a memory read cycle, the data read from the selected bank of DRAMs is presented to the ECC generator. The generated ECC signals then are provided to the ECC comparators, which also receive stored ECC signals read from the selected bank of DRAMs. The generated and stored ECC signals are compared by ECC comparators 625.

If there is a miscompare between any of pairs of ECC signals monitored by ECC comparators 625, the ECC comparators generate an appropriate error signal. As shown in FIG. 6, primary/mirror ECC error, primary/generated ECC error, and memory/generated ECC error signals may be output by the ECC comparators.

These ECC error signals from ECC comparators 625 are provided to status registers 618. In the status registers, each of the ECC error signals and all of the address, control, timing, data, and ECC signals relevant to an ECC fault are temporarily stored to enable error diagnosis and recovery.

An ECC error signal is asserted by ECC comparators 625 on an ECC error line and transmitted to CPU module 30 to indicate the detection of an ECC fault due to a miscompare. The miscompare can occur during either of the two ECC checks performed during a memory write cycle, or during the single ECC check performed during a memory read cycle.

As shown in FIG. 6, board select logic 627 receives slot signals from a memory backplane. The slot signals specify a unique slot location for each memory module 60. Board select logic 627 then compares the slot signals with the designated primary board address signals transmitted from one of the memory controllers via designator circuit 612. A board selected signal is generated by board select logic 627 if the slot signals are the same as the designated primary board address signals, thereby enabling the other circuitry in control logic 610.

3. Memory Controller

Memory controllers 70 and 75 control the access of CPUs 40 and 50, respectively, to memory module 60, auxiliary memory elements and, in the preferred embodiment, perform certain error handling operations. The auxiliary memory elements coupled to memory controller 70 include system ROM 43, EEPROM 44, and scratch pad RAM 45. ROM 43 holds certain standard code, such as diagnostics, console drivers, and part of the bootstrap code. EEPROM 44 is used to hold information such as error information detected during the operation of CPU 40, which may need to be modified, but which should not be lost when power is removed. Scratch pad RAM 45 is used for certain operations performed by CPU 40 and to convert rail-unique information (e.g., information specific to conditions on one rail which is available to only one CPU 40 or 50) to zone information (e.g., information which can be accessed by both CPUs 40 and 50).

Equivalent elements 53, 54 and 55 are coupled to memory controller 75. System ROM 53, EEPROM 54, and scratch pad RAM 55 are the same as system ROM 43, EEPROM 44, and scratch pad RAM 45, respectively, and perform the same functions.

Figure 7:
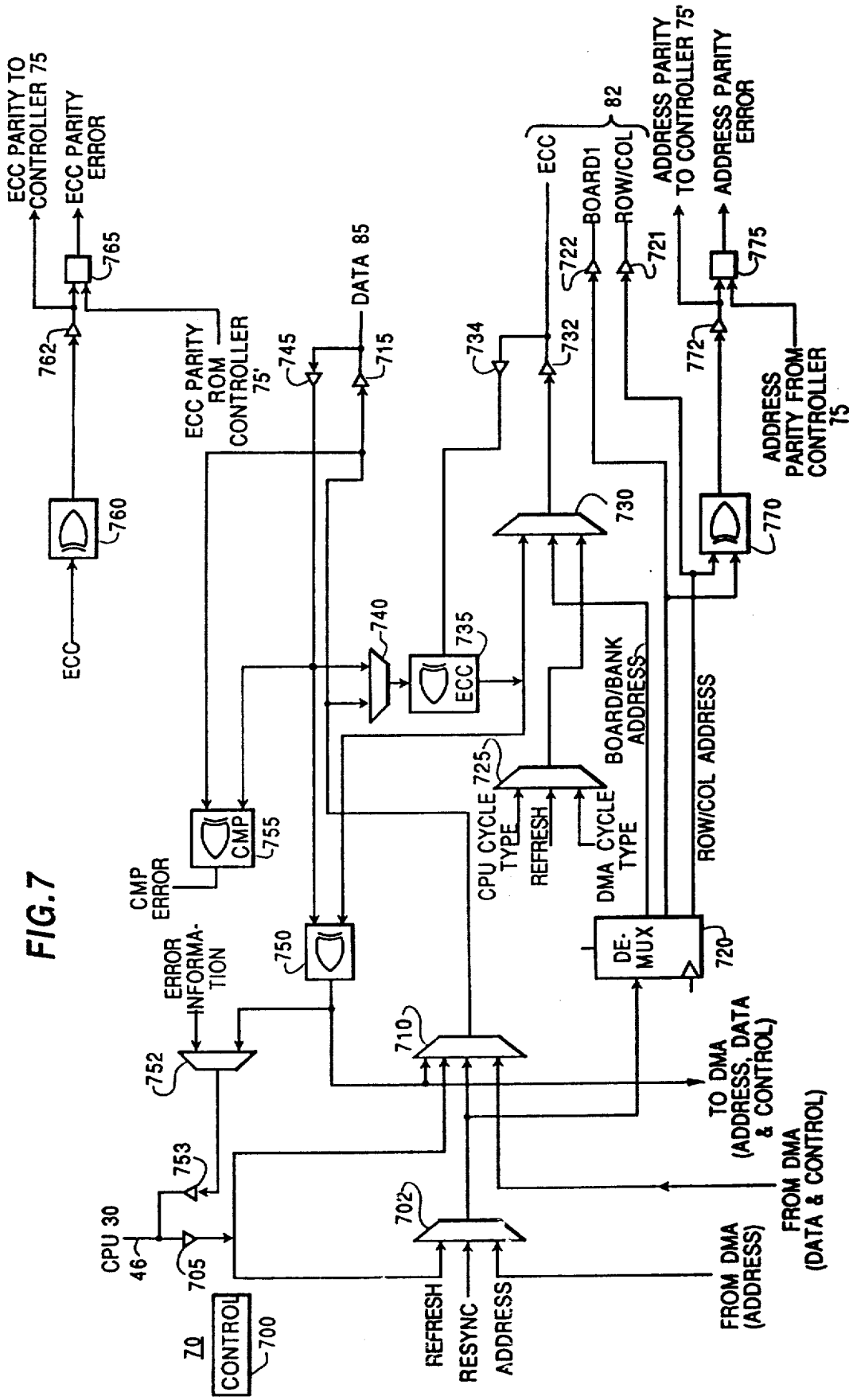
FIG. 7 is a block diagram of portions of the primary memory controller of the CPU module shown in FIG. 3.
Figure 8:
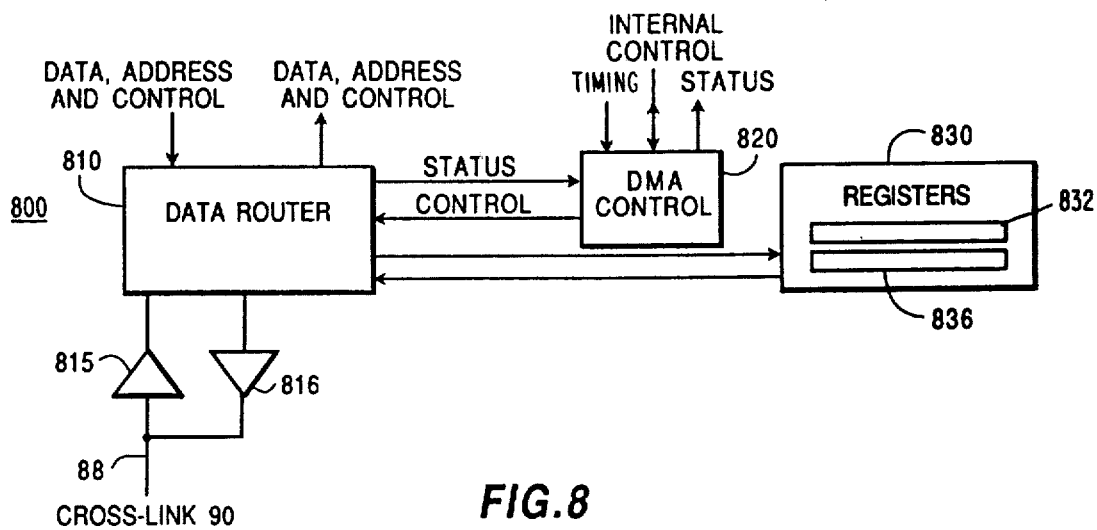
FIG. 8 is a block diagram of the DMA engine in the primary memory controller of the CPU module of FIG. 3.

The details of the preferred embodiment of primary memory controller 70 can be seen in FIGS. 7-9. Mirror memory controller 75 has the same elements as shown in FIGS. 7-9, but differs slightly in operation. Therefore, only primary memory controller 70's operation will be described, except where the operation of memory controller 75 differs. Memory controllers 70' and 75' in processing system 20' have the same elements and act the same as memory controllers 70 and 75, respectively.

The elements shown in FIG. 7 control the flow of data, addresses and signals through primary memory controller 70. Control logic 700 controls the state of the various elements in FIG. 7 according to the signals received by memory controller 70 and the state engine of that memory controller which is stored in control logic 700. Multiplexer 702 selects addresses from one of three sources. The addresses can either come from CPU 30 via receiver 705, from the DMA engine 800 described below in reference to FIG. 8, or from a refresh resync address line which is used to generate an artificial refresh during certain bulk memory transfers from one zone to another during resynchronization operations.

The output of multiplexer 702 is an input to multiplexer 710, as is data from CPU 30 received via receiver 705 and data from DMA engine 800. The output of multiplexer 710 provides data to memory module 60 via memory interconnect 85 and driver 715. Driver 715 is disabled for mirror memory control modules 75 and 75' because only one set of memory data is sent to memory modules 60 and 60', respectively.

The data sent to memory interconnect 85 includes either data to be stored in memory module 60 from CPU 30 or DMA engine 800. Data from CPU 30 and addresses from multiplexer 702 are also sent to DMA engine 800 via this path and also via receiver 745 and ECC corrector 750.

The addresses from multiplexer 702 also provide an input to demultiplexer 720 which divides the addresses into a row/column address portion, a board/bank address portion, and a single board bit. The twenty-two bits of the row/column address are multiplexed onto eleven lines. In the preferred embodiment, the twenty-two row/column address bits are sent to memory module 60 via drivers 721. The single board bit is preferably sent to memory module 60 via driver 722, and the other board/bank address bits are multiplexed with ECC signals.

Multiplexer 725 combines a normal refresh command for memory controller 70 along with cycle type information from CPU 30 (i.e., read, write, etc.) and DMA cycle type information. The normal refresh command and the refresh resync address both cause memory module 60 to initiate a memory refresh operation.

The output of multiplexer 725 is an input to multiplexer 730 along with the board/bank address from demultiplexer 720. Another input into multiplexer 730 is the output of ECC generator/checker 735. Multiplexer 730 selects one of the inputs and places it on the time-division multiplexed ECC/address lines to memory module 60. Multiplexer 730 allows those time-division multiplexed lines to carry board/bank address and additional control information as well as ECC information, although at different times.

ECC information is received from memory modules 60 via receiver 734 and is provided as an input to ECC generator/checker 735 to compare the ECC generated by memory module 60 with that generated by memory controller 70.

Another input into ECC generator/checker 735 is the output of multiplexer 740. Depending upon whether the memory transaction is a write transaction or a read transaction, multiplexer 740 receives as inputs the memory data sent to memory module 60 from multiplexer 710 or the memory data received from memory module 60 via receiver 745. Multiplexer 740 selects one of these sets of memory data to be the input to ECC generator/checker 735. Generator/checker 735 then generates the appropriate ECC code which, in addition to being sent to multiplexer 730, is also sent to ECC corrector 750. In the preferred embodiment, ECC corrector 750 corrects any single bit errors in the memory data received from memory module 60.

The corrected memory data from ECC checker 750 is then sent to the DMA engine shown in FIG. 8 as well as to multiplexer 752. The other input into multiplexer 752 is error information from the error handling logic described below in connection with FIG. 9. The output of multiplexer 752 is sent to CPU 30 via driver 753.

Comparator 755 compares the data sent from multiplexer 710 to memory module 60 with a copy of that data after it passes through driver 715 and receiver 745. This checking determines whether driver 715 and receiver 745 are operating correctly. The output of comparator 755 is a CMP error signal which indicates the presence or absence of such a comparison error. The CMP error feeds the error logic in FIG. 9.

Two other elements in FIG. 7 provide a different kind of error detection. Element 760 is a parity generator. ECC data, generated either by the memory controller 70 on data to be stored in memory module 60 or generated by memory module 60 on data read from memory module 60 is sent to a parity generator 760. The parity signal from generator 760 is sent, via driver 762, to comparator 765. Comparator 765 compares the ECC parity signal from generator 760 with an equivalent ECC parity signal generated by controller 75'.

Parity generator 770 performs the same type of a check on the row/column and single bit board address signals received from demultiplexer 720. The address parity signal from parity generator 770 is transmitted by a driver 772 to a comparator 775 which also receives an address parity signal from controller 75. The outputs of comparator 765 and 775 are parity error signals which feed the error logic in FIG. 9.

FIG. 8 shows the fundamentals of a DMA engine 800. In the preferred embodiment, DMA engine 800 resides in memory controller 70, but there is no requirement for such placement. As shown in FIG. 8, DMA engine 800 includes a data router 810, a DMA control 820, and DMA registers 830. Driver 815 and receiver 816 provide an interface between memory controller 70 and cross-link 90.

DMA control 820 receives internal control signals from control logic 700 and, in response, sends control signals to place data router 810 into the appropriate configuration. Control 820 also causes data router 810 to set its configuration to route data and control signals from cross-link 90 to the memory control 70 circuitry shown in FIG. 7. Data router 810 sends its status signals to DMA control 820 which relays such signals, along with other DMA information, to error logic in FIG. 9.

Registers 830 includes a DMA byte counter register 832 and a DMA address register 836. These registers are set to initial values by CPU 40 via router 810. Then, during DMA cycles, control 820 causes, via router 810, the counter register 832 to increment and address register 836 to decrement. Control 820 also causes the contents of address registers 836 to be sent to memory module 60 through router 810 and the circuitry in FIG. 7 during DMA operations.

As explained above, in the preferred embodiment of this invention, the memory controllers 70, 75, 70' and 75' also perform certain fundamental error operations. An example of the preferred embodiment of the hardware to perform such error operations are shown in FIG. 9.

As shown in FIG. 9, certain memory controller internal signals, such as timeout, ECC error and bus miscompare, are inputs into diagnostic error logic 870, as are certain external signals such as rail error, firewall miscompare, and address/control error. In the preferred embodiment, diagnostic error logic 870 receives error signals from the other components of system 10 via cross-links 90 and 95.

Diagnostic error logic 870 forms error pulses from the error signals and from a control pulse signal generated from the basic timing of memory controller 70. The error pulses generated by diagnostic error logic 870 contain certain error information which is stored into appropriate locations in a diagnostic error register 880 in accordance with certain timing signals. System fault error address register 865 stores the address in memory module 60 which CPUs 40 and 50 were communicating with when an error occurred.

The error pulses from diagnostic error logic 870 are also sent to error categorization logic 850 which also receives information from CPU 30 indicating the cycle type (e.g., read, write, etc.). From that information and the error pulses, error categorization logic 850 determines the presence of CPU/I/O errors, DMA errors, or CPU/MEM faults.

A CPU/I/O error is an error on an operation that is directly attributable to a CPU/I/O cycle on bus 46 and may be hardware recoverable, as explained below in regard to resets. DMA errors are errors that occur during a DMA cycle and, in the preferred embodiment, are handled principally by software. CPU/MEM faults are errors that for which the correct operation of CPU or the contents of memory cannot be guaranteed. The outputs from error categorization logic 850 are sent to encoder 855 which forms a specific error code. This error code is then sent to cross-links 90 and 95 via AND gate 856 when the error disable signal is not present.

After receiving the error codes, cross-links 90, 95, 90' and 95' send a retry request signal back to the memory controllers. As shown in FIG. 9, an encoder 895 in memory controller 70 receives the retry request signal along with cycle type information and the error signals (collectively shown as cycle qualifiers). Encoder 895 then generates an appropriate error code for storage in a system fault error register 898.

System fault error register 898 does not store the same information as diagnostic error register 880. Unlike the system fault error register 898, the diagnostic error register 880 only contains rail unique information, such as an error on one input from a cross-link rail, and zone unique data, such as an uncorrectable ECC error in memory module 60.

System fault error register 898 also contains several bits which are used for error handling. These include a NXM bit indicating that a desired memory location is missing, a NXIO bit indicating that a desired I/O location is missing, a solid fault bit and a transient bit. The transient and solid bits together indicate the fault level. The transient bit also causes system fault error address register 865 to freeze.

Memory controller status register 875, although technically not part of the error logic, is shown in FIG. 9 also. Register 875 stores certain status information such as a DMA ratio code in DMA ratio portion 877, an error disable code in error disable portion 878, and a mirror bus driver enable code in mirror bus driver enable portion 876. The DMA ratio code specifies the fraction of memory bandwidth which can be allotted to DMA. The error disable code provides a signal for disabling AND gate 856 and thus the error code. The mirror bus driver enable code provides a signal for enabling the mirror bus drivers for certain data transactions.

4. Cross-link

Data for memory resync, DMA and I/O operations pass through cross-links 90 and 95. Generally, cross-links 90 and 95 provide communications between CPU module 30, CPU module 30', I/O modules 100, 110, 120, and I/O modules 100', 110', 120' (see FIG. 1).

Figure 10A:
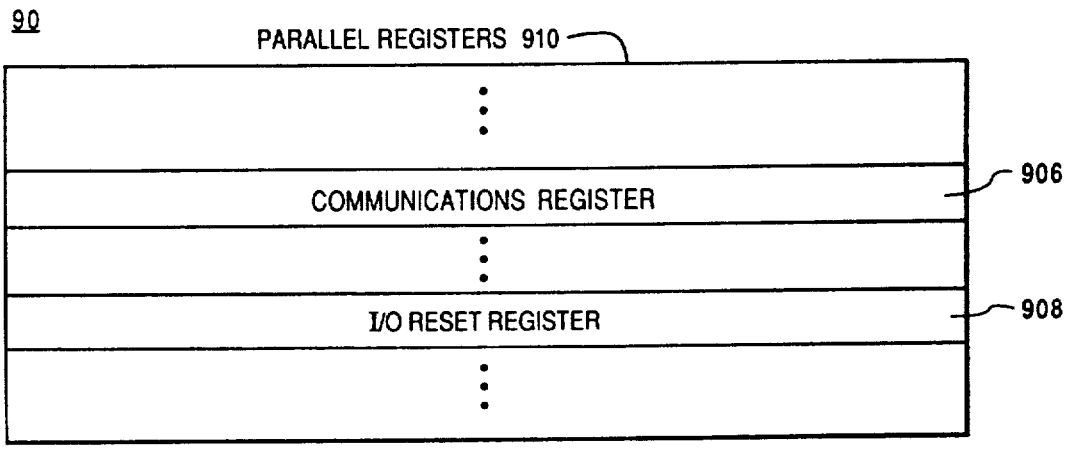
FIGS. 10A and 10B are a drawing of some of the registers of the cross-link in the CPU module shown in FIG. 3.
Figure 10B:
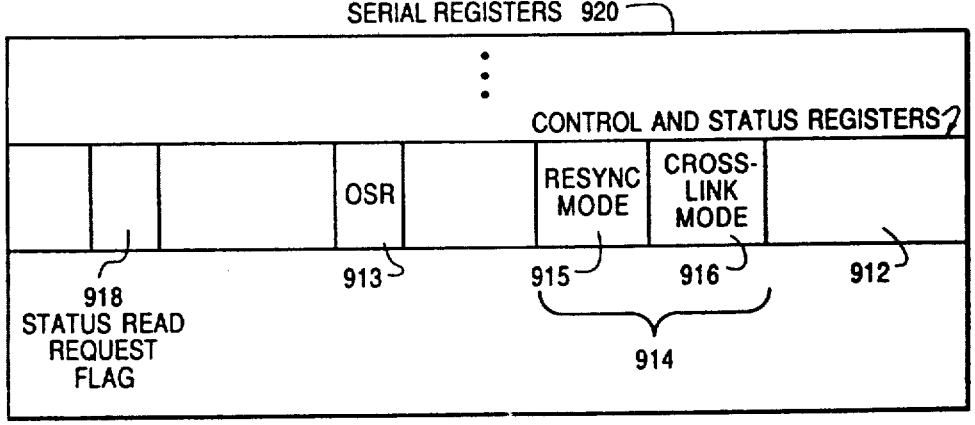

Cross-links 90 and 95 contain both parallel registers 910 and serial registers 920 as shown in FIG. 10. Both types of registers are used for interprocessor communication in the preferred embodiment of this invention. During normal operation, processing systems 20 and 20' are synchronized and data is exchanged in parallel between processing systems 20 and 20' using parallel registers 910 in cross-links 90/95 and 90'/95', respectively. When processing systems 20 and 20' are not synchronized, most notably during bootstrapping, data is exchanged between cross-links by way of serial registers 920.

The addresses of the parallel registers are in I/O space as opposed to memory space. Memory space refers to locations in memory module 60. I/O space refers to locations such as I/O and internal system registers, which are not in memory module 60.

Within I/O space, addresses can either be in system address space or zone address space. The term "system address space" refers to addresses that are accessible throughout the entire system 10, and thus by both processing systems 20 and 20'. The term "zone address space" refers to addresses which are accessible only by the zone containing the particular cross-link.

The parallel registers shown in FIG. 10 include a communications register 906 and an I/O reset register 908. Communications register 906 contains unique data to be exchanged between zones. Such data is usually zone-unique, such as a memory soft error (it is almost beyond the realm of probability that memory modules 60 and 60' would independently experience the same error at the same time). Because the data to be stored into register 906 is unique, the address of communications register 906 for purposes of writing must be in zone address space. Otherwise, processing systems 20 and 20', because they are in lockstep synchronization and executing the same series of instruction at substantially the same time, could not store zone unique data into only the communications registers 906 in zone 11; they would have to store that same data into the communications registers 906' (not shown) in zone 11'.

The address of communications register 906 for reading, however, is in system address space. Thus, during synchronous operation, both zones can simultaneously read the communications register from one zone and then simultaneously read the communications register from the other zone.

I/O reset register 908 resides in system address space. The I/O reset register includes one bit per I/O module to indicate whether the corresponding module is in a reset state. When an I/O module is in a reset state, it is effectively disabled.

Parallel registers 910 also include other registers, but an understanding of those other registers is not necessary to an understanding of the present invention.

All of the serial cross-link registers 920 are in the zone specific space since they are used either for asynchronous communication or contain only zone specific information. The purpose of the serial cross-link registers and the serial cross-link is to allow processors 20 and 20' to communicate even though they are not running in lockstep synchronization (i.e., phase-locked clocks and same memory states). In the preferred embodiment, there are several serial registers, but they need not be described to understand this invention.

Control and status register 912 is a serial register which contains status and control flags. One of the flags is an OSR bit 913 which is used for bootstrapping and indicates whether the processing system in the corresponding zone has already begun its bootstrapping process or whether the operating system for that zone is currently running, either because its bootstrapping process has completed, or because it underwent a resynchronization.

Control and status register 912 also contain the mode bits 914 for identifying the current mode of cross-link 90 and thus of processing system 20. Preferably mode bits include resync mode bits 915 and cross-link mode bits 916. Resync mode bits 915 identify cross-link 90 as being either in resync slave or resync master mode. The cross-link mode bits 916 identify cross-link 90 as being either in cross-link off, duplex, cross-link master, or cross-link slave mode.

One of the uses for the serial registers is a status read operation which allows the cross-link in one zone to read the status of the other zone's cross-link. Setting a status read request flag 918 in serial control and status register 912 sends a request for status information to cross-link 90'. Upon receipt of this message, cross-link 90' sends the contents of its serial control and status register 912' back to cross-link 90.

Figure 11:
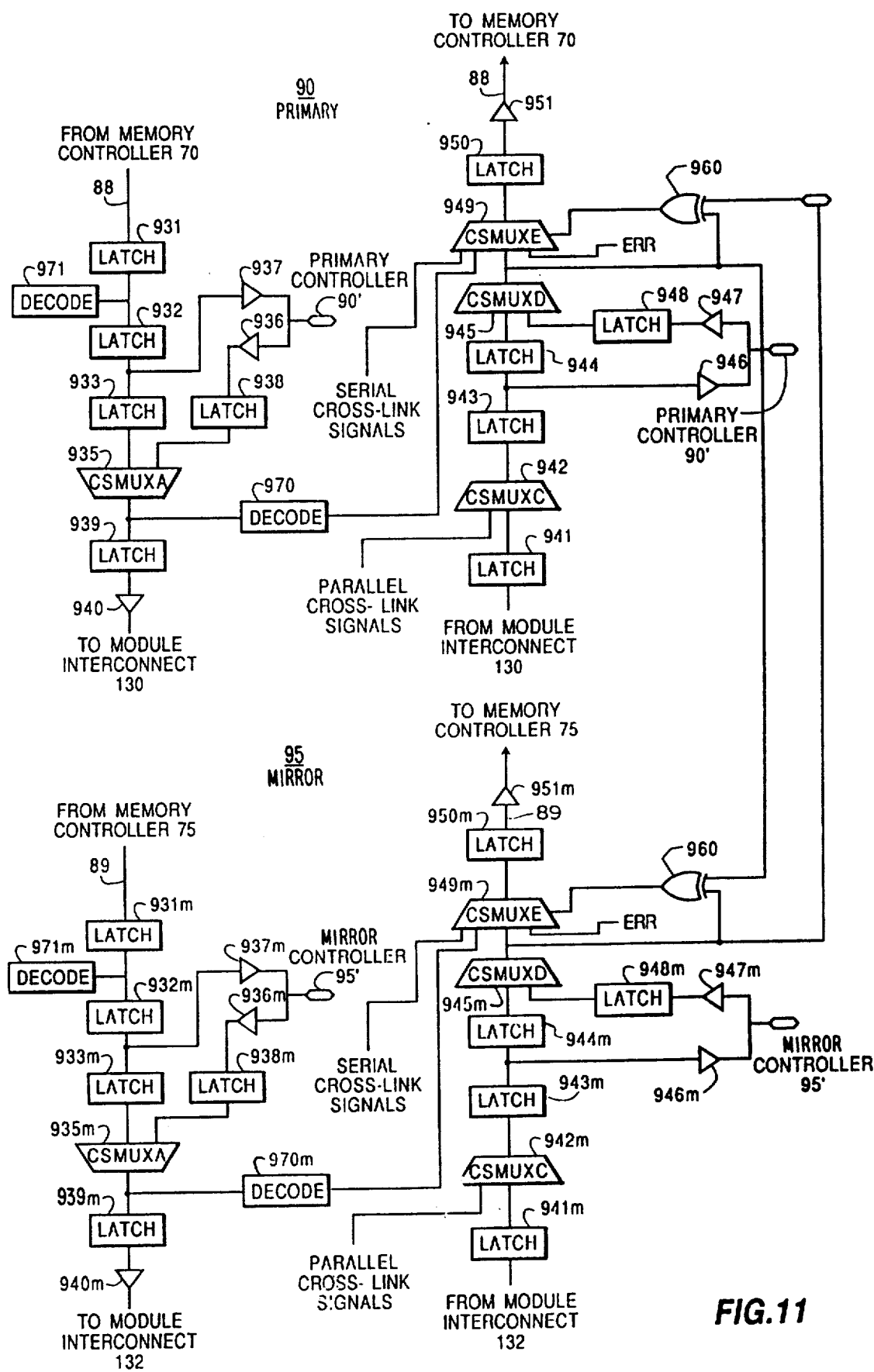
FIG. 11 is a block diagram of the elements which route control signals in the cross-links of the CPU module shown in FIG. 3.

FIG. 11 shows some of the elements for routing control and status signals (referred to as "control codes") in primary cross-link 90 and mirror cross-link 95. Corresponding cross-link elements exist in the preferred embodiment within cross-links 90' and 95'. These codes are sent between the memory controllers 70 and 75 and the I/O modules coupled to module interconnects 130, 132, 130' and 132'.

Figure 12:
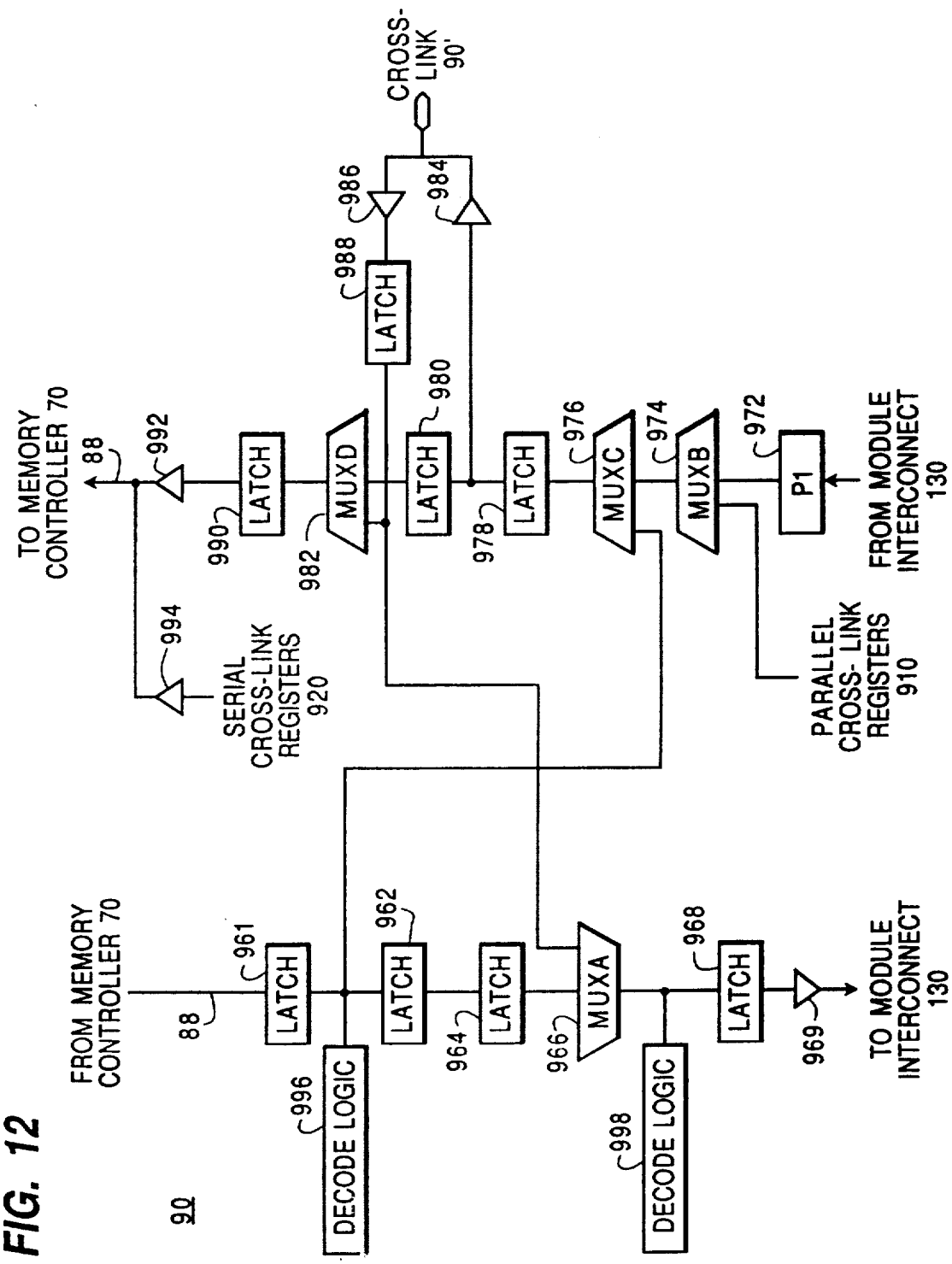
FIG. 12 is a block diagram of the elements which route data and address signals in the primary cross-link of the CPU module shown in FIG. 3.

FIG. 12 shows the elements in the preferred embodiment of primary cross-link 90 which are used for routing data and address signals. Corresponding cross-link elements exist in cross-links 95, 90' and 95'.

In FIG. 11, the elements for both the primary cross-link 90 and mirror cross-link 95 in processing system 20 are shown, although the hardware is identical, because of an important interconnection between the elements. The circuit elements in mirror cross-link 95 which are equivalent to elements in primary cross-link 90 are shown by the same number, except in the mirror controller the letter "m" is placed after the number.

With reference to FIGS. 11 and 12, the elements include latches, multiplexers, drivers and receivers. Some of the latches, such as latches 933 and 933m, act as delay elements to ensure the proper timing through the cross-links and thereby maintain synchronization. As shown in FIG. 11, control codes from memory controller 70 are sent via bus 88 to latch 931 and then to latch 932. The reason for such latching is to provide appropriate delays to ensure that data from memory controller 70 passes through cross-link 90 simultaneously with data from memory controller 70'.

If codes from memory controller 70 are to be sent to processing system 20' via cross-link 90', then driver 937 is enabled. The control codes from memory controller 70 also pass through latch 933 and into multiplexer CSMUXA 935. If control codes are received into primary cross-link 90 from cross-link 90', then their path is through receiver 936 into latch 938 and also into multiplexer 935.

Control codes to multiplexer 935 determine the source of data, that is either from memory controller 70 or from memory controller 70', and place those codes on the output of multiplexer 935. That output is stored in latch 939, again for proper delay purposes, and driver 940 is enabled if the codes are to be sent to module interconnect 130.

The path for data and address signals, as shown in FIG. 12 is somewhat similar to the path of control signals shown in FIG. 11. The differences reflect the fact that during any one transaction, data and addresses are flowing in only one direction through cross-links 90 and 95, but control signals can be flowing in both directions during that transaction. For that same reason the data lines in busses 88 and 89 are bidirectional, but the control codes are not.

Data and addresses from the memory controller 70, via bus 88, enter latch 961, then latch 962, and then latch 964. As in FIG. 11, the latches in FIG. 12 provide proper timing to maintain synchronization. Data from memory controller 70' is buffered by receiver 986, stored in latch 988, and then routed to the input of multiplexer MUXA 966. The output of multiplexer 966 is stored in latch 968 and, if driver 969 is enabled, is sent to module interconnect 130.

The path for control codes to be sent to memory controller 70 is shown in FIG. 11. Codes from module interconnect 130 are first stored in latch 941 and then presented to multiplexer CSMUXC 942. Multiplexer 942 also receives control codes from parallel cross-link registers 910 and selects either the parallel register codes or the codes from latch 941 for transmission to latch 943. If those control codes are to be transmitted to cross-link 90', then driver 946 is enabled. Control codes from cross-link 90' (and thus from memory controller 70') are buffered by receiver 947, stored in latch 948, and presented as an input to multiplexer CSMUXD 945. CSMUXD 945 also receives as an input the output of latch 944 which stores the contents of latch 943.

Multiplexer 945 selects either the codes from module interconnect 130 or from cross-link 90' and presents those signals as an input to multiplexer CSMUXE 949. Multiplexer 949 also receives as inputs a code from the decode logic 970 (for bulk memory transfers that occur during resynchronization), codes from the serial cross-link registers 920, or a predetermined error code ERR. Multiplexer 949 then selects ones of those inputs, under the appropriate control, for storage in latch 950. If those codes are to be sent to memory controller 70, then driver 951 is activated.

The purpose of the error code ERR, which is an input into multiplexer 949, is to ensure that an error in one of the rails will not cause the CPUs in the same zone as the rails to process different information. If this occurred, CPU module 30 would detect a fault which would cause drastic, and perhaps unnecessary action. To avoid this, cross-link 90 contains an EXCLUSIVE OR gate 960 which compares the outputs of multiplexers 945 and 945m. If they differ, then gate 960 causes multiplexer 949 to select the ERR code. EXCLUSIVE OR gate 960m similarly causes multiplexer 949m also to select an ERR code. This code indicates to memory controllers 70 and 75 that there has been an error, but avoids causing a CPU module error. The single rail interface to memory module 60 accomplishes the same result for data and addresses.

The data and address flow shown in FIG. 12 is similar to the flow of control signals in FIG. 11. Data and addresses from module interconnect 130 are stored in latch 972 and then provided as an input to multiplexer MUXB 974. Data from the parallel registers 910 provide another input to multiplexer 974. The output of multiplexer 974 is an input to multiplexer MUXC 976 which also receives data and addresses stored in latch 961 that were originally sent from memory controller 70. Multiplexer 976 then selects one of the inputs for storage in latch 978. If the data and addresses, either from the module interconnect 130 or from the memory controller 70, are to be sent to cross-link 90', then driver 984 is enabled.

Data from cross-link 90' is buffered by receiver 986 and stored in latch 988, which also provides an input to multiplexer MUXD 982. The other input of multiplexer MUXD 982 is the output of latch 980 which contains data and addresses from latch 978. Multiplexer 982 then selects one of its inputs which is then stored into latch 990. If the data or addresses are to be sent to memory controller 70, then driver 992 is activated. Data from serial registers 920 are sent to memory controller 70 via driver 994.

The data routing in cross-link 90, and more particularly the control elements in both FIGS. 11 and 12, is controlled by several signals generated by decode logic 970, decode logic 971, decode logic 996, and decode logic 998. This logic provides the signals which control multiplexers 935, 942, 945, 949, 966, 974, 976, and 982 to select the appropriate input source. In addition, the decode logic also controls drivers 940, 946, 951, 969, 984, 992, and 994.

Most of the control signals are generated by decode logic 998, but some are generated by decode logic 970, 971, 970m, 971m, and 996. Decode logic 998, 970 and 970m are connected at positions that will ensure that the logic will receive the data and codes necessary for control whether the data and codes are received from its own zone or from other zone.

The purpose of decode logic 971, 971m and 996 is to ensure that the drivers 937, 937m and 984 are set into the proper state. This "early decode" makes sure that data addresses and codes will be forwarded to the proper cross-links in all cases. Without such early decode logic, the cross-links could all be in a state with their drivers disabled. If one at the memory controllers were also disabled, then its cross-links would never receive addresses, data and control codes, effectively disabling all the I/O modules connected to that cross-link.

Prior to describing the driver control signals generated by decode logic 970, 971, 970m, 971m, and 998, it is necessary to understand the different modes that these zones, and therefore the cross-links 90 and 95, can be in. FIG. 13 contains a diagram of the different states A-F, and a table explaining the states which correspond to each mode.

At start-up and in other instances, both zones are in state A which is known as the OFF mode for both zones. In that mode, the computer systems in both zones are operating independently. After one of the zones' operating system requests the ability to communicate with the I/O of the other zone, and that request is honored, then the zones enter the master/slave mode, shown as states B and C. In such modes, the zone which is the master, has an operating CPU and has control of the I/O modules of its zone and of the other zone.

Upon initiation of resynchronization, the computer system leaves the master/slave modes, either states B or C, and enters a resync slave/resync master mode, which is shown as states E and F. In those modes, the zone that was the master zone is in charge of bringing the CPU of the other zone on line. If the resynchronization fails, the zones revert to the same master/slave mode that they were in prior to the resynchronization attempt.

If the resynchronization is successful, however, then the zones enter state D, which is the full duplex mode. In this mode, both zones are operating together in lock-step synchronization. Operation continues in this mode until there is a CPU/MEM fault, in which case the system enters one of the two master/slave modes. The slave is the zone whose processor experienced the CPU/MEM fault.

When operating in state D, the full duplex mode, certain errors, most notably clock phase errors, necessitate splitting the system into two independent processing systems. This causes system 10 to go back into state A.

Decode logic 970, 970m, 971, 971m, and 998 (collectively referred to as the cross-link control logic), which are shown in FIGS. 11 and 12, have access to the resync mode bits 915 and the cross-link mode bits 916, which are shown in FIG. 10, in order to determine how to set the cross-link drivers and multiplexers into the proper states. In addition, the cross-link decode logic also receives and analyzes a portion of an address sent from memory controllers 70 and 75 during data transactions to extract addressing information that further indicates to the cross-link decode logic how to set the state of the cross-link multiplexers and drivers. The information needed to set the states of the multiplexers is fairly straightforward once the different modes and transactions are understood. The only determination to be made is the source of the data. Thus when cross-links 90 and 95 are in the slave mode, multiplexers 935, 935m, and 966 will select data addresses and codes from zone 11'. Those multiplexers will also select data, addresses and codes from the other zone if cross-links 90 and 95 are in full duplex mode, the address of an I/O instruction is for a device connected to an I/O module in zone 11, and the cross-link with the affected multiplexer is in a cross-over mode. In a cross-over mode, the data to be sent on the module interconnect is to be received from the other zone for checking. In the preferred embodiment, module interconnect 130 would receive data, addresses and codes from the primary rail in zone 11 and module interconnect would receive data, addresses and codes from the mirror rail in zone 11'. Alternatively, module interconnect 132 could receive data, addresses and codes from the primary rail in zone 11' which would allow the primary rail of one zone to be compared with the mirror rail of the other zone.

Multiplexers 945, 945m, and 982 will be set to accept data, address and codes from whichever zone is the source of the data. This is true both when all the cross-links are in full duplex mode and the data, address and codes are received from I/O modules and when the cross-link is in a resync slave mode and the data, address and codes are received from the memory controllers of the other zone.

If the addressing information from memory controllers 70 and 75 indicates that the source of response data and codes is the cross-link's own parallel registers 910, then multiplexers 942, 942m, and 974 are set to select data and codes from those registers. Similarly, if the addressing information from memory controllers 70 and 75 indicates that the source of response data is the cross-link's own serial register 920, then multiplexers 949 and 949m are set to select data and codes from those registers.

Multiplexers 949 and 949m are also set to select data from decode logic 970 and 970m, respectively, if the information is a control code during memory resync operations, and to select the ERR code if the EXCLUSIVE OR gates 960 and 960m identify a miscompare between the data transmitted via cross-links 90 and 95. In this latter case, the control of the multiplexers 949 and 949m is generated from the EXCLUSIVE OR gates 960 and 960m rather than from the cross-link control logic. Multiplexers 949 and 949m also select codes from serial cross-link registers 910 when those registers are requested or the output of multiplexers 945 and 945m when those codes are requested. Multiplexers 945 and 945m select either the outputs from multiplexers 942 and 942m, respectively, or I/O codes from cross-links 90' and 95', respectively.

Multiplexer 976 selects either data and addresses from module interconnect 130 in the case of a transaction with an I/O module, or data and addresses from memory controller 90 when the data and addresses are to be sent to cross-link 90' either for I/O or during memory resynchronization.

Drivers 937 and 937m are activated when cross-links 90 and 95 are in duplex, master or resync master modes. Drivers 940 and 940m are activated for I/O transactions in zone 11. Drivers 946 and 946m are activated when cross-links 90 and 95 are in the duplex or slave modes. Drivers 951 and 951m are always activated.

Driver 969 is activated during I/O writes to zone 11. Driver 984 is activated when cross-link 90 is sending data and addresses to I/O in zone 11', or when cross-link 90 is in the resync master mode. Receiver 986 receives data from cross-link 90'. Drivers 992 and 994 are activated when data is being sent to memory controller 70; driver 994 is activated when the contents of the serial cross-link register 910 are read and driver 992 is activated during all other reads.

5. Oscillator

When both processing systems 20 and 20' are each performing the same functions in the full duplex mode, it is imperative that CPU modules 30 and 30' perform operations at the same rate. Otherwise, massive amounts of processing time will be consumed in resynchronizing processing systems 20 and 20' for I/O and interprocessor error checking. In the preferred embodiment of processing systems 20 and 20', their basic clock signals are synchronized and phase-locked to each other. The fault tolerant computing system 10 includes a timing system to control the frequency of the clock signals to processing systems 20 and 20' and to minimize the phase difference between the clock signals for each processing system.

Figure 14:
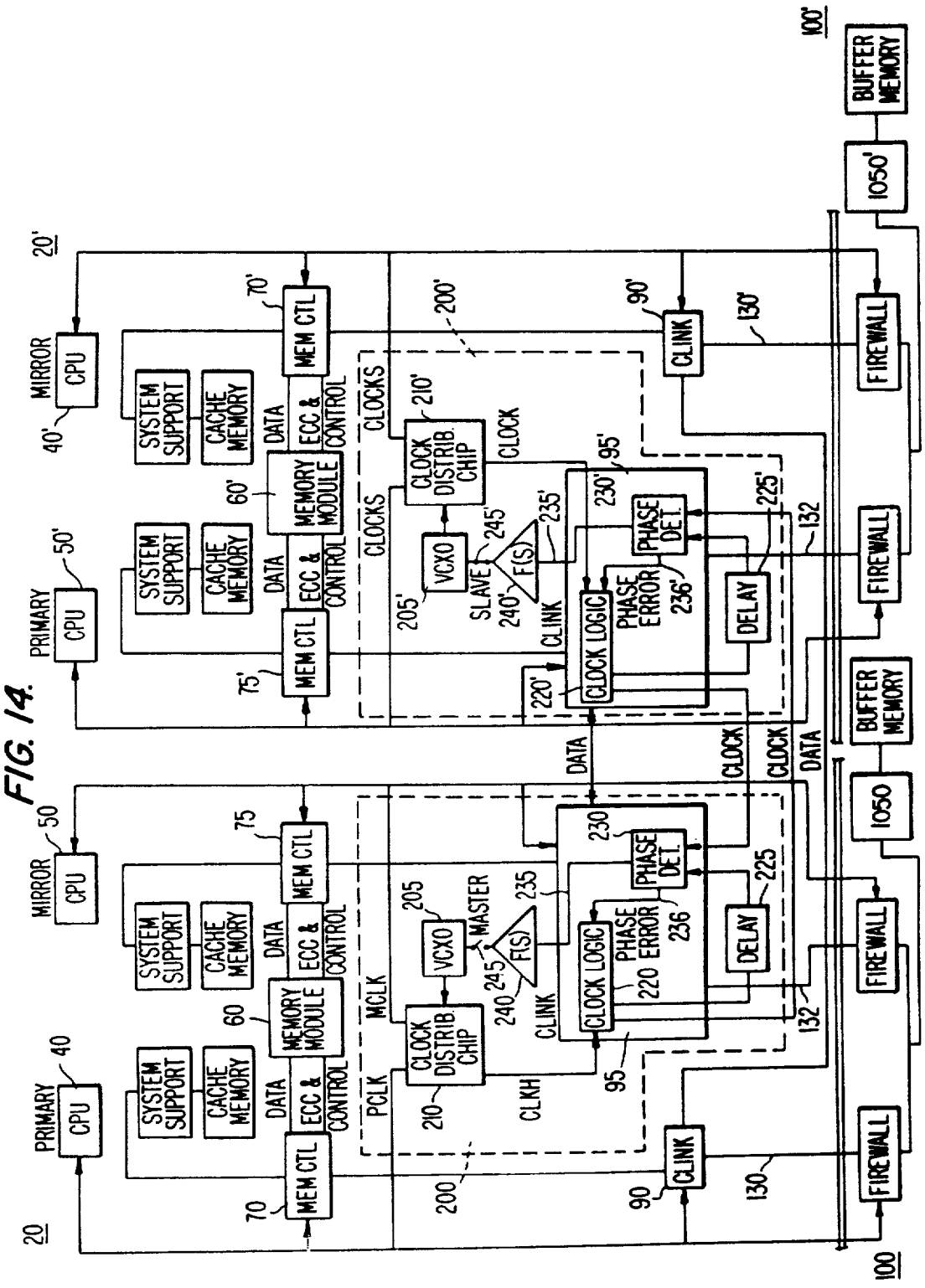
FIG. 14 is a block diagram of the timing system for the fault tolerant computer system of FIG. 1.

FIG. 14 shows a block diagram of the timing system of this invention embedded in processing systems 20 and 20'. The timing system comprises oscillator system 200 in CPU module 30 of processing system 20, and oscillator system 200' in CPU module 30' of processing system 20'. The elements of oscillator 200' are equivalent to those for oscillator 200 and both oscillator systems, operation is the same. Thus, only the elements and operation of oscillator system 200 will be described, except if the operations of oscillator systems 200 and 200' differ.

As FIG. 14 shows, much of oscillator system 200, specifically the digital logic, lies inside of cross-link 95, but that placement is not required for the present invention. Oscillator system 200 includes a voltage-controlled crystal oscillator (VCXO) 205 which generates a basic oscillator signal preferably at 66.66 MHz. The frequency of VCXO 205 can be adjusted by the voltage level at the input.

Figure 15:
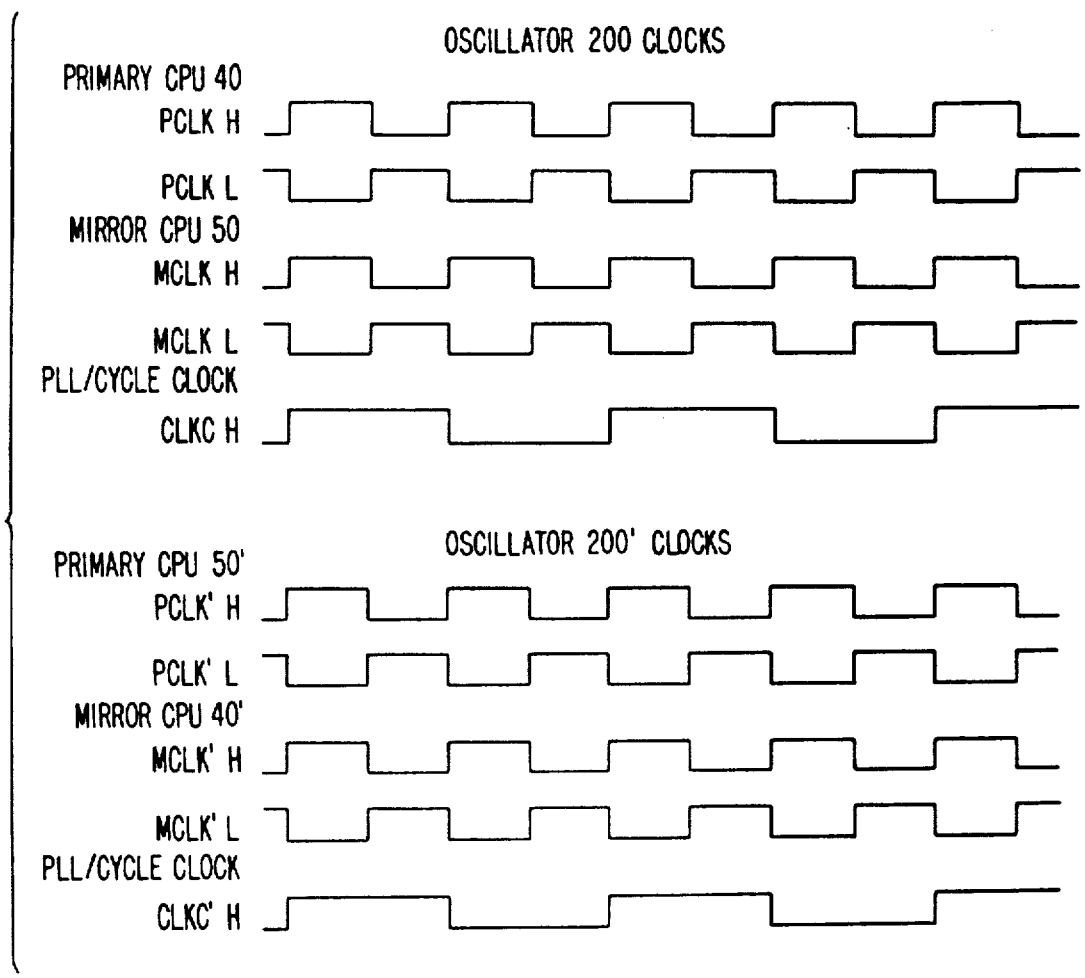
FIG. 15 is a timing diagram for the clock signals generated by the timing system in FIG. 14.

Clock distribution chip 210 divides down the basic oscillator signal and preferably produces four primary clocks all having the same frequency. For primary CPU 40 the clocks are PCLK L and PCLK H, which are logical inverses of each other. For mirror CPU 50, clock distribution chip 210 produces clock signals MCLK L and MCLK H, which are also logical inverses of each other. The timing and phase relationship of these clock signals are shown in FIG. 15. Preferably, frequency of clock signals PCLK L, PCLK H, MCLK L, and MCLK H is about 33.33 MHz. Clock chip 210 also produces a phase-locked loop signal CLKC H at 16.66 MHz, also shown in FIG. 15. This phase locked loop signal is sent to clock logic 220 which buffers that signal.

Clock logic buffer 220 sends the CLKC H signal to oscillator 200' for use in synchronization. Clock logic buffer 220' in oscillator 200' sends its own buffered phase-locked loop signal CLKC' H to phase detector 230 in oscillator 200. Phase detector 230 also receives the buffered phase locked loop signal CLKC H from clock logic 220 through delay element 225. Delay element 225 approximates the delay due to the cable run from clock logic buffer 220'.

Phase detector 230 compares its input phase locked loop signals and generates two outputs. One is a phase differences signal 235 which is sent through loop amplifier 240 to the voltage input of VCXO 205. Phase differences signal 235 will cause amplifier 240 to generate a signal to alter the frequency of VCXO 205 to compensate for phase differences.

The other output of phase detector 230 is a phase error signal 236 which indicates possible synchronism faults.

Figure 16:
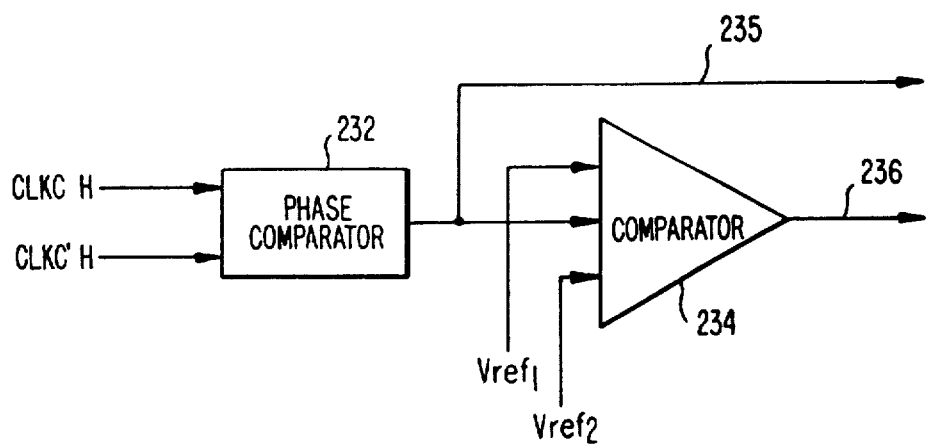
FIG. 16 is a detailed diagram of a phase detector for the timing system shown in FIG. 14.

FIG. 16 is a detailed diagram of phase detector 230. Phase detector 230 includes a phase comparator 232 and a voltage comparator 234. Phase comparator 232 receives the clock signal from delay element 225 (CLKC H) and the phase lock loop clock signal from oscillator 200' (CLKC' H) and generates phase differences signal 235 as a voltage level representing the phase difference of those signals.

If processing system 20 were the "slave" for purposes of clock synchronization, switch 245 would be in the "SLAVE" position (i.e., closed) and the voltage level 235, after being amplified by loop amplifier 240, would control the frequency of VCXO 205. If both switches 245 and 245' are in the "master" position, processing systems 20 and 20' would not be phase-locked and would be running asynchronously (independently).

The voltage level of phase differences signal 235 is also an input to voltage comparator 234 as are two reference voltages, $V_{ref1}$ and $V_{ref2}$, representing acceptable ranges of phase lead and lag. If the phase difference is within tolerance, the PHASE ERROR signal will not be activated. If the phase difference is out of tolerance, then the PHASE ERROR signal 236 will be activated and sent to cross-link 95 via clock decoder 220.

6. I/O Module

Figure 17:
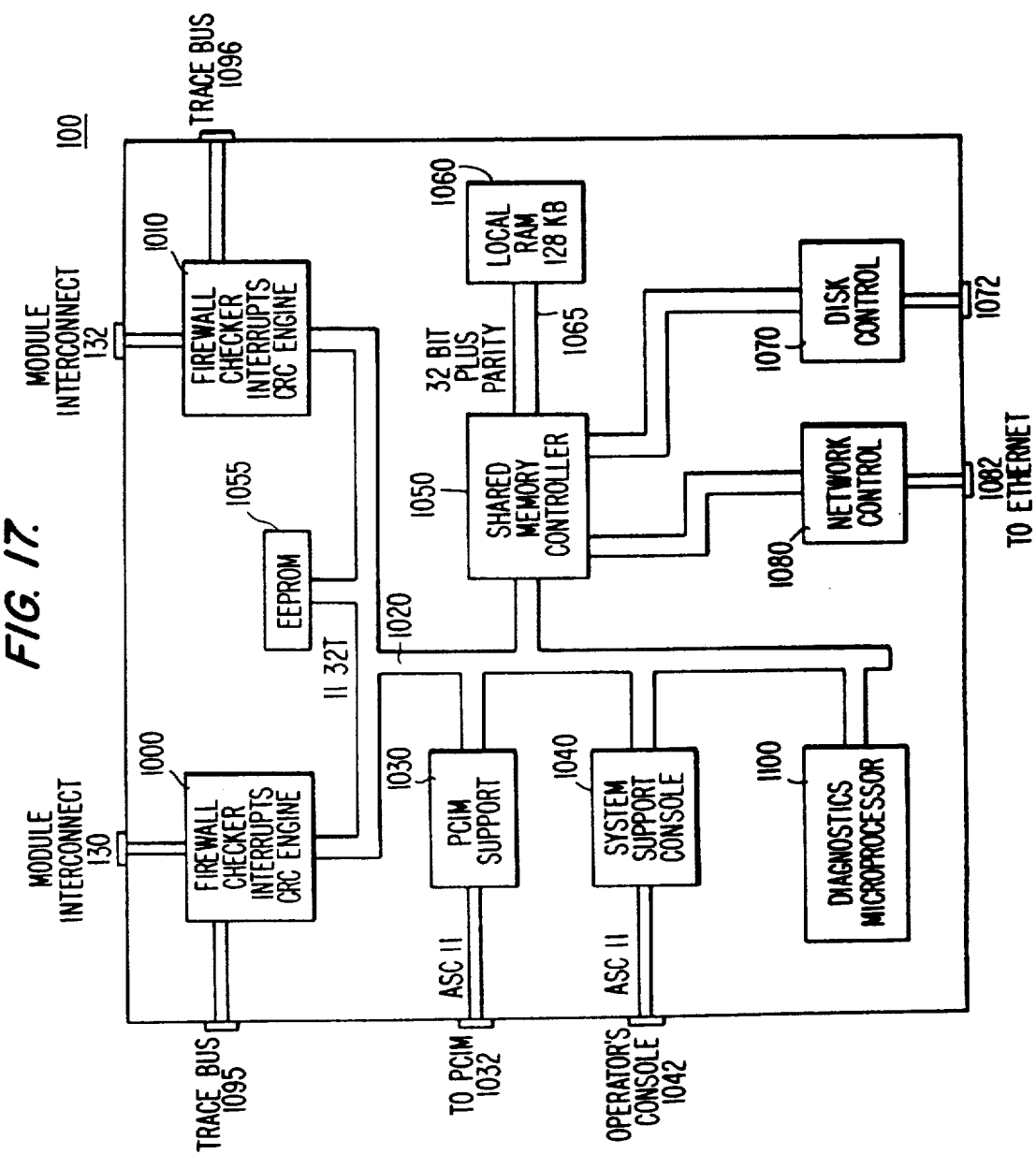
FIG. 17 is a block diagram of an I/O module for the computer system of FIG. 1.

FIG. 17 shows a preferred embodiment of an I/O module 100. The principles of operation I/O module 100 are applicable to the other I/O modules as well.

Figure 18:
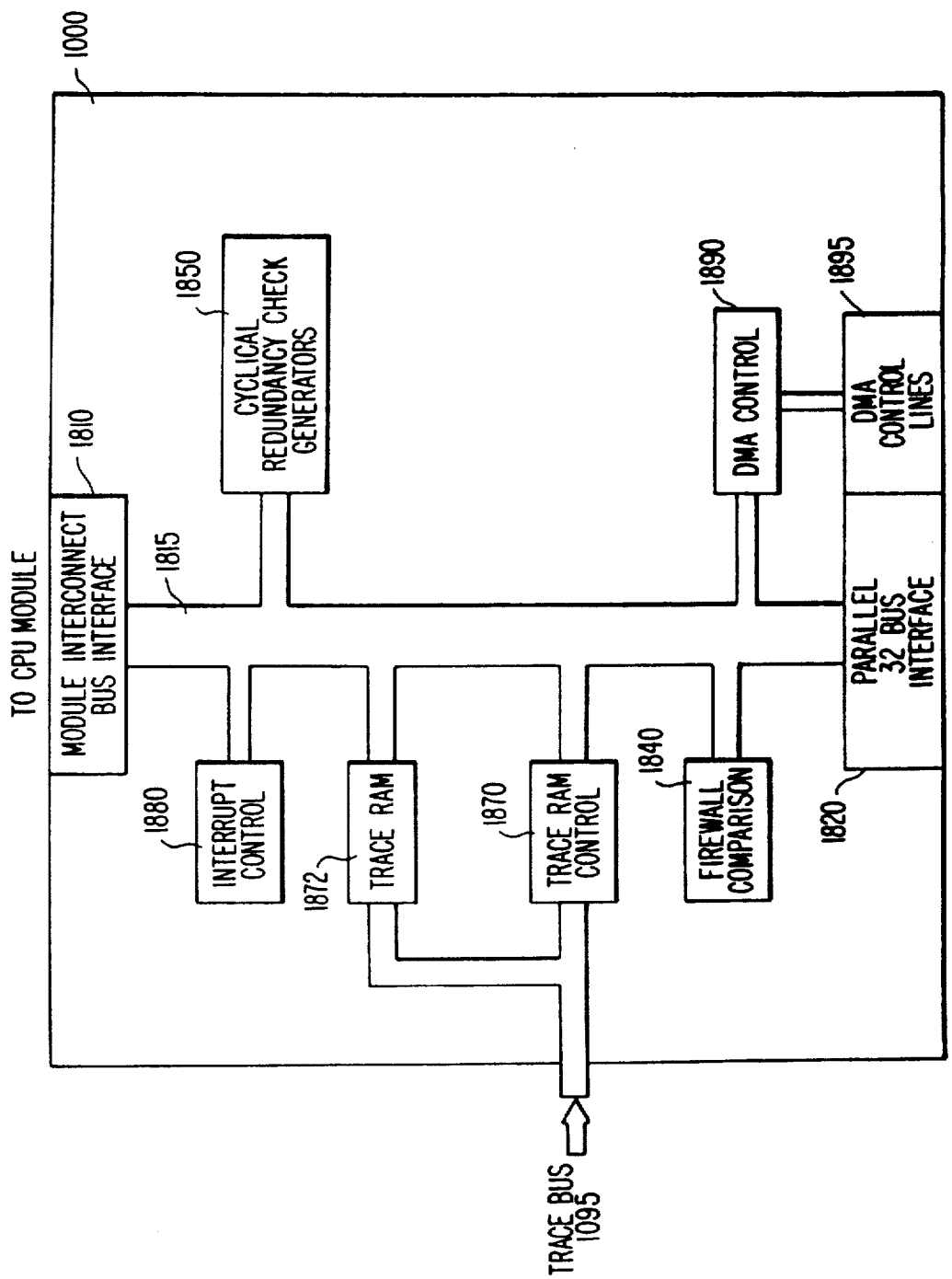
FIG. 18 is a block diagram of the firewall element in the I/O module shown in FIG. 17.

FIG. 18 shows the elements in the preferred embodiment of firewall 1000. Firewall 1000 includes a 16 bit bus interface 1810 to module interconnect 130 and a 32 bit bus interface 1820 for connection to bus 1020 shown in FIG. 17. Interfaces 1810 and 1820 are connected by an internal firewall bus 1815 which also interconnects with the other elements of firewall 1000. Preferably bus 1815 is a parallel bus either 16 or 32 bits wide.

I/O module 100 is connected to CPU module 30 by means of dual rail module interconnects 130 and 132. Each of the module interconnects is received by firewalls 1000 and 1010, respectively. One of the firewalls, which is usually, but not always firewall 1000, writes the data from module interconnect 130 onto bus 1020. The other firewall, in this case firewall 1010, checks that data against its own copy received from module interconnect 132 using firewall comparison circuit 1840 shown in FIG. 18. That checking is effective due to the lockstep synchronization of CPU modules 30 and 30' which causes data written to I/O module 100 from CPU modules 30 and 30, to be available at firewalls 1000 and 1010 substantially simultaneously.

Firewall comparison circuit 1840 only checks data received from CPU modules 30 and 30'. Data sent to CPU modules 30 and 30' from an I/O device have a common origin and thus do not require checking. Instead, data received from an I/O device to be sent to CPU modules 30 and 30' is checked by an error detection code (EDC), such as a cyclical redundancy check (CRC), which is performed by EDC/CRC generator 1850. EDC/CRC generator 1850 is also coupled to internal firewall bus 1815.

EDC/CRC generator 1850 generates and checks the same EDC/CRC code that is used by the I/O device. Preferably, I/O module 100 generates two EDC. One, which can also be a EDC/CRC, is used for an interface to a network, such as the Ethernet packet network to which module 100 is coupled (see element 1082 in FIG. 17). The other is used for a disk interface such as disk interface 1072 in FIG. 17.

EDC/CRC coverage is not required between CPU module 30 and I/O module 100 because the module interconnects are duplicated. For example in CPU module 30, cross-link 90 communicates with firewall 1000 through module interconnect 130, and cross-link 95 communicates with firewall 1010 through module interconnect 132.

A message received from Ethernet network 1082 is checked for a valid EDC/CRC by network control 1080 shown in FIG. 17. The data, complete with EDC/CRC, is written to a local RAM 1060 also shown in FIG. 17. All data in local RAM 1060 is transferred to memory module 60 using DMA. A DMA control 1890 coordinates the transfer and directs EDC/CRC generator 1850 to check the validity of the EDC/CRC encoded data being transferred.

Most data transfers with an I/O device are done with DMA. Data is moved between main memory and I/O buffer memory. When data is moved from the main memory to an I/O buffer memory, an EDC/CRC may be appended. When the data is moved from I/O buffer memory to main memory, an EDC/CRC may be checked and moved to main memory or may be stripped. When data is moved from the I/O buffer memory through an external device, such as a disk or Ethernet adaptor the EDC/CRC may be checked locally or at a distant receiving node, or both. The memory data packets may have their EDC/CRC generated at the distant node or by the local interface on the I/O module.

This operation ensures that data residing in or being transferred through a single rail system like I/O module 100 is covered by an error detection code, which is preferably at least as reliable as the communications media the data will eventually pass through. Different I/O modules, for example those which handle synchronous protocols, preferably have an EDC/CRC generator which generates and checks the EDC/CRC codes of the appropriate protocols.

In general, DMA control 1890 handles the portion of a DMA operation specific to the shared memory controller 1050 and local RAM 1060 being addressed. The 32 bit bus 1020 is driven in two different modes. During DMA setup, DMA control 1890 uses bus 1020 as a standard asynchronous microprocessor bus. The address in local RAM 1060 where the DMA operation will occur is supplied by shared memory controller 1050 and DMA control 1890. During the actual DMA transfer, DMA control 1890 directs DMA control lines 1895 to drive bus 1020 in a synchronous fashion. Shared memory controller 1050 will transfer a 32 bit data word with bus 1020 every bus cycle, and DMA control 1890 keeps track of how many words are left to be transferred. Shared memory control 1050 also controls local RAM 1060 and creates the next DMA address.

The I/O modules (100, 110, 120) are responsible for controlling the read/write operations to their own local RAM 1060. The CPU module 30 is responsible for controlling the transfer operations with memory array 60. The DMA engine 800 of memory controllers 70 and 75 (shown in FIG. 8) directs the DMA operations on the CPU module 30. This division of labor prevents a fault in the DMA logic on any module from degrading the data integrity on any other module in zones 11 or 11'.

The functions of trace RAM 1872 and trace RAM controller 1870 are described in greater detail below. Briefly, when a fault is detected and the CPUs 40, 40', 50 and 50' and CPU modules 30 and 30' are notified, various trace RAMs throughout computer system 10 are caused to perform certain functions described below. The communications with the trace RAMs takes place over trace bus 1095. Trace RAM control 1870, in response to signals from trace bus 1095, causes trace RAM 1872 either to stop storing, or to dump its contents over trace bus 1095.

I/O module bus 1020, which is preferably a 32 bit parallel bus, couples to firewalls 1000 and 1010 as well as to other elements of the I/O module 100. A shared memory controller 1050 is also coupled to I/O bus 1020 in I/O module 100. Shared memory controller 1050 is coupled to a local memory 1060 by a shared memory bus 1065, which preferably carries 32 bit data. Preferably, local memory 1060 is a RAM with 256 Kbytes of memory, but the size of RAM 1060 is discretionary. The shared memory controller 1050 and local RAM 1060 provide memory capability for I/O module 100.

Disk controller 1070 provides a standard interface to a disk, such as disks 1075 and 1075' in FIG. 1. Disk controller 1070 is also coupled to shared memory controller 1050 either for use of local RAM 1060 or for communication with I/O module bus 1020.

A network controller 1080 provides an interface to a standard network, such as the ETHERNET network, by way of network interface 1082. Network controller 1080 is also coupled to shared memory controller 1050 which acts as an interface both to local RAM 1060 and I/O module bus 1020. There is no requirement, however, for any one specific organization or structure of I/O module bus 1020.

PCIM (power and cooling interface module) support element 1030 is connected to I/O module bus 1020 and to an ASCII interface 1032. PCIM support element 1030 allows processing system 20 to monitor the status of the power system (i.e., batteries, regulators, etc.) and the cooling system (i.e., fans) to ensure their proper operation. Preferably, PCIM support element 1030 only receives messages when there is some fault or potential fault indication, such as an unacceptably low battery voltage. It is also possible to use PCIM support element 1030 to monitor all the power and cooling subsystems periodically. Alternatively PCIM support element 1030 may be connected directly to firewalls 1000 and 1010.

Diagnostics microprocessor 1100 is also connected to the I/O module bus 1020. In general, diagnostics microprocessor 1100 is used to gather error checking information from trace RAMS, such as trace RAM 1872, when faults are detected. That data is gathered into trace buses 1095 and 1096, through firewalls 1000 and 1010, respectively, through module bus 1020, and into microprocessor 1100.

D. INTERPROCESSOR AND INTERMODULE COMMUNICATION

1. Data Paths

Figure 19:
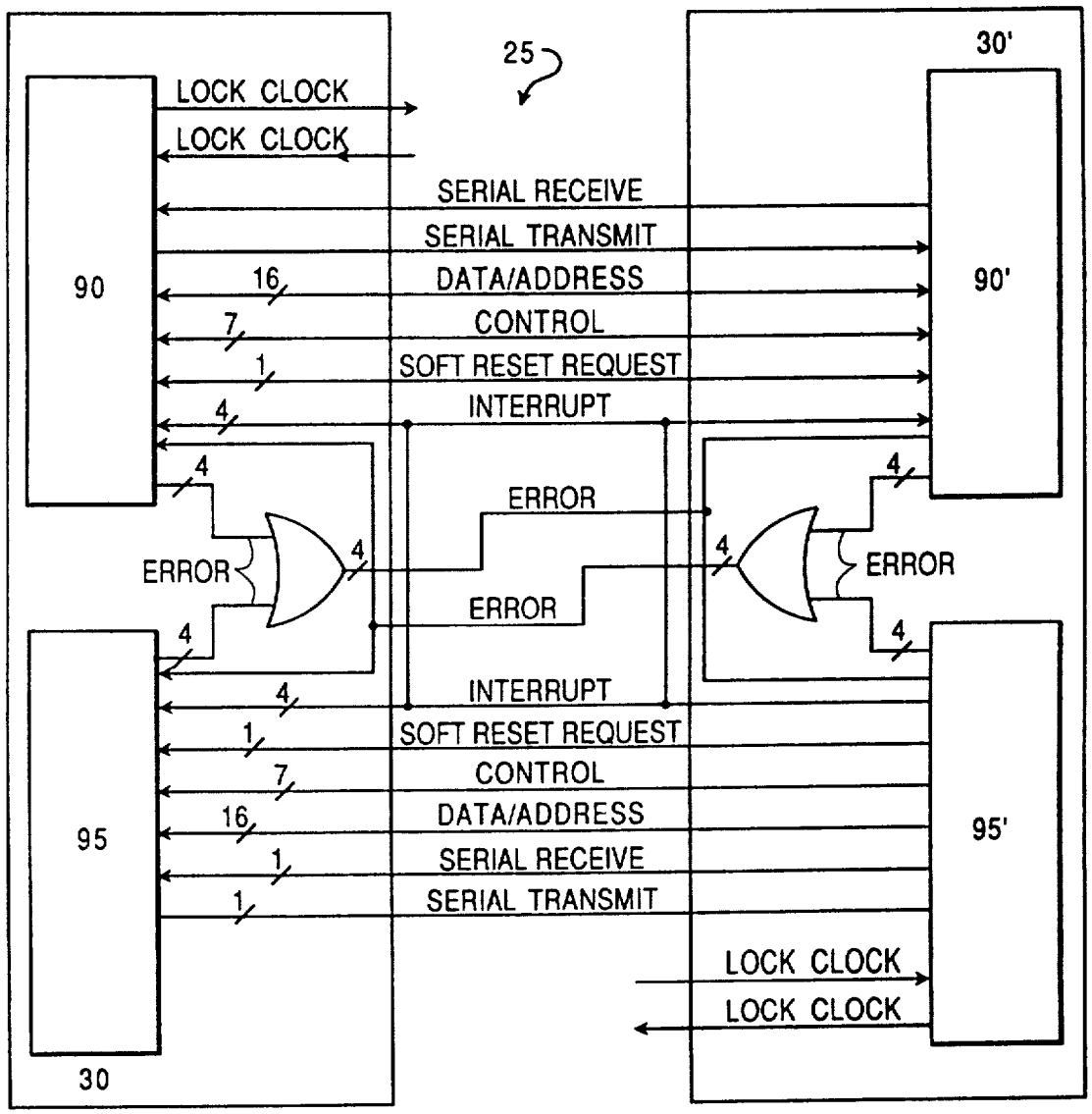
FIG. 19 is a detailed diagram of the elements of the cross-link pathway for the computer system of FIG. 1.

The elements of computer system 10 do not by themselves constitute a fault tolerant system. There needs to be a communications pathway and protocol which allows communication during normal operations and operation during fault detection and correction. Key to such communication is cross-link pathway 25. Cross-link pathway 25 comprises the parallel links, serial links, and clock signals already described. These are shown in FIG. 19. The parallel link includes two identical sets of data and address lines, control lines, interrupt lines, coded error lines, and a soft reset request line. The data and address lines and the control lines contain information to be exchanged between the CPU modules, such as from the module interconnects 130 and 132 (or 130' and 132') or from memory module 60 (60').

The interrupt lines preferably contain one line for each of the interrupt levels available to I/O subsystem (modules 100, 110, 120, 100', 110' and 120'). These lines are shared by cross-links 90, 95, 90' and 95'.

The coded error lines preferably include codes for synchronizing a console "HALT" request for both zones, one for synchronizing a CPU error for both zones, one for indicating the occurrence of a CPU/memory failure to the other zone, one for synchronizing DMA error for both zones, and one for indicating clock phase error. The error lines from each zone 11 or 11' are inputs to an OR gate, such as OR gate 1990 for zone 11 or OR gate 1990' for zone 11'. The output at each OR gate provides an input to the cross-links of the other zone.

The fault tolerant processing system 10 is designed to continue operating as a dual rail system despite transient faults. The I/O subsystem (modules 100, 110, 120, 100', 110', 120') can also experience transient errors or faults and continue to operate. In the preferred embodiment, an error detected by firewall comparison circuit 1840 will cause a synchronized error report to be made through pathway 25 for CPU directed operations. Hardware in CPU 30 and 30' will cause a synchronized soft reset through pathway 25 and will retry the faulted operation. For DMA directed operations, the same error detection results in synchronous interrupts through pathway 25, and software in CPUs 40, 50, 40' and 50' will restart the DMA operation.

Certain transient errors are not immediately recoverable to allow continued operation in a full-duplex, synchronized fashion. For example, a control error in memory module 60 can result in unknown data in memory module 60. In this situation, the CPUs and memory elements can no longer function reliably as part of a fail safe system so they are removed. Memory array 60 must then undergo a memory resync before the CPUs and memory elements can rejoin the system. The CPU/memory fault code of the coded error lines in pathway 25 indicates to CPU 30' that the CPUs and memory elements of CPU 30 have been faulted.

The control lines, which represent a combination of cycle type, error type, and ready conditions, provide the handshaking between CPU modules (30 and 30') and the I/O modules. Cycle type, as explained above, defines the type of bus operation being performed: CPU I/O read, DMA transfer, DMA setup, or interrupt vector request. Error type defines either a firewall miscompare or a CRC error. "Ready" messages are sent between the CPU and I/O modules to indicate the completion of requested operations.

The serial cross-link includes two sets of two lines to provide a serial data transfer for a status read, loopback, and data transfer.

The clock signals exchanged are the phase locked clock signals CLKC H and CLKC' H (delayed).

FIGS. 20A-D show block diagrams of the elements of CPU modules 30 and 30' and I/O modules 100 and 100' through which data passes during the different operations. Each of those elements has each been described previously.

Figure 20A:
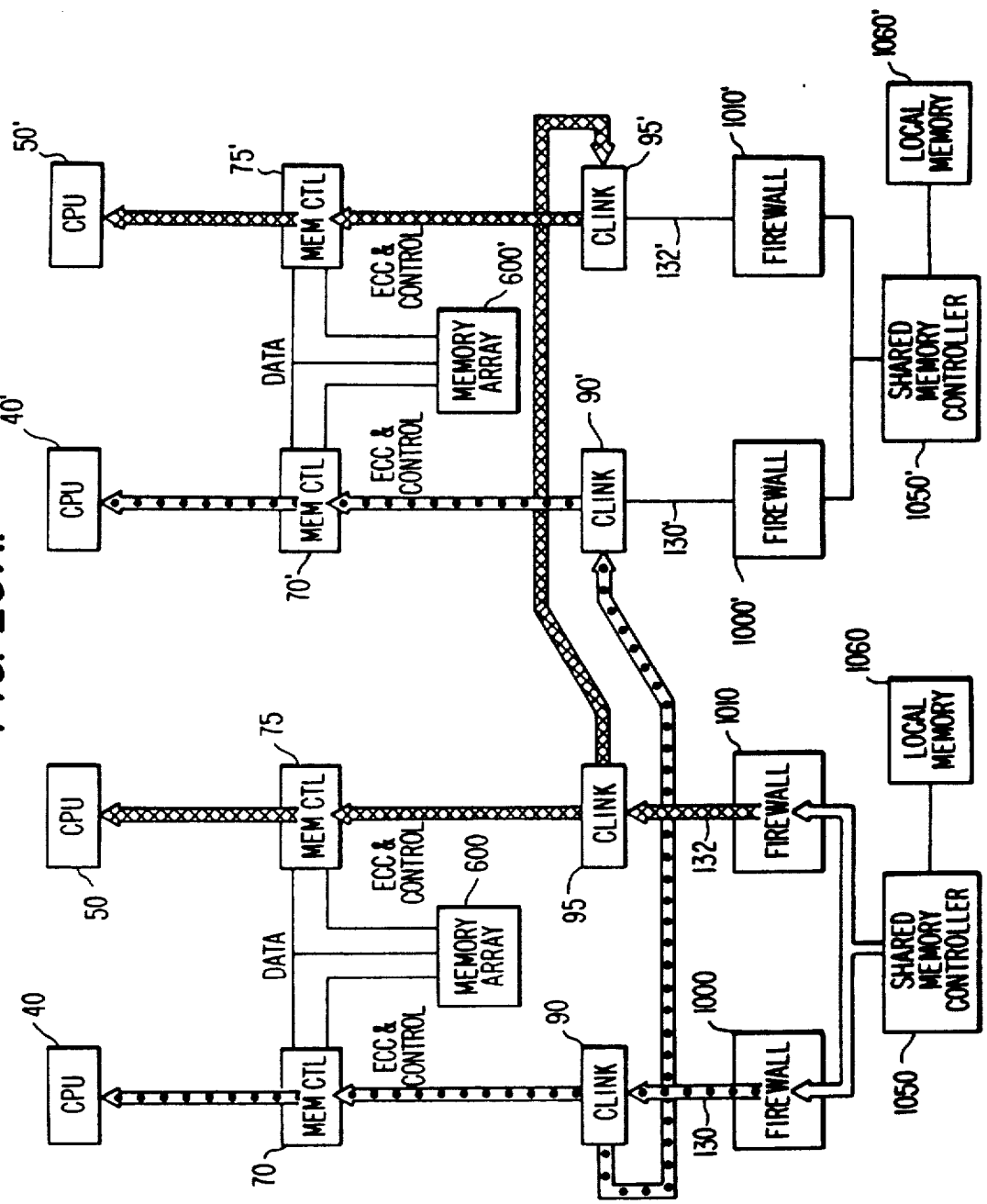

FIG. 20A shows the data pathways for a typical CPU I/O read operation of data from an I/O module 100, such as a CPU I/O register read operation of register data from shaved memory controller 1050 (1050'). Such an operation will be referred to as a read of local data, to distinguish it from a DMA read of data from local memory 1060, which usually contains data from an internal device controller. The local data are presumed to be stored in local RAM 1060 (1060') for transfer through shared memory controller 1050 (1050'). For one path, the data pass through firewall 1000, module interconnect 130, to cross-link 90. As seen in FIG. 12, cross-link 90 delays the data from firewall 1000 to memory controller 70 so that the data to cross-link 90' may be presented to memory controller 70 at the same time the data are presented to memory controller 70, thus allowing processing systems 20 and 20' to remain synchronized. The data then proceed out of memory controllers 70 and 70' into CPUs 40 and 40' by way of internal busses 46 and 46'.

A similar path is taken for reading data into CPUs 50 and 50'. Data from the shared memory controller 1050 proceeds through firewall 1010 and into cross-link 95. At that time, the data are routed both to cross-link 95' and through a delay unit inside cross-link 95.

CPU I/O read operations may also be performed for data received from the I/O devices of processing system 20' via a shared memory controller 1050' and local RAM in I/O device 100'.

Although I/O modules 100, 110, and 120 are similar and correspond to I/O modules 100', 110', and 120', respectively, the corresponding I/O modules are not in lockstep synchronization. Using memory controller 1050' and local RAM 1060' for CPU I/O read, the data would first go to cross-links 90' and 95'. The remaining data path is equivalent to the path from memory controller 1050. The data travel from the cross-links 90' and 95' up through memory controllers 70' and 75' and finally to CPUs 40' and 50', respectively. Simultaneously, the data travel across to cross-links 90 and 95, respectively, and then, without passing through a delay element, the data continue up to CPUs 40 and 50, respectively.

Figure 20B:
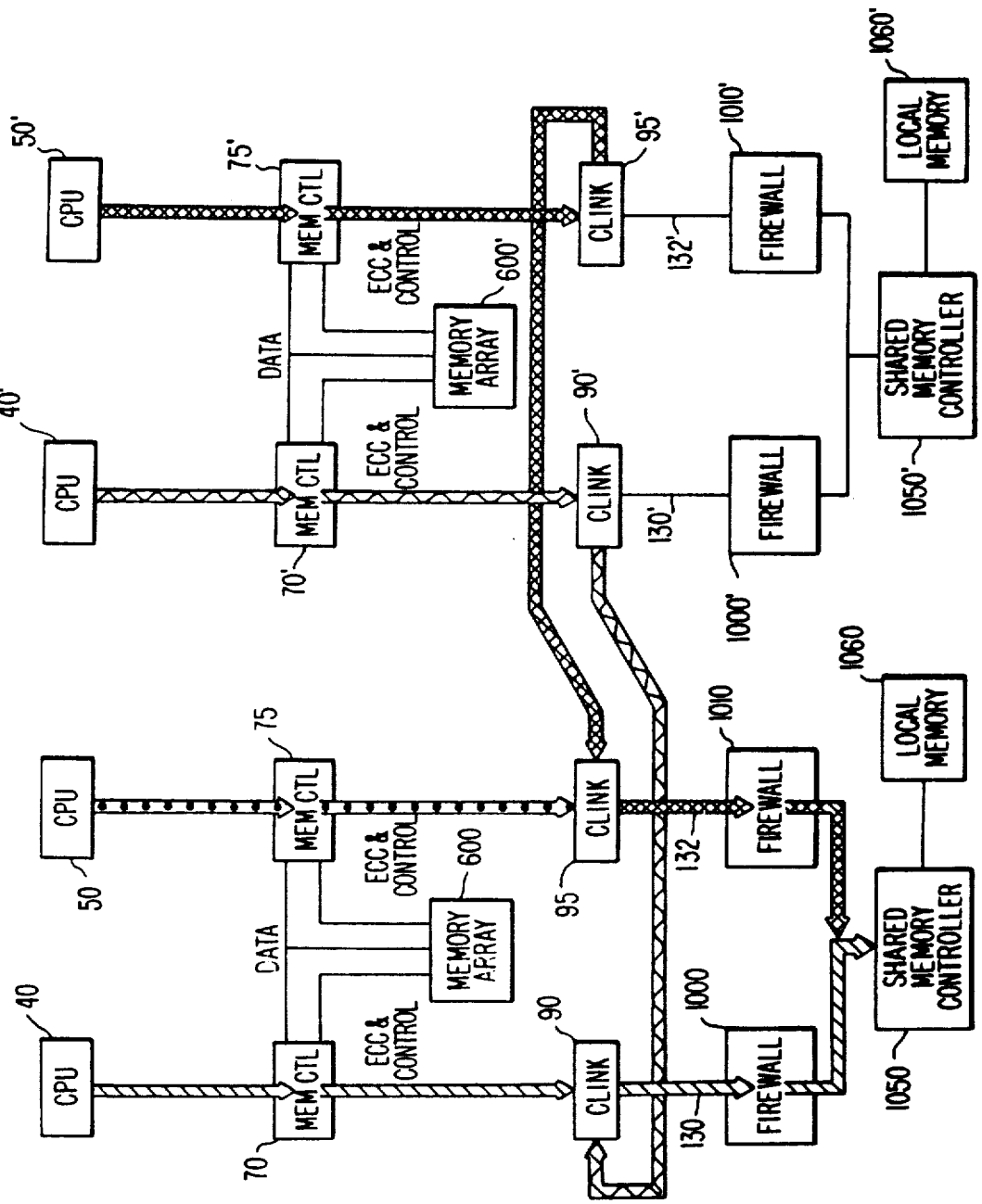

FIG. 20B shows a CPU I/O write operation of local data. Such local data are transferred from the CPUs 40, 50, 40' and 50' to an I/O module, such as I/O module 100. An example of such an operation is a write to a register in shared memory controllers 1050. The data transferred by CPU 40 proceed along the same path but in a direction opposite to that of the data during the CPU I/O read. Specifically, such data pass through bus 46, memory controller 70, various latches (to permit synchronization), firewall 1000, and memory controller 1050. Data from CPU 50' also follow the path of the CPU I/O reads in a reverse direction. Specifically, such data pass through bus 56', memory controller 75', cross-link 95', cross-link 95, and into firewall 1010. As indicated above, firewalls 1000 and 1010 check the data during I/O write operations to check for errors prior to storage.

When writes are performed to an I/O module in the other zone, a similar operation is performed. However, the data from CPUs 50 and 40' are used instead of CPUs 50' and 40.

The data from CPUs 50 and 40' are transmitted through symmetrical paths to shared memory controller 1050'. The data from CPUs 50 and 40' are compared by firewalls 1000' and 1010'. The reason different CPU pairs are used to service I/O write data is to allow checking of all data paths during normal use in a full duplex system. Interrail checks for each zone were previously performed at memory controllers 70, 75, 70' and 75'.

Figure 20C:
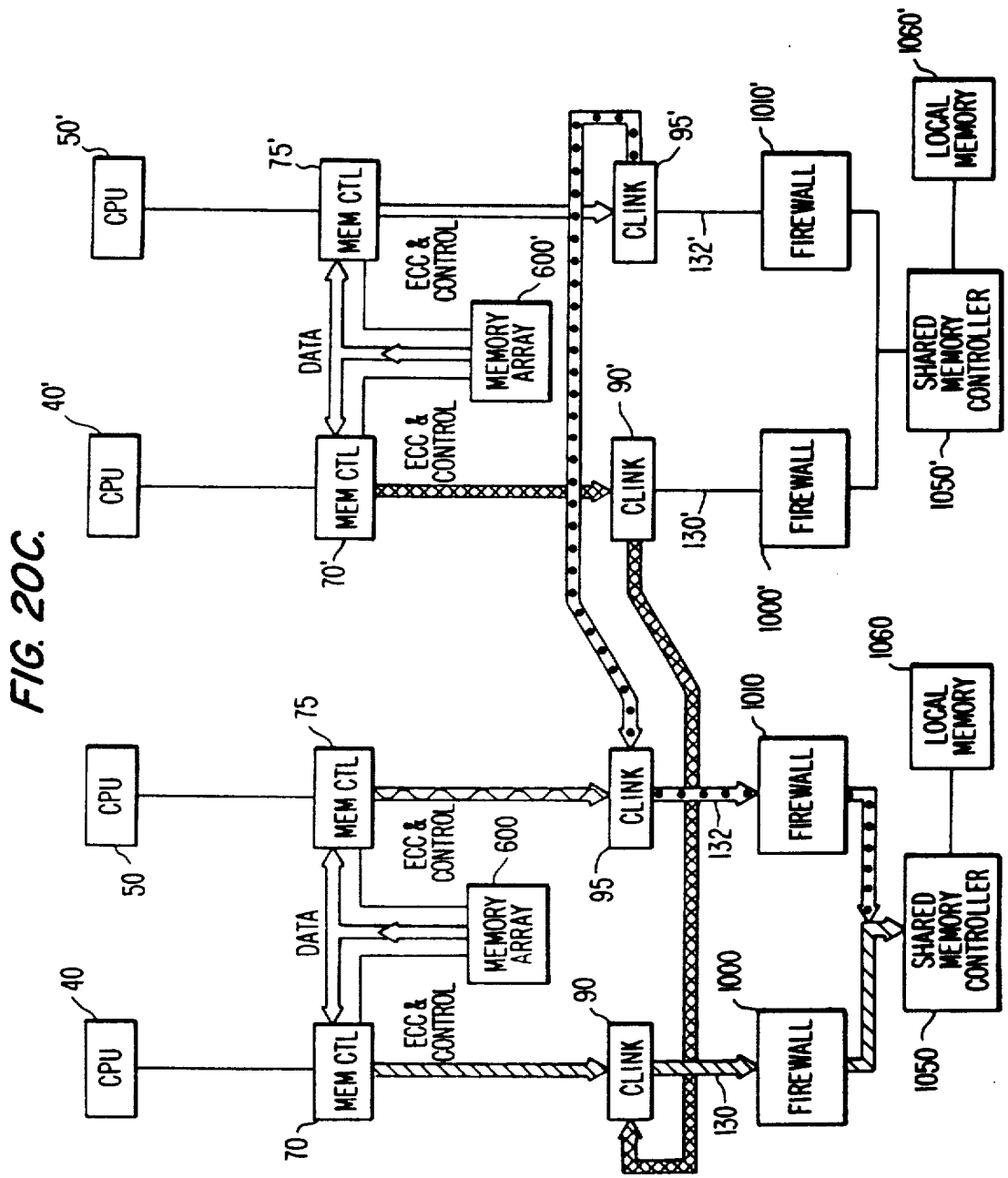

FIG. 20C shows the data paths for DMA read operations. The data from memory array 600 pass simultaneously into memory controllers 70 and 75 and then to cross-links 90 and 95. Cross-link 90 delays the data transmitted to firewall 1000 so that the data from cross-links 90 and 95 reach firewalls 1000 and 1010 at substantially the same time.

Similar to the CPU I/O write operation, there are four copies of data of data to the various cross-links. At the firewall, only two copies are received. A different pair of data are used when performing reads to zone 11. The data paths for the DMA write operation are shown in FIG. 20D and are similar to those for a CPU I/O read. Specifically, data from shared memory controller 1050' proceed through firewall 1000', cross-link 90' (with a delay), memory controller 70', and into memory array 600'. Simultaneously, the data pass through firewall 1010', cross-link 95' (with a delay), and memory controller 75', at which time it is compared with the data from memory controller 70' during an interrail error check. As with the CPU I/O read, the data in a DMA write operation may alternatively be brought up through shared memory controller 1050 in an equivalent operation.

The data out of cross-link 90' also pass through cross-link 90 and memory controller 70 and into memory array 600. The data from cross-link 95' pass through cross-link 95 and memory controller 75, at which time they are compared with the data from memory controller 70' during a simultaneous interrail check.

Figure 20E:
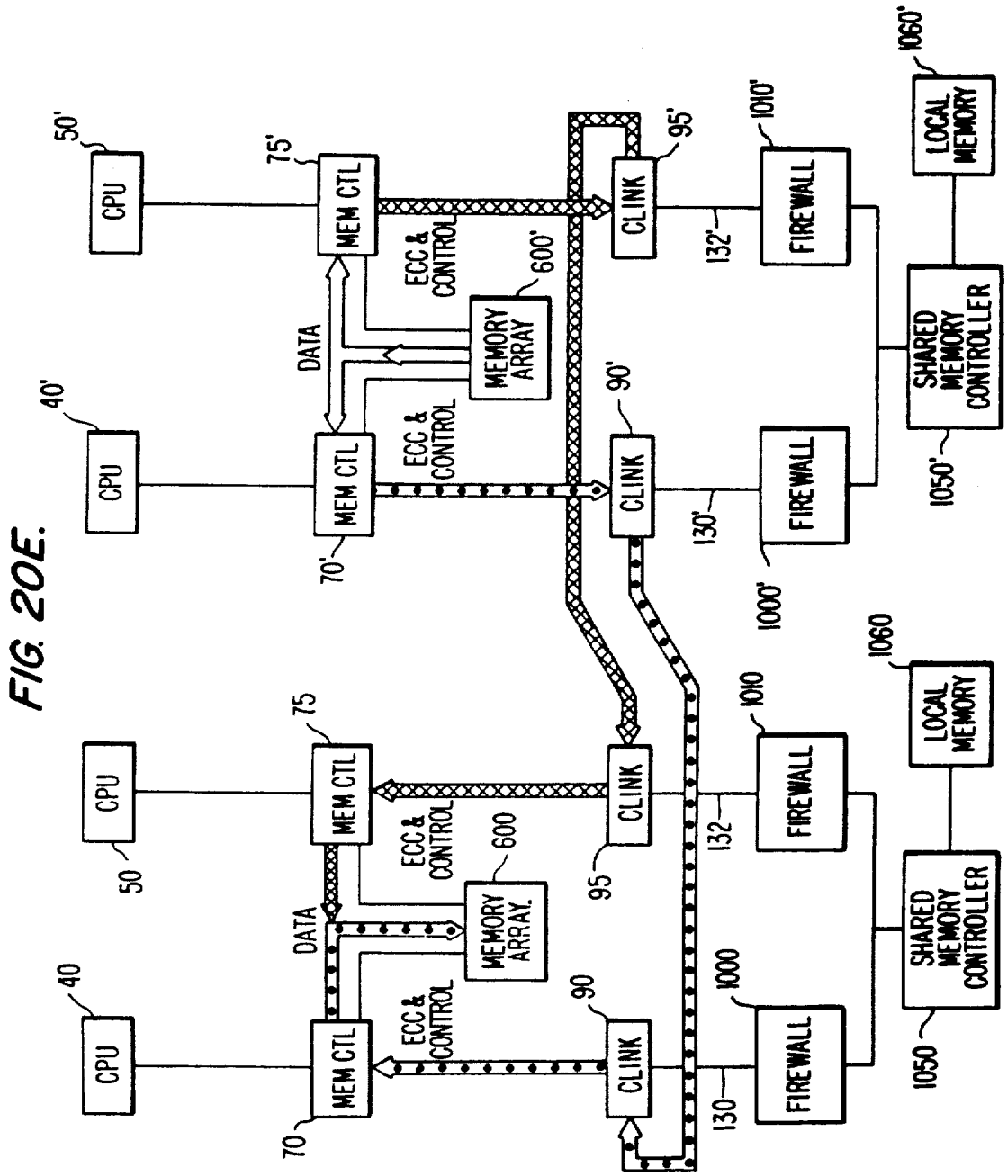

The data path for a memory resynchronization (resync) operation is shown in FIG. 20E. In this operation the contents of both memory arrays 60 and 60' must be set equal to each other. In memory resync, data from memory array 600' pass through memory controllers 70' and 75' under DMA control, then through cross-links 90' and 95', respectively. The data then enters cross-links 90 and 95 and memory controllers 70 and 75, respectively, before being stored in memory array 600.

2. Resets

The preceding discussions of system 10 have made reference to many different needs for resets. In certain instances not discussed, resets are used for standard functions, such as when power is initially applied to system 10. Most systems have a single reset which always sets the processor back to some predetermined or initial state, and thus disrupts the processors, instruction flow. Unlike most other systems, however, resets in system 10 do not affect the flow of instruction execution by CPUs 40, 40', 50 and 50' unless absolutely necessary. In addition, resets in system 10 affect only those portions that need to be reset to restore normal operation.

Another aspect of the resets in system 10 is their containment. One of the prime considerations in a fault tolerant system is that no function should be allowed to stop the system from operating should that function fail. For this reason, no single reset in system 10 controls elements of both zones 11 and 11' without direct cooperation between zones 11 and 11'. Thus, in full duplex mode of operation, all resets in zone 11 will be independent of resets in zone 11'. When system 10 is in master/slave mode, however, the slave zone uses the resets of the master zone. In addition, no reset in system 10 affects the contents of memory chips. Thus neither cache memory 42 and 52, scratch pad memory 45 and 55 nor memory module 60 lose any data due to a reset.

There are preferably three classes of resets in system 10; "clock reset," "hard reset," and "soft reset." A clock reset realigns all the clock phase generators in a zone. A clock reset in zone 11 will also initialize CPUs 40 and 50 and memory module 60. A clock reset does not affect the module interconnects 130 and 132 except to realign the clock phase generators on those modules. Even when system 10 is in master/slave mode, a clock reset in the slave zone will not disturb data transfers from the master zone to the slave zone module interconnect. A clock reset in zone 11', however, will initialize the corresponding elements in zone 11'.

In general, a hard reset returns all state devices and registers to some predetermined or initial state. A soft reset only returns state engines and temporary storage registers to their predetermined or initial state. The state engine in a module is the circuitry that defines the state of that module. Registers containing error information and configuration data will not be affected by a soft reset. Additionally, system 10 will selectively apply both hard resets and soft resets at the same time to reset only those elements that need to be reinitialized in order to continue processing.

The hard resets clear system 10 and, as in conventional systems, return system 10 to a known configuration. Hard resets are used after power is applied, when zones are to be synchronized, or to initialize or disable an I/O module. In system 10 there are preferably four hard resets: "power up reset," "CPU hard reset," "module reset," and "device reset." Hard resets can be further broken down into local and system hard resets. A local hard reset only affects logic that responds when the CPU is in the slave mode. A system hard reset is limited to the logic that is connected to cross-link cables 25 and module interconnects 130 and 132.

The power up reset is used to initialize zones 11 and 11' immediately after power is supplied. The power up reset forces an automatic reset to all parts of the zone. A power up reset is never connected between the zones of system 11 because each zone has its own power supply and will thus experience different length "power-on" events. The power up reset is implemented by applying all hard resets and a clock reset to zone 11 or 11'.

The CPU hard reset is used for diagnostic purposes in order to return a CPU module to a known state. The CPU hard reset clears all information in the CPUs, memory controllers, and memory module status registers in the affected zone. Although the cache memories and memory modules are disabled, the contents of the scratch pad RAMs 45 and 55 and of the memory module 60 are not changed. In addition, unlike the power up reset, the CPU hard reset does not modify the zone identification of the cross-links nor the clock mastership. The CPU hard reset is the sum of all local hard resets that can be applied to a CPU module and a clock reset.

The module hard reset is used to set the I/O modules to a known state, such as during bootstrapping, and is also used to remove a faulting I/O module from the system. The I/O module hard reset clears everything on the I/O module, leaves the firewalls in a diagnostic mode, and disables the drivers.

A device reset is used to reset I/O devices connected to the I/O modules. The resets are device dependent and are provided by the I/O module to which the device is connected.

The other class of resets is soft resets. As explained above, soft resets clear the state engines and temporary registers in system 10 but they do not change configuration information, such as the mode bits in the cross-links. In addition, soft resets also clear the error handling mechanisms in the modules, but they do not change error registers such as system error register 898 and system fault address register 865.

Soft resets are targeted so that only the necessary portions of the system are reset. For example, if module interconnect 130 needs to be reset, CPU 40 is not reset nor are the devices connected to I/O module 100.

There are three unique aspects of soft resets. One is that each zone is responsible for generating its own reset. Faulty error or reset logic in one zone is thus prevented from causing resets in the non-faulted zone.

The second aspect is that the soft reset does not disrupt the sequence of instruction execution. CPUs 40, 40', 50, 50' are reset on a combined clock and hard reset only. Additionally memory controllers 70, 75, 70' and 75' have those state engines and registers necessary to service CPU instructions attached to hard reset. Thus the soft reset is transparent to software execution.

The third aspect is that the range of a soft reset, that is the number of elements in system 10 that is affected by a soft reset, is dependent upon the mode of system 10 and the original reset request. In full duplex mode, the soft reset request originating in CPU module 30 will issue a soft reset to all elements of CPU module 30 as well as all firewalls 1000 and 1010 attached to module interconnect 130 and 132. Thus all modules serviced by module interconnect 130 and 132 will have their state engines and temporary registers reset. This will clear the system pipeline of any problem caused by a transient error. Since system 10 is in duplex mode, zone 11' will be doing everything that zone 11 is. Thus CPU module 30' will, at the same time as CPU module 30, issue a soft reset request. The soft reset in zone 11' will have the same effect as the soft reset in zone 11.

When system 10 is in a master/slave mode, however, with CPU module 30' in the slave mode, a soft reset request originating in CPU module 30 will, as expected, issue a soft reset to all elements of CPU module 30 as well as all firewalls 1000 and 1010 attached to module interconnects 130 and 132. Additionally, the soft reset request will be forwarded to CPU module 30' via cross-links 90 and 90', cross-link cables 25, and cross-links 90' and 95'. Parts of module interconnects 130' and 132' will receive the soft reset. In this same configuration, a soft reset request originating from CPU module 30' will only reset memory controllers 70' and 75' and portions of cross-links 90' and 95'.

Soft resets include "CPU soft resets" and "system soft resets." A CPU soft reset is a soft reset that affects the state engines on the CPU module that originated the request. A system soft reset is a soft reset over the module interconnect and those elements directly attached to it. A CPU module can always request a CPU soft reset. A system soft reset can only be requested if the cross-link of the requesting CPU is in duplex mode, master/slave mode, or off mode. A cross-link in the slave mode will take a system soft reset from the other zone and generate a system soft reset to its own module interconnects.

CPU soft resets clear the CPU pipeline following an error condition. The CPU pipeline includes memory interconnects 80 and 82, latches (not shown) in memory controllers 70 and 75, DMA engine 800, and cross-links 90 and 95. The CPU soft reset can also occur following a DMA or I/O time-out. A DMA or I/O time-out occurs when the I/O device does not respond within a specified time period to a DMA or an I/O request.

Figure 21:
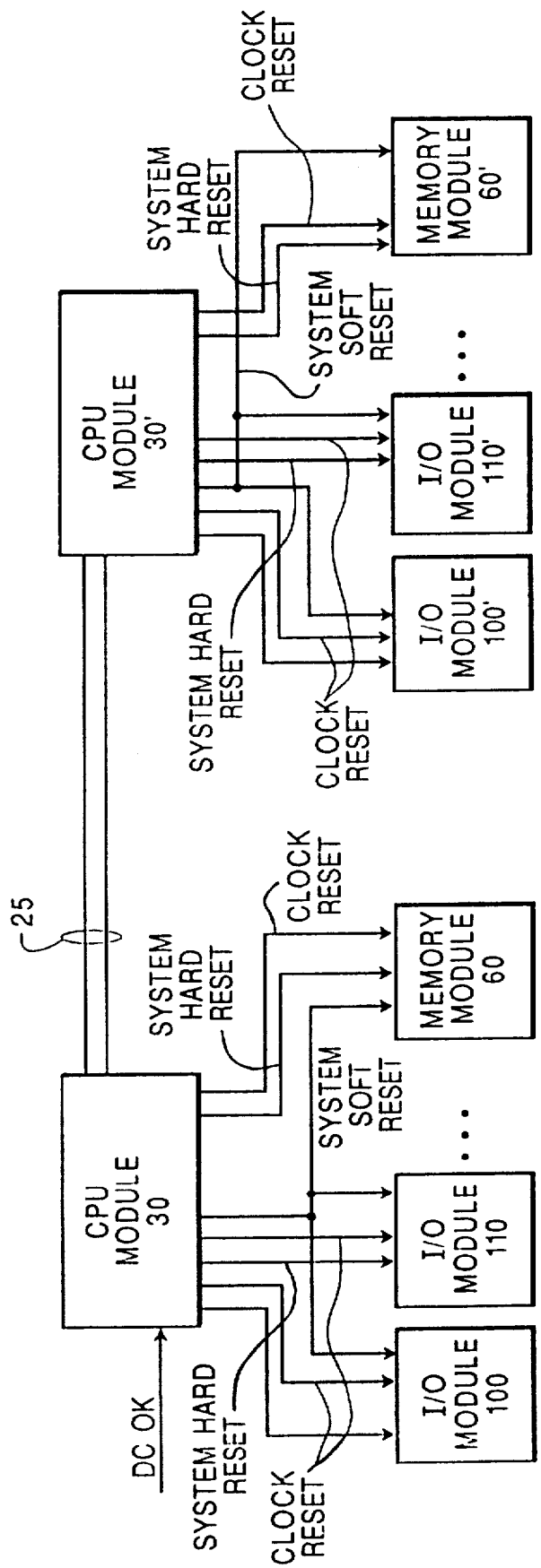
FIG. 21 is a block diagram of zone 20 showing the routing of reset signals.

FIG. 21 shows the reset lines from the CPU modules 30 and 30' to the I/O modules 100, 110, 100', and 110' and to the memory modules 60 and 60'. The CPU module 30 receives a DC OK signal indicating when the power supply has settled. It is this signal which initializes the power-up reset. CPU module 30' receives a similar signal from its power supply.

One system hard reset line is sent to each I/O module, and one system soft reset is sent to every three I/O modules. The reason that single hard reset is needed for each module is because the system hard reset line are used to remove individual I/O modules from system 10. The limitation of three I/O modules for each system soft reset is merely a loading consideration. In addition, one clock reset line is sent for every I/O module and memory module. The reason for using a single line per module is to control the skew by controlling the load.

Figure 22:
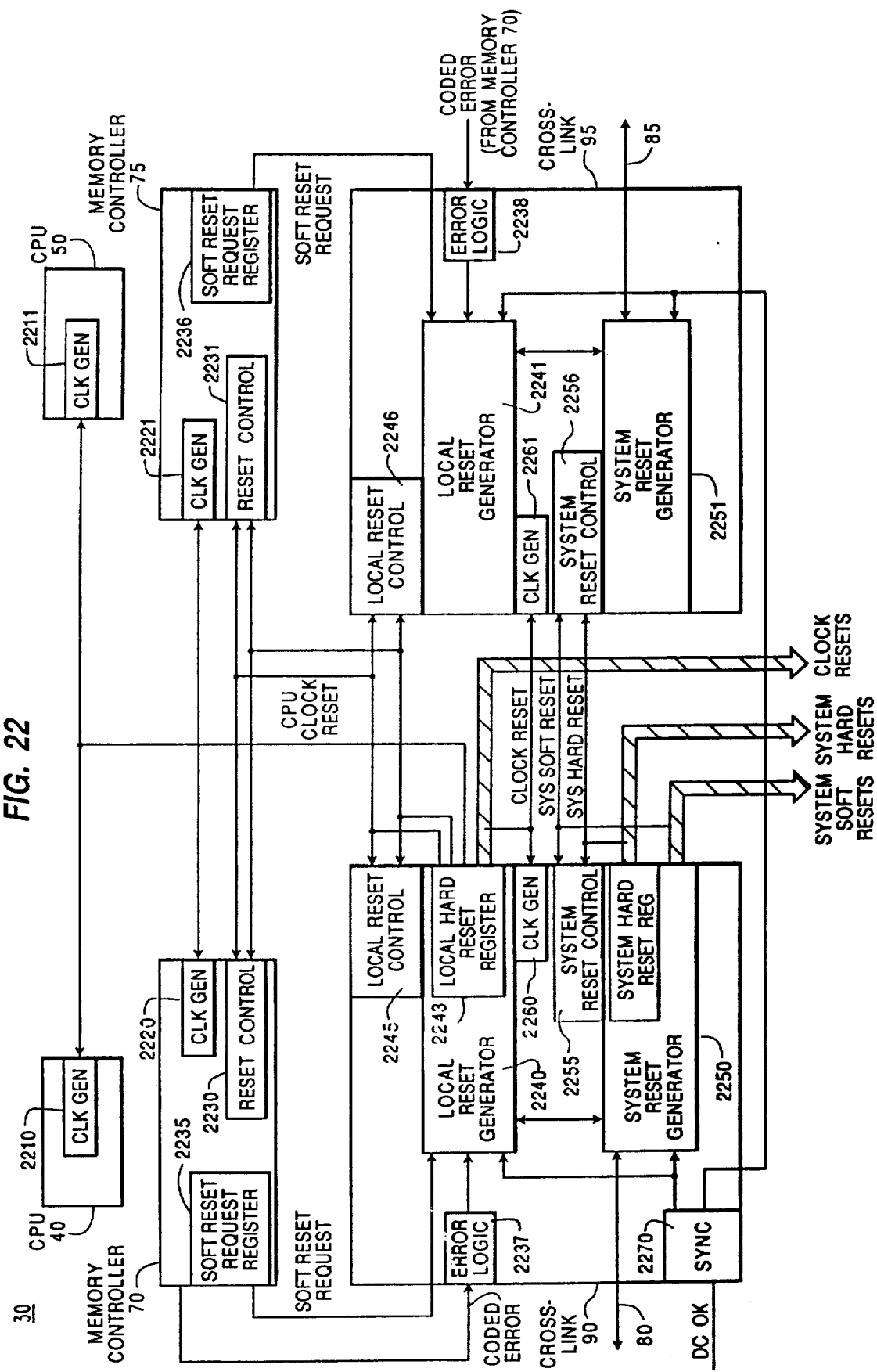
FIG. 22 is a block diagram of the components involved in resets in the CPU module shown in FIG. 3.

FIG. 22 shows the elements of CPU module 30 which relate to resets. CPUs 40 and 50 contain clock generators 2210 and 2211, respectively. Memory controllers 70 and 75 contain clock generators 2220 and 2221, respectively, and cross-links 90 and 95 contain clock generators 2260 and 2261, respectively. The clock generators divide down the system clock signals for use by the individual modules.

Memory controller 70 contains reset control circuitry 2230 and a soft reset request register 2235. Memory controller 75 contains reset control circuitry 2231 and a soft reset request register 2236.

Cross-link 90 contains both a local reset generator 2240 and a system reset generator 2250. Cross-link 95 contains a local reset generator 2241 and a system reset generator 2251. The "local" portion of a cross-link is that portion of the cross-link which remains with the CPU module when that cross-link is in the slave mode and therefore includes the serial registers and some of the parallel registers. The "system" portion of a cross-link is that portion of the cross-link that is needed for access to module interconnects 130 and 132 (or 130' and 132') and cross-link cables 25.

The local reset generators 2240 and 2241 generate resets for CPU module 30 by sending hard and soft reset signals to the local reset control circuits 2245 and 2246 of cross-links 90 and 95, respectively, and to the reset control circuits 2230 and 2231 of memory controller 70 and 75, respectively. Local cross-link reset control circuits 2245 and 2246 respond to the soft reset signals by resetting their state engines, the latches storing data to be transferred, and their error registers. Those circuits respond to the hard reset signals by taking the same actions as are taken for the soft resets, and by also resetting the error registers and the configuration registers. Reset control circuits 2230 and 2231 respond to hard and soft reset signals in a similar manner.

In addition, the local reset generator 2240 sends clock reset signals to the I/O modules 100, 110 and 120 via module interconnects 130 and 132. The I/O modules 100, 110, and 120 use the clock reset signals to reset their clocks in the manner described below. Soft reset request registers 2235 and 2236 send soft request signals to local reset generators 2240 and 2241, respectively.

System reset generators 2250 and 2251 of cross-links 90 and 95, respectively, send system hard reset signals and system soft reset signals to I/O modules 100, 110, and 120 via module interconnects 130 and 132, respectively. I/O modules 100, 110, and 120 respond to the soft reset signals by resetting all registers that are dependent on CPU data or commands. Those modules respond to the hard reset signals by resetting the same register as soft resets do, and by also resetting any configuration registers.

In addition, the system reset generators 2250 and 2251 also send the system soft and system hard reset signals to the system reset control circuit 2255 and 2256 of each cross-link. System reset control circuit 2255 and 2256 respond to the system soft reset signals and to the system hard reset signals in a manner similar to the response of the local reset control circuits to the local soft and local hard reset signals.

Memory controllers 70 and 75 cause cross-links 90 and 95, respectively, to generate the soft resets when CPUs 40 and 50, respectively, write the appropriate codes into soft reset request registers 2235 and 2236, respectively. Soft reset request registers 2235 and 2236 send soft reset request signals to local reset generators 2240 and 2241, respectively. The coded error signal is sent from memory controller 70 to local reset generators 2240 and 2241.

System soft resets are sent between zones along the same data paths data and control signals are sent. Thus, the same philosophy of equalizing delays is used for resets as for data and addresses, and resets reach all of the elements in both zones at approximately the same time.

Hard resets are generated by CPUs 40 and 50 writing the appropriate code into the local hard reset registers 2243 or by the request for a power up reset caused by the DC OK signal.

Synchronization circuit 2270 in cross-link 90 includes appropriate delay elements to ensure that the DC OK signal goes to all of the local and reset generators 2240, 2250, 2241 and 2251 at the same time.

In fact, synchronization of resets is very important in system 10. That is why the reset signals originate in the cross-links. In that way, the resets can be sent to arrive at different modules and elements in the modules approximately synchronously.

With the understanding of the structure in FIGS. 21 and 22, the execution of the different hard resets can be better understood. The power up reset generates both a system hard reset, a local hard reset and a clock reset. Generally, cross-links 90, 95, 90' and 95' are initially in both the cross-link off and resync off modes, and with both zones asserting clock mastership.

The CPU/MEM fault reset is automatically activated whenever memory controllers 70, 75, 70' and 75' detect a CPU/MEM fault. The coded error logic is sent from error logic 2237 and 2238 to both cross-links 90 and 95. The CPU module which generated the fault is then removed from system 10 by setting its cross-link to the slave state and by setting the cross-link in the other CPU module to the master state. The non-faulting CPU module will not experience a reset, however. Instead, it will be notified of the fault in the other module through a code in a serial cross-link error register (not shown). The CPU/MEM fault reset consists of a clock reset to the zone with the failing CPU module and a local soft reset to that module.

A resync reset is essentially a system soft reset with a local hard reset and a clock reset. The resync reset is used to bring two zones into lockstep synchronization. If, after a period in which zones 11 and 11' were not synchronized, the contents of the memory modules 60 and 60', including the stored states of the CPU registers, are set equal to each other, the resync reset is used to bring the zones into a compatible configuration so they can restart in a duplex mode.

The resync reset is essentially a CPU hard reset and a clock reset. The resync reset is activated by software writing the resync reset address into one of the parallel cross-link registers. At that time, one zone should be in the cross-link master/resync master mode and the other in the cross-link slave/resync slave mode. A simultaneous reset will then be performed on both the zones which, among other things, will set all four cross-links into the duplex mode. Since the resync reset is not a system soft reset, the I/O modules do not receive reset.

The preferred embodiment of system 10 also ensures that clock reset signals do not reset conforming clocks, only non-conforming clocks. The reason for this is that whenever a clock is reset, it alters the timing of the clocks which in turn affects the operation of the modules with such clocks. If the module was performing correctly and its clock was in the proper phase, then altering its operation would be both unnecessary and wasteful.

Figure 23:
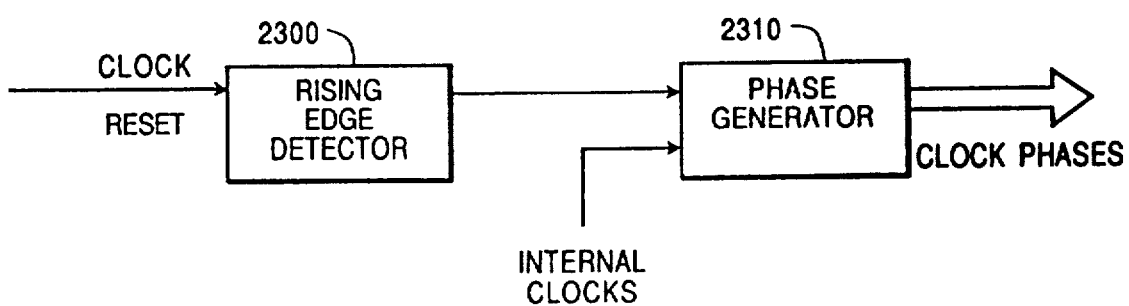
FIG. 23 is a diagram of clock reset circuitry.

FIG. 23 shows a preferred embodiment of circuitry which will ensure that only nonconforming clocks are reset. The circuitry shown in FIG. 23 preferably resides in the clock generators 2210, 2211, 2220, 2221, 2260, and 2261 of the corresponding modules shown in FIG. 22.

In the preferred embodiment, the different clock generators 2210, 2211, 2220, 2221, 2260, and 2261 include a rising edge detector 2300 and a phase generator 2310. The rising edge detector 2300 receives the clock reset signals from the cross-links 90 and 95 and generates a pulse of known duration concurrent with the rising edge of the clock reset signal. That pulse is in an input to the phase generator 2310 as are the internal clock signals for the particular module. The internal clock signals for that module are clock signals which are derived from the system clock signals that have been distributed from oscillator systems 200 and 200'.

Phase generator 2310 is preferably a divide-down circuit which forms different phases for the clock signals. Other designs for phase generator 2310, such as recirculating shift registers, can also be used.

Preferably, the rising edge pulse from rising edge detector 2300 causes phase generator 2310 to output a preselected phase. Thus, for example, if phase generator 2310 were a divide-down circuit with several stages, the clock reset rising edge pulse could be a set input to the stage which generates the preselected phase and a reset input to all other stages. If phase generator 2310 were already generating that phase, then the presence of the synchronized clock reset signal would be essentially transparent.

The resets thus organized are designed to provide the minimal disruption to the normal execution of system 10, and only cause the drastic action of interrupting the normal sequences of instruction execution when such drastic action is required. This is particularly important in a dual or multiple zone environment because of the problems of resynchronization which conventional resets cause. Thus, it is preferable to minimize the number of hard resets, as is done in system 10.

3. Protocol for Data Transfers

The protocol for transferring data between the CPU modules 30 and 30', and the I/O modules 100, 100', 110, 110', 120, and 120', will now be described. Data can be transferred to or from a system resource, such as a disk 1075 or 1075', using I/O read and write cycles or using DMA. Typically, most data transfers with I/O devices are performed with DMA. However, in either situation, the data transfers occur between the memory controllers 70, 70', 75, and 75' and the I/O modules 100, 100', 110, 110', 120, and 120'. As a result, information is transmitted on dual rail module interconnects 130, 130', 132, and 132', which will be referred to as system resource buses for purposes of this discussion, as well as on cross-link pathway 25.

In these data transfers, the presence of crosslinks 90, 90', 95, and 95' coupling zone 11 to zone 11' allows each CPU module 30 and 30' to communicate with any of the I/O modules in computer system 10, even if the module is in another zone. As a result, special circuitry and protocols are used in order to make use of the available interconnections during data transfers.

For example, if zone 11 is in the master mode and zone 11' is in the slave mode, then CPU module 30 in zone 11, which is the master, can transfer data to and from I/O modules in its zone 11 and in the other zone 11'. In master/slave mode, when information is transmitted from any one of the I/O modules in either zone, both of the memory controllers 70 and 75 in the master zone 11 receive the same information. When information is sent from memory controllers 70 and 75 in the master zone 11 to one of the I/O modules in either zone, the same information is received at both of the firewalls 1000 and 1010 in that I/O module.

In full duplex mode, both zones operate together in lockstep synchronization and achieve a fault tolerant computer system. Both of the CPU modules 30 and 30' receive the same information in full duplex mode when information is transmitted from any I/O module in either zone. Furthermore, in full duplex mode, when information is sent to an I/O module in either zone, the same information is received by the I/O module at firewalls 1000 and 1010 from CPU modules 30 and 30'.

During data transfers, the crosslinks 90, 90', 95, and 95' are used as data routers. The switching logic in the crosslinks shown in FIGS. 11 and 12 performs the function of coupling one pair of module interconnects 130 and 132, or 130' and 132', to specific memory controllers. The path that is created using this switching logic may depend on the direction of the data transfer, on whether the source or destination for the information is an I/O module, on which module interconnect buses will be involved in the data transfer, and on the mode of operation of the crosslinks.

As shown in FIG. 3, a pair of parallel buses 88 and 89 couples memory controllers 70 and 75 to crosslinks 90 and 95, respectively. Crosslink/memory controller buses 88 and 89 carry read, write, or DMA data and read or write addresses on sixteen bidirectional data lines, and contain additional unidirectional control lines, both up (CSUP-to the memory controller) and down (CSDN-from the memory controller), for carrying control codes. Similarly, the system resource buses (i.e., module interconnects 130 and 132) also contain sixteen bidirectional data lines for carrying read or write addresses and read, write, or DMA data, and additional unidirectional control lines for carrying control codes.

Transfers of data via DMA will be described first.

Prior to transmission of DMA data between a system resource, e.g., I/O module 100 coupled to disk 1075, and a CPU module, e.g., CPU module 30, the switching logic in the crosslinks 90, 90', 95, and 95' must be configured properly so that control codes and DMA data will be sent to the appropriate components of the computer system. Therefore, DMA setup information is transmitted by CPU module 30 from memory controllers 70 and 75.

DMA setup information is transmitted from memory controllers 70 and 75 to crosslinks 90 and 95 via the pair of crosslink/memory controller buses 88 and 89. This DMA setup information contains bits, in either the control code, the write address, and/or the write data, which are used by the components in the computer system, including the crosslinks, to uniquely designate a setup write transaction (cycle). In the preferred embodiment of the invention, the setup write transaction is identified by a control code transmitted on the unidirectional control lines of crosslink/memory controller buses 88 and 89 down from CPU module 30 to crosslinks 90 and 95. These lines are referred to as CSDN (control and status down) lines.

A setup write transaction is used to predefine the path (between a memory controller and a system resource) that must be set up for a subsequent DMA transfer. During write transactions, the data provided by CPU module 30 on the sixteen bidirectional data lines of crosslink/memory controller buses 88 and 89 consists of a write address followed by write data. As embodied herein, a setup write transaction has the same format as other types of write transactions, except the control code on the CSDN lines during setup write transactions is different from the control codes used for other write transactions.

The DMA setup information from the memory controller may be included in either the control code, the write address, and/or the write data. In the preferred embodiment of the invention, one bit in the write address indicates which zone the DMA transfer will involve. By monitoring this bit in the write address, crosslinks 90 and 95 determine which pair of system resource buses will be involved in the DMA transfer. The write address also is monitored by the crosslinks and compared with the locations in the I/O space of computer system 10 to determine whether the DMA transfer will involve an I/O module. Furthermore, the write data transmitted during the setup write transaction includes or more bits for indicating the direction of the DMA transfer.

Therefore, in the preferred embodiment of the invention, crosslinks 90 and 95 monitor the control code, the write address, and the write data to decide whether DMA setup information is being transmitted, to determine the DMA transfer direction, to identify the pair of system resource buses (module interconnects) that will be involved, and to ascertain whether the DMA transfer will involve a system resource (I/O module) coupled to any of the system resource buses. Furthermore, as shown in FIG. 10, crosslink 90 contains crosslink mode bits 916 in control and status register 912 that identify the state of the crosslink, i.e., either the crosslink is off, is a master, is a slave, or is operating in duplex mode. This information is used in routing control codes and DMA data during a DMA transfer.

In accordance with the present invention, each of the crosslinks includes means for decoding DMA setup information during a setup write transaction. The switching logic in the crosslinks performs the function of data routing under the control of a number of decoders. When a setup write transaction is initiated by a memory controller, these decoders determine the direction of an upcoming DMA transfer, determine which pair of system resource buses the DMA transfer will involve, and determine whether the DMA transfer will involve a system resource coupled to one pair of the system resource buses.

Decoders 971, 996, and 998, which are shown in FIGS. 11 and 12, decode the DMA setup information transmitted during a setup write transaction to generate the internal control signals required to set up paths between memory controllers and one pair of system resource buses. FIG. 11 shows the switching logic involved in the transfer of control codes between the unidirectional control lines, CSUP and CSDN, of crosslink/memory controller buses 88 and 89 and of module interconnects 130 and 132. FIG. 12 shows the switching logic involved in the transfer of data between the bidirectional data lines of crosslink/memory controller buses 88 and 89 and of module interconnects 130 and 132.

Preferably, the CPU module and the system resource include pointer register means for indicating a DMA data address to be accessed by the CPU module and a DMA data address to be accessed by the system resource. As shown in FIG. 8, in memory controller 70 there are DMA registers 830 in DMA engine 800. DMA registers 830 include DMA address register 836, which is set to an initial value by DMA engine 800. In the I/O modules, the address in local RAM 1060 that will be accessed during a DMA operation is provided by a DMA address register in shared memory controller 1050, which is shown in FIG. 17.

In the preferred embodiment, a write transaction is initiated by CPU module 30, and memory controller 70 transmits DMA starting address information during this write transaction. The DMA starting address information specifies a DMA data address to be accessed by a system resource during an upcoming DMA transfer, and this information is transmitted to a system resource from memory controller 70 via the crosslink/memory controller bus 88, via crosslink 90, and (if the system resource is in zone 11) via module interconnect 130, or (if the system resource is in zone 11') via crosslink pathway 25, crosslink 90', and module interconnect 130'. The DMA data address is then stored in the pointer register in a system resource, such as in shared memory controller 1050 in I/O module 100.

Similarly, DMA engine 800 specifies a DMA data address in memory 60 to be accessed by memory controller 70 during an upcoming DMA transfer. This DMA starting address information is written into the pointer register in the memory controller, i.e., DMA address register 836.

As embodied herein, the CPU module and the system resource include count register means for indicating the number of bytes of DMA data to be accessed by the CPU module and by the system resource during an upcoming DMA transfer. As shown in FIG. 8, DMA registers 830 in DMA engine 800 include DMA byte counter register 832, which is set to an initial value by DMA engine 800 during set-up. In the I/O modules, DMA control 1890 in firewall 1000, which is shown in FIG. 18, keeps track of how many words or bytes are left to be transferred via DMA.

Preferably, a write transaction is initiated by CPU module 30, and memory controller 70 transmits DMA count information during this write transaction. The DMA count information specifies a DMA count of the number of bytes (words) of DMA data to be accessed during an upcoming DMA transfer, and this information is transmitted to a system resource from memory controller 70 via the crosslink/memory controller bus 88, via crosslink 90, and (if the system resource is in zone 11) via module interconnect 130, or (if the system resource is in zone 11') via crosslink pathway 25, crosslink 90', and module interconnect 130'. The DMA count is then stored in the count register in a system resource, such as in DMA control 1890 in firewall 1000 in I/O module 100. At the same time, this DMA count also is written into the pointer register in the memory controller, i.e., DMA byte counter register 832.

In the preferred embodiment of the invention, the DMA count is transmitted from memory controller 70 during a setup write transaction. The write data transmitted to a system resource during the setup write transaction includes DMA count information. As embodied herein, one bit in the write address transmitted during the setup write transaction identifies the zone (and therefore the pair of module interconnects) that will be involved in the DMA transfer, and if the write address corresponds to an address in the I/O space of system 10, a system resource coupled to one pair of the module interconnects will be involved in the DMA transfer. Finally, the write data transmitted during the setup write transaction preferably includes bits specifying the direction of the DMA transfer.

Reference should be made to FIGS. 24A-E, which are timing diagrams illustrating the transfer of control codes and DMA data on module interconnects 130 and 132 (FIGS. 24A, B, C, and E) or on crosslink/memory controller buses 88 and 89 (FIG. 24D) during a DMA transfer.

In accordance with the invention, a start DMA code is transmitted from memory controllers 70 and 75 to crosslinks 90 and 95 on the unidirectional control lines CSDN of buses 88 and 89. As shown in FIGS. 24A-24E, during each attempted DMA transfer, the first control code transmitted is a START code on the CSDN lines. The start DMA code is transmitted to one of the system resources via the crosslinks and via the pair of system resource buses coupled to the system resource.

The switching logic in crosslinks 90, 90', 95, and 95' is configured in accordance with the decoded DMA setup information in response to transmission of the DMA start code. The switching logic is not triggered until the DMA start code is received.

In crosslink 90 in the following examples, drivers 940, 946, 951, 969, and 992 are activated and deactivated by internal control signals from decoder 998. Decoder 998 also generates internal control signals that select which one of two inputs are routed through multiplexers CSMUXD 945, MUXC 976, and MUXD 982. Drivers 937 and 984 are activated and deactivated by decoders 971 and 996, so that control codes and DMA data from memory controller 70 can be transmitted to crosslink 90' in zone 11'.

In one example, the switching logic is configured to forward DMA data from the pair of system resource buses 130 and 132, via the switching logic in the pair of crosslinks 90 and 95 to the pair of memory controllers 70 and 75, and via the switching logic in the pair of crosslinks 90 and 95 and the switching logic in the pair of crosslinks 90' and 95' to the pair of memory controllers 70' and 75'. This path is set up at times when the DMA setup information decoded by decoders 971, 996, and 998 indicates that the DMA transfer is in the up direction, will involve zone 11 (and therefore the pair of module interconnects 130 and 132), and will involve a system resource (e.g., I/O module 100) coupled to one pair of module interconnects.

In this example, driver 969 is deactivated and driver 992 is activated, provided crosslink mode bits 916 indicate crosslink 90 is a master or is operating in duplex mode, because the DMA setup information indicates the DMA transfer is in the up direction. MUXC 976 selects the input from module interconnect 130 because the DMA setup information indicates that the transfer is in the up direction. MUXD 982 selects the input from module interconnect 130 because the DMA setup information indicates that the transfer involves zone 11. As a result, DMA data is transmitted from module interconnect 130 to memory controller 70.

Driver 951 is activated during this example if crosslink mode bits 916 indicate crosslink 90 is a master or is operating in duplex mode. CSMUXD 945 selects the input from module interconnect 130 because the DMA setup information indicates that the transfer will involve zone 11. As a result, control codes are transmitted from module interconnect 130 to memory controller 70.

In this example, drivers 946 and 984 are activated, provided crosslink 90 is a master or is operating in duplex mode, because the DMA setup information indicates that the transfer involves an I/O module in zone 11. As a result, control codes and DMA data from module interconnect 130 will be transmitted from crosslink 90 to memory controller 70' via crosslink 90'.

Driver 940 is activated and driver 937 is deactivated in this first example because the DMA setup information indicates that the transfer involves an I/O module in zone 11. Control codes are transmitted to module interconnect 130, either from memory controller 70, or from memory controller 70' via crosslink 90' and crosslink pathway 25. When crosslink mode bits 916 indicate crosslink 90 is a master, CSMUXA 935 selects the input from memory controller 70. When crosslink mode bits 916 indicate crosslink 90 is a slave, CSMUXA 935 selects the input from crosslink pathway 25. When the crosslinks are operating in duplex mode, either CSMUXA 935 selects the input from memory controller 70 while CSMUXA 935m selects the input from crosslink pathway 25, or CSMUXA 935 selects the input from crosslink pathway 25 while CSMUXA 935m selects the input from memory controller 75. As a result, in duplex mode, the control codes transmitted to module interconnects 130 and 132 and received at firewalls 1000 and 1010 of I/O module 100 are from two different zones.

In a second example, the switching logic is configured to forward DMA data from the pair of system resource buses 130' and 132', via the switching logic in the pair of crosslinks 90' and 95' to the pair or memory controllers 70' and 75', and via the switching logic in the pair of crosslinks 90' and 95' to the switching logic in the pair of crosslinks 90 and 95 and to the pair of memory controllers 70 and 75. This path is set up at times when the DMA setup information decoded by decoders 971, 996, and 998 indicates that the DMA transfer is in the up direction, will involve zone 11' (and therefore the pair of module interconnects 130' and 132'), and will involve a system resource (e.g., I/O module 100') coupled to one pair of module interconnects.

In this second example, driver 969 is deactivated and driver 992 is activated, provided crosslink mode bits 916 indicate crosslink 90 is a master or is operating in duplex mode, because the DMA setup information indicates the DMA transfer is in the up direction. MUXD 982 selects the input from crosslink pathway 25 because the DMA setup information indicates that the transfer involves zone 11'. As a result, DMA data is transmitted from module interconnect 130' to memory controller 70 via crosslink 90' and crosslink pathway 25.

Driver 951 is activated during this example if crosslink mode bits 916 indicate crosslink 90 is a master or is operating in duplex mode. CSMUXD 945 selects the input from crosslink pathway 25 because the DMA setup information indicates that the transfer will involve zone 11'. As a result control codes are transmitted from module interconnect 130' to memory controller 70 via crosslink 90' and crosslink pathway 25.

In this example, driver 946 is deactivated because the DMA setup information indicates that the transfer involves zone 11'. Driver 984 is deactivated because the DMA setup information indicates that the transfer is in the up direction and involves zone 11'. However, control codes and DMA data from module interconnect 130' will be transmitted from crosslink 90' to memory controller 70 via receivers 947 and 986 in crosslink 90.

Driver 940 is deactivated and driver 937 is activated in this second example because the DMA setup information indicates that the transfer involves zone 11'. The switching logic in crosslink 90' is configured to transmit control codes to module interconnect 130', either from memory controller 70', or from memory controller 70 via crosslink 90 and crosslink pathway 25. When crosslink mode bits 916 indicate crosslink 90 is a master, control codes are transmitted to module interconnect 130' from memory controller 70. When crosslink mode bits 916 indicate crosslink 90 is a slave, control codes are transmitted to module interconnect 130' from memory controller 70'. When the crosslinks are operating in duplex mode, either the switching logic in crosslink 90' selects the input from memory controller 70 while the switching logic in crosslink 95' selects the input from memory controller 75', or the switching logic in crosslink 90' selects the input from memory controller 70' while the switching logic in crosslink 95' selects the input from memory controller 75. As a result, in duplex mode, the control codes transmitted to module interconnects 130' and 132' and received at firewalls 1000 and 1010 of I/O module 100' are from two different zones.

In a third example, the switching logic is configured to forward DMA data, from either memory controller 70 or 75 via the switching logic in crosslink 90 or 95, and from either memory controller 70' or 75' via the switching logic in crosslinks 90' and 90 or crosslinks 95' and 95, to the pair of system resource buses 130 and 132. This path is set up at times when the DMA setup information decoded by decoders 971, 996, and 998 indicates that the DMA transfer is in the down direction, will involve zone 11 (and therefore the pair of module interconnects 130 and 132), and will involve a system resource (e.g., I/O module 100) coupled to one pair of module interconnects.

In this third example, driver 969 is activated and drivers 984 and 992 are deactivated because the DMA setup information indicates the DMA transfer is in the down direction and will involve an I/O module in zone 11. DMA data is transmitted to module interconnect 130, either from memory controller 70, or from memory controller 70', via crosslink 90' and crosslink pathway 25. When crosslink mode bits 916 indicate crosslink 90 is a master, MUXA 966 selects the input from memory controller 70. When crosslink mode bits 91 indicate crosslink 90 is a slave, MUXA 966 selects the input from crosslink pathway 25. When the crosslinks are operating in duplex mode, either MUXA 966 selects the input from memory controller 70 while MUXA (not shown) in crosslink 95 selects the input from crosslink pathway 25, or MUXA 966 selects the input from crosslink pathway 25 while MUXA in crosslink 95 selects the input from memory controller 75. As a result, in duplex mode, the DMA data transmitted to module interconnects 130 and 132 and received at firewalls 1000 and 1010 of I/O module 100 is from two different zones.

Driver 951 is activated during this example if crosslink mode bits 916 indicate crosslink 90 is a master or is operating in duplex mode. CSMUXD 945 selects the input from module interconnect 130 because the DMA setup information indicates that the transfer will involve zone 11. As a result, control codes are transmitted from module interconnect 130 to memory controller 70.

In this example, driver 946 is activated, provided crosslink 90 is a slave or is operating in duplex mode, because the DMA setup information indicates that the transfer involves an I/O module in zone 11. As a result, control codes from module interconnect 130 will be transmitted from crosslink 90 to memory controller 70' via crosslink 90'.

Driver 940 is activated and driver 937 is deactivated in this third example because the DMA setup information indicates that the transfer involves an I/O module in zone 11. Control codes are transmitted to module interconnect 130, either from memory controller 70, or from memory controller 70' via crosslink 90' and crosslink pathway 25. When crosslink mode bits 916 indicate crosslink 90 is a master, CSMUXA 935 selects the input from memory controller 70. When crosslink mode bits 916 indicate crosslink 90 is a slave, CSMUXA 935 selects the input from crosslink pathway 25. When the crosslinks are operating in duplex mode, either CSMUXA 935 selects the input from memory controller 70 while CSMUXA 935m selects the input from crosslink pathway 25, or CSMUXA 935 selects the input from crosslink pathway 25 while CSMUXA 935m selects the input from memory controller 75. As a result, in duplex mode, the control codes transmitted to module interconnects 30 and 132 and received at firewalls 1000 and 1010 of I/O module 100 are from two different zones.

In a fourth example, the switching logic is configured to forward DMA data, from either memory controller 70 or 75 via the switching logic in crosslinks 90 and 90' or 95 and 95', and from either memory controller 70' or 75' via the switching logic in crosslinks 90' or 95', to the pair of system resource buses 130' and 132'. This path is set up at times when the DMA setup information decoded by decoders 971, 996, and 998 indicates that the DMA transfer is in the down direction, will involve zone 11' (and therefore the pair of module interconnects 130' and 132'), and will involve a system resource (e.g., I/O module 100') coupled to one pair of module interconnects.

In this fourth example, driver 984 is activated, drivers 969 and 992 are deactivated, and MUXC 976 selects the input from memory controller 70 because the DMA setup information indicates the DMA transfer is in the down direction and will involve zone 11'. DMA data is transmitted to module interconnect 130' via crosslink 90', either from memory controller 70', or from memory controller 70 via crosslink 90 and crosslink pathway 25. When crosslink mode bits 916 indicate crosslink 90 is a master, the switching logic in crosslink 90' selects the input from memory controller 70'. When crosslink mode bits 916 indicate crosslink 90 is a slave, the switching logic in crosslink 90' selects the input from crosslink pathway 25. When the crosslinks are operating in duplex mode, either the switching logic in crosslink 90' selects the input from memory controller 70' while the switching logic in crosslink 95' selects the input from crosslink pathway 25, or the switching logic in crosslink 90' selects the input from crosslink pathway 25 while the switching logic in crosslink 95' selects the input from memory controller 75'. As a result, in duplex mode, the DMA data transmitted to module interconnects 130' and 132' and received at firewalls 1000 and 1010 of I/O module 100' is from two different zones.

Driver 951 is activated during this example if crosslink mode bits 916 indicate crosslink 90 is a master or is operating in duplex mode. CSMUXD 945 selects the input from crosslink pathway 25 because the DMA setup information indicates that the transfer will involve zone 11'. As a result, control codes are transmitted from module interconnect 130' to memory controller 70.

In this example, driver 946 is deactivated because the DMA setup information indicates that the transfer involves zone 11'. However, control codes from module interconnect 130' will be transmitted from crosslink 90' to memory controller 70 via receiver 947 in crosslink 90.

Driver 937 is activated and driver 940 is deactivated in this fourth example because the DMA setup information indicates that the transfer involves zone 11'. Control codes are transmitted to module interconnect 130' via crosslink 90', either from memory controller 70', or from memory controller 70 via crosslink 90 and crosslink pathway 25. When crosslink mode bits 916 indicate crosslink 90 is a slave, the switching logic in crosslink 90' selects the input from memory controller 70'. When crosslink mode bits 916 indicate crosslink 90 is a master, the switching logic in crosslink 90' selects the input from crosslink pathway 25. When the crosslinks are operating in duplex mode, either the switching logic in crosslink 90' selects the input from memory controller 70' while the switching logic in crosslink 95' selects the input from crosslink pathway 25, or the switching logic in crosslink 90' selects the input from crosslink pathway 25 while the switching logic in crosslink 95' selects the input from memory controller 75'. As a result, in duplex mode, the control codes transmitted to module interconnects 130' and 132' and received at firewalls 1000 and 1010 of I/O module 100' are from two different zones.

In accordance with the invention, in response to transmission of a start DMA code to one of the system resources (e.g., I/O module 100), an acknowledge code is transmitted to the memory controllers. As shown in FIGS. 24A-24E, during each attempted DMA transfer, the first control code transmitted on the CSUP lines is an ACK code. Preferably, a system resource transmits an acknowledge code to the memory controllers in response to a start DMA code to indicate that the system resource has control of the pair of system resource buses coupled to the system resource.

In this example, ACK codes are transmitted by firewalls 1000 and 1010 in I/O module 100 to the crosslinks 90 and 95 via the pair of module interconnects 130 and 132 to indicate that firewalls 1000 and 1010 have control of II32T bus 1020. Memory controllers 70 and 75 receive ACK codes from crosslinks 90 and 95 on the unidirectional control lines CSUP of buses 88 and 89. The ACK codes also are transmitted from crosslinks 90 and 95 to memory controllers 70' and 75' via crosslinks 90' and 95' and via buses 88' and 89'.

In the present invention, at times when the DMA transfer is in the up direction, and after transmission of an acknowledge code from a system resource, the system resource transmits DMA data to the memory controllers, via the pair of system resource buses coupled to the system resource, and via the switching logic in the crosslinks. Preferably, as shown in FIGS. 24C-24E, during DMA transfers from a system resource (e.g., I/O module 100) to the memory controllers, a DMA code is transmitted on the CSUP lines of module interconnects 130 and 132 to crosslinks 90 and 95. The DMA code then is transmitted from crosslinks 90 and 95, to the CSUP lines of crosslink/memory controller buses 88 and 89 and (via crosslinks 90' and 95') to the CSUP lines of crosslink/memory controller buses 88' and 89'. Transmission of the DMA code on the CSUP lines indicates data is being sent to the memory controllers on the bidirectional data lines of module interconnects 130 and 132 and crosslink/memory controller buses 88, 89, 88', and 89'.

DMA data is accessed by the system resource from the DMA data address indicated by a pointer register in the system resource, e.g., by shared memory controller 1050 in I/O module 100. I/O module 100 drives the bidirectional data lines of module interconnects 130 and 132 with this DMA data, and crosslinks 90, 95, 90', and 95' drive the bidirectional data lines of buses 88, 89, 88', and 89' and forward this DMA data to the memory controllers, as shown in FIGS. 24C-E.

In accordance with the invention, at times when the DMA transfer is in the down direction, and after transmission of an acknowledge code from a system resource, the memory controllers transmit DMA data to one of the system resources, via the switching logic in the crosslinks, and via the pair of system resource buses coupled to the system resource. In the preferred embodiment shown in FIGS. 24A-24B, during DMA transfers to a system resource (e.g., I/O module 100), a DMA code is transmitted on the CSDN lines of crosslink/memory controller buses 88, 89, 88', and 89' to crosslinks 90, 95, 90', and 95'. The DMA code then is transmitted from crosslinks 90 and 95 to the CSDN lines of module interconnects 130 and 132. Transmission of the DMA code on the CSDN lines indicates data is being sent to the system resource on the bidirectional data lines of crosslink/memory controller buses 88, 89, 88', and 89' and module interconnects 130 and 132.

DMA data is accessed by each memory controller from the DMA data address in memory 60 or 60' indicated by a pointer register in the memory controller, e.g., by DMA address register 836 in memory controller 70. Memory controllers 70, 75, 70', and 75' drive the bidirectional data lines of buses 88, 89, 88', and 89' with this DMA data, and crosslinks 90 and 95 drive the bidirectional data lines of module interconnects 130 and 132 and forward this DMA data to firewalls 1000 and 1010 of I/O module 100, as shown in FIGS. 24A-B.

In a preferred embodiment of the invention, after transmission of an acknowledge code from a system resource (e.g., I/O module 100), a stall code may be transmitted to the memory controllers. As shown in FIGS. 24A-24E, during DMA transfers, a STALL code may be transmitted on the CSUP lines. Preferably, a system resource transmits a stall code to the memory controllers at times when the DMA transfer is in the down direction to indicate that the system resource is not ready to accept DMA data from the memory controllers. Similarly, the system resource transmits a stall code to the memory controllers at times when the DMA transfer is in the up direction to indicate that the system resource is not ready to send DMA data to the memory controllers.

In this example, STALL codes are transmitted by firewalls 1000 and 1010 in I/O module 100 to the crosslinks 90 and 95 via the pair of module interconnects 130 and 132. Memory controllers 70 and 75 receive STALL codes from crosslinks 90 and 95 on the unidirectional control lines CSUP of buses 88 and 89. The STALL codes also are transmitted from crosslinks 90 and 95 to memory controllers 70' and 75' via crosslinks 90' and 95' and via buses 88' and 89'.

In FIGS. 24A and 24B, the transmission of control codes and DMA data on the module interconnects is shown. The same control codes and DMA data also are transmitted on the crosslink/memory controller buses, but the period from transmission of a control code by a system resource on the CSUP lines until transmission of a response by the memory controllers on the CSDN lines and the data lines is shorter on the crosslink/memory controller buses.

As shown in FIGS. 24A and 24B, there is a delay before DMA data is transmitted on module interconnects 130 and 132 in response to transmission of an ACK code, and there also is a delay before the memory controllers stop transmitting DMA data on module interconnects 130 and 132 in response to transmission of a STALL code by the system resource. The response times are longer for transfers of control codes and DMA data on the system resource buses because of the additional delay time introduced in order to route control codes and DMA data via crosslink pathway 25 and the switching logic in crosslinks 90, 95, 90', and 95'. As a result, if a system resource transmits a STALL code indicating that it is not ready to accept DMA data from the memory controllers, the system resource still must have enough available storage to accept the additional DMA data that will be transmitted to the system resource before the memory controllers receive the STALL code.

In accordance with the invention, after transmission of DMA data between the memory controllers and one of the system resources (e.g., I/O module 100), a done code is transmitted to the memory controllers. Preferably, a system resource transmits a done code to the memory controllers to indicate successful DMA data transmission. As shown in FIGS. 24A and 24C, after a successful transmission of DMA data, a DONE code is transmitted on the CSUP lines.

As embodied herein, a DMA count transmitted to the firewalls of I/O module 100 during a setup write transaction indicates the number of bytes of DMA data to be accessed during the entire DMA transfer. Preferably, a number of subtransfers of DMA data are performed in order to transmit the number of bytes specified by the DMA count. A START code is transmitted to begin each subtransfer, and a DONE code is transmitted to indicate completion of the subtransfer.

In this example, DONE codes are transmitted by firewalls 1000 and 1010 in I/O module 100 to the crosslinks 90 and 95 via the pair of module interconnects 130 and 132 to indicate that firewalls 1000 and 1010 have not detected a miscompare error during the preceding subtransfer of DMA data. At times when the DMA transfer is in the up direction, the transmission of DONE codes after the last subtransfer, i.e., after the number of bytes specified by the DMA count has been transmitted, also indicates that firewalls 1000 and 1010 have not detected a EDC/CRC error during the entire transfer of DMA data. Memory controllers 70 and 75 receive DONE codes from crosslinks 90 and 95 on the CSUP lines of buses 88 and 89. The DONE codes also are transmitted from crosslinks 90 and 95 to memory controllers 70' and 75' via crosslinks 90' and 95' and via buses 88' and 89'.

In the preferred embodiment of the invention, after transmission of the acknowledge code from one of the system resources (e.g., I/O module 100), an error code may be transmitted to the memory controllers. Preferably, a system resource transmits an error code to the memory controllers to indicate unsuccessful DMA data transmission. As shown in FIGS. 24B, 24D, and 24E, when an attempted transmission of DMA data is unsuccessful, an ERROR code or a CRC ERROR code is transmitted on the CSUP lines.

In the example shown in FIG. 24B, at times when the DMA transfer is in the down direction, firewall comparison circuit 1840 (FIG. 18) is used by firewalls 1000 and 1010 in I/O module 100 to detect whether there is a miscompare error between the two sets of DMA data and control codes transmitted to I/O module 100 on module interconnects 130 and 132. If firewalls 1000 and 1010 detect a miscompare error during the subtransfer of control codes and DMA data, ERROR codes are transmitted by firewalls 1000 and 1010 in I/O module 100 to the crosslinks 90 and 95 via the pair of module interconnects 130 and 132. Memory controllers 70 and 75 receive ERROR codes from crosslinks 90 and 95 on the CSUP lines of buses 88 and 89. The ERROR codes also are transmitted from crosslinks 90 and 95 to memory controllers 70' and 75' via crosslinks 90' and 95' and via buses 88' and 89'.

In the example shown in FIG. 24D, at times when the DMA transfer is in the up direction, logic gates 960 and 960m are used by crosslinks 90 and 95 to detect whether there is a miscompare error between the two sets of control codes transmitted from I/O module 100 on module interconnects 130 and 132. If logic gates 960 and 960m detect a miscompare error during the preceding subtransfer of control codes, ERROR codes are transmitted by crosslinks 90 and 95 to memory controllers 70 and 75 on the CSUP lines of buses 88 and 89. Crosslinks 90' and 95' also include logic gates for detecting whether there is a miscompare error between two sets of control codes transmitted from I/O module 100 to crosslinks 90' and 95' via the crosslink pathway, and transmit ERROR codes to memory controllers 70' and 75'.

Finally, in the example shown in FIG. 24E, at times when the DMA transfer is in the up direction, DMA control 1890 in firewalls 1000 and 1010 in I/O module 100 reads the generated EDC/CRC from EDC/CRC generator 1850 to detect whether there are any EDC/CRC errors in the DMA data transmitted by I/O module 100 to the memory controllers. This occurs only after the last subtransfer, i.e., after the number of bytes specified by the DMA count has been transmitted. If firewalls 1000 and 1010 detect a CRC error for the preceding transfers of DMA data, CRC ERROR codes are transmitted by firewalls 1000 and 1010 in I/O module 100 to the crosslinks 90 and 95 via the pair of module interconnects 130 and 132. Memory controllers 70 and 75 receive the CRC ERROR codes from crosslinks 90 and 95 on the CSUP lines of buses 88 and 89. The CRC ERROR codes also are transmitted from crosslinks 90 and 95 to memory controllers 70' and 75' via crosslinks 90' and 95' and via buses 88' and 89'.

Figure 25A:
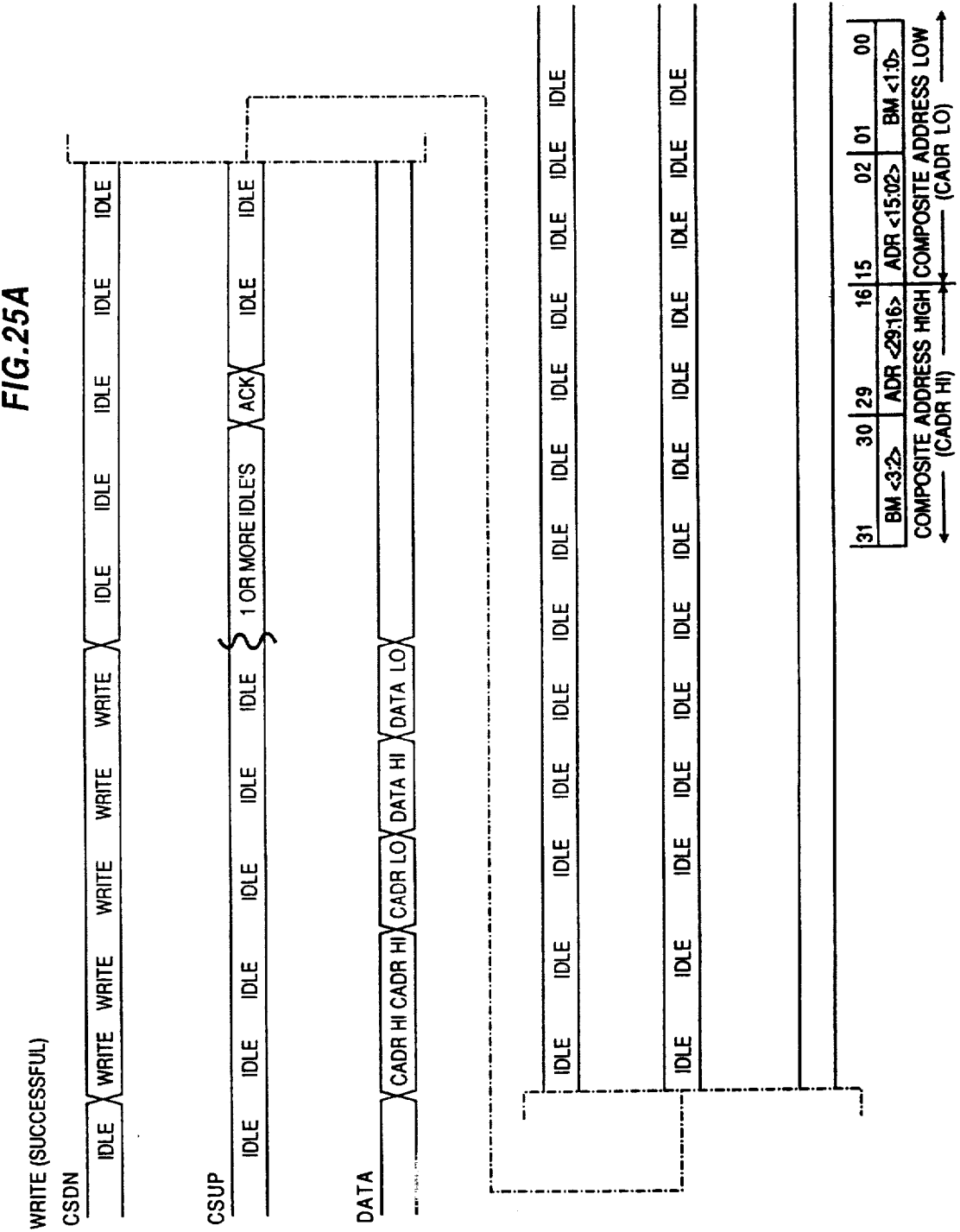

Transfers of data via read and write cycles (transactions) will now be described. Reference should be made to FIGS. 25A-D, which are timing diagrams illustrating the transfer on crosslink/memory controller buses 88 and 89 of write information (FIGS. 25A and 25B) and read information (FIGS. 25C and 25D).

In accordance with the invention, a processor transmits write or read information to a data router. For example, CPU module 30 transmits write information to crosslinks 90 and 95 of crosslink/memory controller buses 88 and 89.

The write or read information respectively designates a write or read transaction. In the preferred embodiment, write and read transactions are identified by the transmission of control codes from memory controllers 70 and 75 on the CSDN lines of the crosslink/memory controller buses 88 and 89. As shown in FIGS. 25A-25D, a WRITE code is transmitted on the CSDN lines by CPU module 30 to uniquely designate a write transaction, and a READ code is transmitted on the CSDN lines to uniquely designate a read transaction. A setup write transaction, which has been discussed previously, looks identical to the write transaction illustrated in FIGS. 25A and 25B, except a SETUP WRITE code is transmitted on the CSDN lines to distinguish it from a write transaction.

In the present invention, write information transmitted from the processor includes a write address, and read information transmitted from the processor includes a read address. A write address designates a destination for write data, and a read address designates a source for read data. As embodied herein and shown in FIGS. 25A-D, the most significant bits in the write or read address are included in the data transmitted on the data lines of the crosslink/memory controller buses 88 and 89 at the start of the write or read transaction.

In order to store write data in a system resource (e.g., I/O module 100) or access read data from a system resource, the processor initiating the write or read transaction must transmit information to the system resource. However, the I/O modules in system 10 are not directly connected to CPU modules 30 and 30'. Instead, the I/O modules must be accessed via the system resource buses, i.e., module interconnects 130, 132, 130', and 132'.

Crosslinks 90, 95, 90', and 95' function as data routers that set up paths coupling specific processors to a particular system resource. However, switching logic is required in the crosslinks because a system resource that is the source of read data or the destination for write data may be coupled either to module interconnects 130 and 132 or to module interconnects 130' and 132'.

After write information including a write address specifying a destination is transmitted, for example, from memory controller 70 to crosslink 90, this information must be forwarded to the system resource corresponding to the destination. If, for example, the destination corresponds to I/O module 100, the switching logic in crosslink 90 must be configured to transmit write information from memory controller 70 to module interconnect 130. If, on the other hand, the destination corresponds to I/O module 100', the switching logic in crosslink 90 must be configured to transmit write information from memory controller 70 to module interconnect 130' via crosslink pathway 25 and crosslink 90'.

Similarly, if read information including a read address specifying a source is transmitted, for example, from memory controller 70 to crosslink 90, this read information must be forwarded to the system resource corresponding to the source to enable accessing of read data by memory controller 70.

Therefore, in accordance with the invention, the data routers include means for decoding the read or write address during the transaction. The data routers determine which pair of system resource buses, module interconnects 130 and 132 or module interconnects 130' and 132', will be involved in the transaction. The data routers also determine whether the destination (for a write transaction) or the source (for a read transaction) corresponds to a system resource coupled to the system resource buses.

In the preferred embodiment of the invention shown in FIGS. 11 and 12, decoders 971, 996, and 998 are provided to decode the write or read address transmitted during a write or read transaction to generate the internal control signals required to set up paths between the memory controllers and one pair of system resource buses. FIG. 11 shows the switching logic in crosslinks 90 and 95 involved in the transfer of control codes between the CSUP and CSDN lines of crosslink/memory controller buses 88 and 89 and of module interconnects 130 and 132. FIG. 12 shows the switching logic in crosslink 90 involved in the transfer of data, such as write and read addresses and write and read data, between the bidirectional data lines of crosslink/memory controller buses 88 and 89 and of module interconnects 130 and 132.

As embodied herein, one bit in the read or write address transmitted during the read or write transaction identifies the zone in which the source or destination is located. As a result, the decoders in the crosslink can determine which pair of module interconnects will be involved in the transaction. Furthermore, if the read or write address corresponds to an address in the I/O space of system 10, the decoders in the crosslink can determine that the transaction will involve a system resource, i.e., an I/O module, coupled to one pair of the module interconnects.

In response to initiation of a read or write transaction, the switching logic in crosslinks 90, 90', 95, and 95' is configured in accordance with the decoded read or write address.

When system 10 is operating in duplex mode, the data switching logic in the crosslinks is configured to forward data, i.e., read addresses, write addresses, or write data, to system resource buses 130 and 132, if the transaction involves the pair of system resource buses 130 and 132 in zone 11 and if the source or destination corresponds to a system resource coupled to the system resource buses. In this example, a path is configured to forward data to module interconnect 130 either from CPU 40 via crosslink 90 or from CPU 40' via crosslinks 90' and 90, and also to forward data to module interconnect 132 either from CPU 50 via crosslink 95 or from CPU 50' via crosslinks 95' and 95.

The exact configuration of the switching logic shown in FIGS. 11 and 12 in order to set up this path to module interconnects 130 and 132 is described above in the description relating to a third example of DMA transfers, in which DMA data is forwarded to system resource buses 130 and 132.

If the transaction involves the pair of system resource buses 130' and 132' in zone 11' and if the source or destination corresponds to a system resource coupled to the system resource buses, the data switching logic in the crosslinks is configured to forward the data to system resource buses 130' and 132'. In this second example, a path is configured to forward data to module interconnect 130' either from CPU 40' via crosslink 90' or from CPU 40 via crosslinks 90 and 90', and also to forward data to module interconnect 132' either from CPU 50' via crosslink 95' or from CPU 50 via crosslinks 95 and 95'.

The exact configuration of the switching logic shown in FIGS. 11 and 12 in order to set up this path to module interconnects 130' and 132' is described above in the description relating to a fourth example of DMA transfers, in which DMA data is forwarded to system resource buses 130' and 132'.

In the preferred embodiment of the invention, the read or write address transmitted to the crosslinks at the beginning of the transaction is needed in order to configure the switching logic. As a result, there is not sufficient time to decode the address, configure the switching logic, and then forward that same address to the source or destination via the switching logic.

However, the read or write address provided by a processor at the beginning of a transaction must be transmitted to the system resource corresponding to the source or destination. The read address is required because it allows the system resource to access read data from the source specified by the read address, and the write address is necessary to enable the system resource to store write data in the destination designated by the write address.

One way of implementing the system, which would result in the read or write address being available for forwarding after the switching logic is configured, would be to latch all data entering the crosslinks for a time period long enough to configure the switching logic. However, this would require the addition of circuitry to the system for holding all data transmitted from the processors to the system resources. Furthermore, the pipeline delay between components in the system would be increased, unless other logic also was added to recognize and delay only addresses sent at the beginning of a read or write transactions.

In computer system 10, the read and write addresses are forwarded from the processors to the system resources without the addition of any special circuitry to the crosslinks and without increasing the delay required before data transmitted from a processor is received at an I/O module.

In accordance with the invention, a read or write address is retransmitted from the processors to the data routers during a read or write transaction. As shown in FIG. 25A-D, the most significant bits of the read or write address, which are transmitted on the CSDN lines of buses 88 and 89 at the beginning of the transaction, are then retransmitted on the CSDN lines.

In the present invention, the read or write address that is retransmitted by the processors is then forwarded to the appropriate pair of system resource buses involved in the transaction, provided the source or destination corresponds to a system resource (e.g., an I/O module) coupled to one of the pairs of system resource buses. The address is forwarded to module interconnects 130 and 132, or to module interconnects 130' and 132', via the switching logic in crosslinks 90, 95, 90', 95'.

The retransmission of the address provides the crosslinks with sufficient time to set up a path from specific processors to the system resource corresponding to the source or destination. As a result, when the address is retransmitted, the switching logic is configured to route the address to the pair of module interconnects coupled to the system resource.

In accordance with the invention, after transmission of a write address, the processors transmit write data to the data routers coupled to each processor. The switching logic in the crosslinks is properly configured, and therefore this write data is forwarded via the switching logic to the appropriate pair of system resource buses involved in the transaction. The manner in which write data is forwarded by the switching logic is the same as the manner in which the retransmitted write address is forwarded.

As shown in FIGS. 25A and 25B, write data is provided during a write transaction by memory controllers 70 and 75 on the bidirectional data lines of buses 88 and 89. The system resource that receives the write address and write data responds by attempting to store the write data in the destination designated by the write address.

In accordance with the invention, after forwarding of the read address by the switching logic during a read transaction, the data switching logic in the data routers is then reconfigured in accordance with the read address decoded by the data routers. As shown in FIG. 12, the data switching logic is reconfigured after the read address is sent in the down direction in order to allow read data to be forwarded to CPU modules 30 and 30' in the up direction.

When system 10 is operating in duplex mode, the data switching logic in the crosslinks is configured to forward read data from system resource buses 130 and 132, if the transaction involves the pair of system resource buses 130 and 132 in zone 11 and if the source corresponds to a system resource coupled to the system resource buses. In this example, a path is configured to forward read data from module interconnect 130 to CPU 40 via crosslink 90 and to CPU 40' via crosslinks 90 and 90', and also to forward read data from module interconnect 132 to CPU 50 via crosslink 95 and to CPU 50' via crosslinks 95 and 95'.

The exact configuration of the data switching logic shown in FIG. 12 in order to set up this path from module interconnects 130 and 132 is described above in the description relating to a first example of DMA transfers, in which DMA data is forwarded from system resource buses 130 and 132.

If the transaction involves the pair of system resource buses 130' and 132' in zone 11' and if the source corresponds to a system resource coupled to the system resource buses, the data switching logic in the crosslinks is configured to forward the read data from system resource buses 130' and 132'. In this second example, a path is configured to forward read data from module interconnect 130' to CPU 40' via crosslink 90' and to CPU 40 via crosslinks 90' and 90, and also to forward read data from module interconnect 132' to CPU 50' via crosslink 95' and to CPU 50 via crosslinks 95' and 95.

The exact configuration of the data switching logic shown in FIG. 12 in order to set up this path from module interconnects 130' and 132' is described above in the description relating to a second example of DMA transfers, in which DMA data is forwarded from system resource buses 130' and 132'.

In response to receipt of the read address, a system resource accesses read data from the source designated by the read address, and transmits this read data to the pair of system resource buses coupled to the system resource. The data switching logic in the crosslinks is reconfigured after forwarding of the read address. Therefore, in duplex mode the read data is received by each of the crosslinks and is forwarded via the switching logic to each of the processors.

As shown in FIG. 25C, in response to initiation of a read transaction, read data is transmitted to memory controllers 70, 75, 70', and 75' by crosslinks 90, 95, 90', and 95' on the bidirectional data lines of buses 88, 89, 88', and 89'. As a result, CPU's 40, 50, 40', and 50' in CPU modules 30 and 30' are able to access read data located at the source designated by the read address.

Preferably, as shown in FIGS. 25A and 25C, in response to transmission of a write address and write data or a read address to one of the system resources (e.g., I/O module 100), an acknowledge code is transmitted to each of the processors on the CSUP lines of module interconnects 130, 132, 130', and 132' and on the CSUP lines of buses 88, 89, 88', and 89'. The system resource that receives read or write information from the processors will transmit an ACK control code to each of the processors to indicate successful transmission of the write address and write data or of the read address.

As an example, if I/O module 100 receives the write address and write data or the read address, firewalls 1000 and 1010 in I/O module 100 transmit an ACK control code to the crosslinks 90 and 95 via the pair of module interconnects 130 and 132 to indicate that firewalls 1000 and 1010 have not detected an error in data transmission from the processors in the down direction. In CPU module 30, memory controllers 70 and 75 receive the ACK codes from crosslinks 90 and 95 on the unidirectional control lines CSUP of buses 88 and 89. The ACK codes also are transmitted from crosslinks 90 and 95 to memory controllers 70' and 75' in CPU module 30' via crosslinks 90' and 95' and via buses 88' and 89'.

Preferably, as shown in FIGS. 25B and 25D, in response to transmission of a write address and write data or a read address to one of the system resources (e.g., I/O module 100), an error code is transmitted to each of the processors on the CSUP lines of module interconnects 130, 132, 130', and 132' and on the CSUP lines of buses 88, 89, 88', and 89'. The system resource that receives read or write information from the processors will transmit an ERROR control code to each of the processors to indicate unsuccessful transmission of the write address and write data o of the read address.

As another example, if I/O module 100 receives the write address and write data or the read address, firewalls 1000 and 1010 in I/O module 100 transmit an ERROR control code to the crosslinks 90 and 95 via the pair of module interconnects 130 and 132 to indicate that firewalls 1000 and 1010 have detected an error in data transmission from the processors in the down direction. In the preferred embodiment of system 10, the ERROR control code indicates that firewalls 1000 and 1010 have detected a miscompare error as a result of comparing the data transmitted from one of the CPU modules on module interconnect 130 with the data transmitted from the other CPU module on module interconnect 132. In CPU module 30, memory controllers 70 and 75 receive the ERROR control codes from crosslinks 90 and 95 on the unidirectionl control lines CSUP of buses 88 and 89 The ERROR control codes also are transmitted from crosslinks 90 and 95 to memory controllers 70' and 75' in CPU module 30' via crosslinks 90' and 95' and via buses 88' and 89'.

Preferably, during read and write transactions, including a write transaction used to transmit DMA starting address information, and during a setup write transaction used to transmit the DMA count, read or write address information is interleaved on the bidirectional data lines of crosslink/memory controller buses 88 and 89 with byte mask information. As shown in FIGS. 25A and 25C, four bits of byte mask data are provided for each longword (i.e., four bytes) of data. As a result, particular bytes within an addressed longword can be selected using the byte mask data.

In the preferred embodiment of the invention, certain transfers of information via DMA occur in synchronism with a particular clock phase. As shown in FIGS. 24A-E, whenever DMA data is transferred in either direction, the beginning of the transmission of each longword is synchronized with clock phase P6, which is generated by phase generator 2310 (FIG. 23). Furthermore, DONE and ERROR codes are always transmitted to the memory controllers on the CSUP lines in phase with clock phase P6.

In the embodiment of the invention shown in FIGS. 24A-E, an ACK code is transmitted by the firewalls on the CSUP lines to the memory controllers in synchronism with clock phase P6. When this occurs, transmission of the ACK code is followed by transmission of a STALL code, because the bidirectional data lines of crosslink/memory controller buses 88 and 89 only carry sixteen bits of data, whereas the memory controllers can process data in units of thirty-two bits. Alternatively, if the ACK code is not transmitted in phase with the clock phase P6, the subsequent STALL code is not necessary, but the CSUP lines must be idle during the preceding clock phase P6.

It will be apparent to those skilled in the art that various modifications and variations can be made in the data transfer protocol of the present invention without departing from the scope or spirit of the invention. Thus, it is intended that the present invention cover the modifications and variations or this invention provided they come within the scope of the appended claims and their equivalents.

What is claimed is:

1. A process for transferring data via DMA between components in a computer system, wherein the computer system includes a memory controller, a first system resource bus coupled to a system resource, and a data router, wherein the data router includes switching logic for coupling the memory controller to the first system resource bus, and wherein the process comprises the following steps:

transmitting DMA setup information designating a setup write transaction, from the memory controller to the system resource to indicate an upcoming DMA transfer, via the data router and via the first system resource bus coupled to said system resource, wherein said DMA setup information corresponds to said upcoming DMA transfer, and indicates a direction of the DMA transfer as either an up direction from said system resource to said memory controller or a down direction from said memory controller to said system resource, and indicates whether said DMA transfer will involve said first system resource bus;

decoding said DMA setup information in the data router, to determine the direction of said DMA transfer, and to determine whether said DMA transfer will involve said first system resource bus;

transmitting a start DMA code, from said memory controller to said system resource, via the data router and via said first system resource bus coupled to said system resource;

configuring the switching logic in said data router, in response to transmission of said start DMA code, and in accordance with said DMA setup information decoded by said data router;

wherein said switching logic is configured to forward DMA data, from said first system resource bus to said memory controller, at times when said DMA transfer is in the up direction and said DMA transfer will involve said first system resource bus; and wherein said switching logic is configured to forward DMA data, from said memory controller to said first system resource bus, at times when said DMA transfer is in the down direction and said DMA transfer will involve said first system resource bus;

transmitting an acknowledge code, from said system resource to said memory controller, via said first system resource bus coupled to said system resource, and via the switching logic in said data router, in response to transmission of said start DMA code;

transmitting DMA data, after transmission of said acknowledge code, at times when said DMA transfer is in the up direction, from said system resource to said memory controller, via said first system resource bus coupled to said system resource, and via the switching logic in said data router;

transmitting DMA data, after transmission of said acknowledge code, at times when said DMA transfer is in the down direction, from said memory controller to said system resource, via the switching logic in said data router, and via said first system resource bus coupled to said system resource; and transmitting a done code, after transmission of DMA data, from said system resource to said memory controller, via said first system resource bus coupled to said system resource, and via the switching logic in said data router, to indicate successful DMA data transmission.

2. A process for transferring data via DMA between components in a computer system, wherein the computer system includes a memory controller, a first system resource bus coupled to a first system resource, a second system resource bus coupled to a second system resource, and a data router, wherein the data router includes switching logic for coupling the memory controller to the first system resource bus or to the second system resource bus, and wherein the process comprises the following steps:

transmitting DMA setup information designating a setup write transaction, from the memory controller to one of the system resources to indicate an upcoming DMA transfer, via the data router and via the system resource bus coupled to said one system resource, wherein said DMA setup information corresponds to said upcoming DMA transfer, and indicates a direction of the DMA transfer as either an up direction from said one system resource to said memory controller or a down direction from said memory controller to said one system resource, and indicates which system resource bus the DMA transfer will involve;

decoding said DMA setup information in the data router, to determine the direction of said DMA transfer, and to determine which system resource bus said DMA transfer will involve;

transmitting a start DMA code, from said memory controller to said one system resource, via the data router and via the system resource bus coupled to said one system resource;

configuring the switching logic in said date router, in response to transmission of said start DMA code, and in accordance with said DMA setup information decoded by said data router;

wherein said switching logic is configured to forward DMA data, from the first system resource bus to said memory controller, at times when said DMA transfer is in the up direction and said DMA transfer will involve the first system resource bus;

wherein said switching logic is configured to forward DMA data, from the second system resource bus to said memory controller, at times when said DMA transfer is in the up direction and said DMA transfer will involve the second system resource bus;

wherein said switching logic is configured to forward DMA data, from said memory controller to the first system resource bus, at times when said DMA transfer is in the down direction and said DMA transfer will involve the first system resource bus; and wherein said switching logic is configured to forward DMA data, from said memory controller to the second system resource bus, at times when said DMA transfer is in the down direction and said DMA transfer will involve the second system resource bus;

transmitting an acknowledge code, from said one system resource to said memory controller, via the system resource bus coupled to said one system resource, and via the switching logic in said data router, in response to transmission of said start DMA code;

transmitting DMA data, after transmission of said acknowledge code, at times when said DMA transfer is in the up direction, from said one system resource to said memory controller, via the system resource bus coupled to said one system resource, and via the switching logic in said data router;

transmitting DMA data, after transmission of said acknowledge code, at times when said DMA transfer is in the down direction, from said memory controller to said one system resource, via the switching logic in said data router, and via the system resource bus coupled to said one system resource; and transmitting a done code, after transmission of DMA data, from said one system resource to said memory controller, via the system resource bus coupled to said one system resource, and via the switching logic in said data router, to indicate successful DMA data transmission.

3. A process in accordance with claim 2, and further comprising:
transmitting an error code, from the switching logic in said data router, to said memory controller, after transmission of said acknowledge code, to indicate unsuccessful DMA data transmission.

4. A process in accordance with claim 3, and further comprising:
transmitting a stall code, from said one system resource to said memory controller, via the system resource bus coupled to said one system resource, and via the switching logic in said data router, after transmission of said acknowledge code, to indicate said one system resource is not ready to accept DMA data transmitted in the down direction from said memory controller at times when the DMA transfer is in the down direction and to indicate said one system resource is not ready to send DMA data in the up direction at times when the DMA transfer is in the up direction.

5. A process in accordance with claim 2, and further comprising:
transmitting an error code, from said one system resource to said memory controller, via the system resource bus coupled to said one system resource, and via the switching logic in said data router, after transmission of DMA data in the up direction, to indicate an error in DMA data transmission.

6. A process in accordance with claim 5, and further comprising:
transmitting a stall code, from said one system resource to said memory controller, via the system resource bus coupled to said one system resource, and via the switching logic in said data router, after transmission of said acknowledge code, to indicate said one system resource is not ready to send DMA data in the up direction.

7. A process in accordance with claim 5, in which the error code is a CRC error code to indicate a CRC error in DMA data transmission.

8. A process in accordance with claim 7, and further comprising:
transmitting a stall code, from said one system resource to said memory controller, via the system resource bus coupled to said one system resource, and via the switching logic in said data router, after transmission of said acknowledge code, to indicate said one system resource is not ready to send DMA data in the up direction.

9. A process in accordance with claim 2, and further comprising:
transmitting a stall code, from said one system resource to said memory controller, via the system resource bus coupled to said one system resource, and via the switching logic in said data router, after transmission of said acknowledge code, to indicate said one system resource is not ready to accept DMA data transmitted in the down direction from said memory controller at times when the DMA transfer is in the down direction and to indicate said one system resource is not ready to send DMA data in the up direction at times when the DMA transfer is in the up direction.

10. A process in accordance with claims 2, 3, 4, 5, 6, or 9, wherein said switching logic includes downstream and upstream switching logic, and wherein the process comprises:
configuring the downstream and upstream switching logic in said data router, in response to transmission of said start DMA code, and in accordance with said DMA setup information decoded by said data router;

wherein said upstream switching logic is configured to forward codes, from the first system resource bus to said memory controller, at times when said DMA transfer will involve the first system resource bus;

wherein said upstream switching logic is configured to forward codes, from the second system resource bus to said memory controller, at times when said DMA transfer will involve the second system resource bus;

wherein said upstream switching logic is configured to forward DMA data, from the first system resource bus to said memory controller, at times when said DMA transfer is in the up direction and said DMA transfer will involve the first system resource bus;

wherein said upstream switching logic is configured to forward DMA data, from the second system resource bus to said memory controller, at times when said DMA transfer is in the up direction and said DMA transfer will involve the second system resource bus;

wherein said downstream switching logic is configured to forward DMA data, from said memory controller to the first system resource bus, at times when said DMA transfer is in the down direction and said DMA transfer will involve the first system resource bus; and wherein said downstream switching logic is configured to forward DMA data, from said memory controller to the second system resource bus, at times when said DMA transfer is in the down direction and said DMA transfer will involve the second system resource bus.

11. A process in accordance with claim 2, 3, 4, 5, 6, or 9, wherein said one system resource has a count register for indicating the number of bytes of DMA data to be accessed by said one system resource during said DMA transfer, and further comprising:

transmitting DMA count information during a write transaction, from the memory controller to said one system resource, via the data router and via the system resource bus coupled to said one system resource, prior to transmission of said start DMA code from said memory controller to said one system resource, wherein said DMA count information specifies a DMA count of the number of bytes of DMA data to be accessed by said one system resource during said DMA transfer;

storing the DMA count in the count register in said one system resource, after transmission of said DMA count information from said memory controller to said one system resource.

12. A process in accordance with claim 11, wherein said switching logic includes downstream and upstream switching logic, and wherein the process comprises:

configuring the downstream and upstream switching logic in said data router, in response to transmission of said start DMA code, and in accordance with said DMA setup information decoded by said data router;

wherein said upstream switching logic is configured to forward codes, from the first system resource bus to said memory controller, at times when said DMA transfer will involve the first system resource bus;

wherein said upstream switching logic is configured to forward codes, from the second system resource bus to said memory controller, at times when said DMA transfer will involve the second system resource bus;

wherein said upstream switching logic is configured to forward DMA data, from the first system resource bus to said memory controller, at times when said DMA transfer is in the up direction and said DMA transfer will involve the first system resource bus;

wherein said upstream switching logic is configured to forward DMA data, from the second system resource bus to said memory controller, at times when said DMA transfer is in the up direction and said DMA transfer will involve the second system resource bus;

wherein said downstream switching logic is configured to forward DMA data, from said memory controller to the first system resource bus, at times when said DMA transfer is in the down direction and said DMA transfer will involve the first system resource bus; and wherein said downstream switching logic is configured to forward DMA data, from said memory controller to the second system resource bus, at times when said DMA transfer is in the down direction and said DMA transfer will involve the second system resource bus.

13. A process in accordance with claims 2, 3, 4, 5, 6, or 9, wherein said one system resource has a pointer register for indicating a DMA data address to be accessed by said one system resource, and further comprising:

transmitting DMA starting address information during a write transaction, from the memory controller to said one system resource, via the data router and via the system resource bus coupled to said one system resource, prior to transmission of said start DMA code from said memory controller to said one system resource, wherein said DMA starting address information specifies a DMA data address to be accessed by said one system resource during said DMA transfer;

storing the DMA data address in the pointer register in said one system resource, after transmission of said DMA starting address information from said memory controller to said one system resource.

14. A process in accordance with claim 13, wherein said one system resource has a count register for indicating the number of bytes of DMA data to be accessed by said one system resource during said DMA transfer, and further comprising:

transmitting DMA count information during a write transaction, from the memory controller to said one system resource, via the data router and via the system resource bus coupled to said one system resource, prior to transmission of said start DMA code from said memory controller to said one system resource, wherein said DMA count information specifies a DMA count of the number of bytes of DMA data to be accessed by said one system resource during said DMA transfer;

storing the DMA count in the count register in said one system resource, after transmission of said DMA count information from said memory controller to said one system resource.

15. A process in accordance with claim 13, wherein said switching logic includes downstream and upstream switching logic, and wherein the process comprises:

configuring the downstream and upstream switching logic in said data router, in response to transmission of said start DMA code, and in accordance with said DMA setup information decoded by said data router;

wherein said upstream switching logic is configured to forward codes, from the first system resource bus to said memory controller, at times when said DMA transfer will involve the first system resource bus;

wherein said upstream switching logic is configured to forward codes, from the second system resource bus to said memory controller, at times when said DMA transfer will involve the second system resource bus;

wherein said upstream switching logic is configured to forward DMA data, from the first system resource bus to said memory controller, at times when said DMA transfer is in the up direction and said DMA transfer will involve the first system resource bus;

wherein said upstream switching logic is configured to forward DMA data, from the second system resource bus to said memory controller, at times when said DMA transfer is in the up direction and said DMA transfer will involve the second system resource bus;

wherein said downstream switching logic is configured to forward DMA data, from said memory controller to the first syterm resource bus, at times when said DMA transfer is in the down direction and said DMA transfer will involve the first system resource bus; and wherein said downstream switching logic is configured to forward DMA data, from said memory controller to the second system resource bus, at times when said DMA transfer is in the down direction and said DMA transfer will involve the second system resource bus.

16. A process for transferring data via DMA between components in a computer system, wherein the computer system includes a first memory controller, a second memory controller, a first system resource bus coupled to a first syterm resource, a second system resource bus coupled to a second system resource, a first data router coupled to the first memory controller, to the first system resource bus, and to the second system resource bus, and a second data router coupled to the second memory controller, to the first system resource bus, and to the second system resource bus, wherein each of the data routers includes switching logic, and wherein the process comprises the following steps:

transmitting DMA setup information designating a setup write transaction, from one of the memory controller to one of the system resources to indicate an upcoming DMA transfer, via the data router coupled to said one memory controller and via the system resource bus coupled to said one system resource, wherein said DMA setup information corresponds to said upcoming DMA transfer, and indicates a direction of the DMA transfer as either an up direction from said one system resource to said one memory controller or a down direction from said one memory controller to said one system resource, and indicates which system resource bus the DMA transfer will involve;

decoding said DMA setup information in the data router coupled to said one memory controller, to determine the direction of said DMA transfer, and to determine which system resource bus said DMA transfer will involve;

transmitting a start DMA code, from said one memory controller to said one system resource, via the data router coupled to said one memory controller and via the system resource bus coupled to said one system resource;

configuring the switching logic in the data router coupled to said one memory controller, in response to transmission of said start DMA code, and in accordance with said DMA setup information decoded by the data router coupled to said one memory controller;

wherein said switching logic in the data router coupled to said one memory controller is configured to forward DMA data, from the first system resource bus to said one memory controller, at times when said DMA transfer is in the up direction and said DMA transfer will involve the first system resource bus;

wherein said switching logic in the data router coupled to said one memory controller is configured to forward DMA data, from the second system resource bus to said one memory controller, at times when said DMA transfer is in the up direction and said DMA transfer will involve the second system resource bus;

wherein said switching logic in the data router coupled to said one memory controller is configured to forward DMA data, from said one memory controller to the first system resource bus, at times when said DMA transfer is in the down direction and said DMA transfer will involve the first system resource bus; and wherein said switching logic in the data router coupled to said one memory controller is configured to forward DMA data, from said one memory controller to the second system resource bus, at times when said DMA transfer is in the down direction and said DMA transfer will involve the second system resource bus;

transmitting an acknowledge code, from said one system resource to said one memory controller, via the system resource bus coupled to said one system resource, and via the switching logic in the data router coupled to said one memory controller, in response to transmission of said start DMA code;

transmitting DMA data, after transmission of said acknowledge code, at times when said DMA transfer is in the up direction, from said one system resource to said one memory controller, via the system resource bus coupled to said one system resource, and via the switching logic in the data router coupled to said one memory controller;

transmitting DMA data, after transmission of said acknowledge code, at times when said DMA transfer is in the down direction, from said one memory controller to said one system resource, via the switching logic in the data router coupled to said one memory controller, and via the system resource bus coupled to said one system resource; and transmitting a done code, after transmission of DMA data, from said one system resource to said one memory controller, via the system resource bus coupled to said one system resource, and via the switching logic in the data router coupled to said one memory controller, to indicate successful DMA data transmission.

17. A process in accordance with claim 16, wherein the first data router is coupled to the second system resource bus via the switching logic in the second data router, and the second data router is coupled to the first system resource bus via the switching logic in the first data router, and wherein the process comprises the following steps:

transmitting the same DMA setup information, from each of the memory controllers to one of the system resources to indicate the upcoming DMA transfer, via the first and second data routers and via the system resource bus coupled to said one system resource;

decoding said DMA setup information in the first and second data routers;

transmitting the start DMA code, from each of said memory controllers to said one system resource, via the first and second data routers and via the system resource bus coupled to said one system resource;

configuring the switching logic in the first and second data routers in accordance with said DMA setup information decoded by the first and second data routers;

wherein said switching logic in the first and second data routers is configured to forward DMA data, from the first system resource bus, via the switching logic in the first data router to the first memory controller, and via the switching logic in the first and second data routers to the second memory controller, at times when said DMA transfer is in the up direction and said DMA transfer will involve the first system resource bus;

wherein said switching logic in the first and second data routers is configured to forward DMA data, from the second system resource bus, via the switching logic in the second data router to the second memory controller, and via the switching logic in the second and first data routers to the first memory controller, at times when said DMA transfer is in the up direction and said DMA transfer will involve the second system resource bus;

wherein said switching logic in the first and second data routers is configured to forward DMA data, from the first memory controller via the switching logic in the first data router, and from the second memory controller via the switching logic in the second and first data routers, to the first system resource bus, at times when said DMA transfer is in the down direction and said DMA transfer will involve the first system resource bus; and wherein said switching logic in the first and second data routers is configured to forward DMA data, from the first memory controller via the switching logic in the first and second data routers, and from the second memory controller via the switching logic in the second data router, to the second system resource bus, at times when said DMA transfer is in the down direction and said DMA transfer will involve the second system resource bus;

transmitting the acknowledge code, from said one system resource to each of said memory controllers, via the system resource bus coupled to said one system resource, and via the switching logic in the first and second data routers;

transmitting the same DMA data, at times when said DMA transfer is in the up direction, from said one system resource to each of said memory controllers, via the system resource bus coupled to said one system resource, and via the switching logic in the first and second data routers;

transmitting the same DMA data, at times when said DMA transfer is in the down direction, from each of said memory controller to said one system resource, via the switching logic in the first and second data routers, and via the system resource bus coupled to said one system resource;

transmitting a done code, from said one system resource to each of said memory controllers, via the system resource bus coupled to said one system resource, and via the switching logic in the first and second data routers.

18. A process in accordance with claim 17 and further comprising:

transmitting an error code, from the switching logic in the first and second data routers, to each of said memory controllers, after transmission of said acknowledge code, to indicate unsuccessful DMA data transmission.

19. A process in accordance with claim 18, and further comprising:

transmitting a stall code, from said one system resource to each of said memory controllers, via the system resource bus coupled to said one system resource, and via the switching logic in the first and second data routers, after transmission of said acknowledge code, to indicate said one system resource is not ready to accept DMA data transmitted in the down direction from each of said memory controllers at times when the DMA transfer is in the down direction and to indicate said one system resource is not ready to send DMA data in the up direction at times when the DMA transfer is in the up direction.

20. A process in accordance with claim 17, and further comprising:

transmitting an error code, from said one system resource to each of said memory controllers, via the system resource bus coupled to said one system resource, and via the switching logic in the first and second data routers, after transmission of DMA data in the up direction, to indicate an error in DMA data transmission.

21. A process in accordance with claim 20, and further comprising:

transmitting a stall code, from said one system resource to each of said memory controllers, via the system resource bus coupled to said one system resource, and via the switching logic in the first and second data routers, after transmission of said acknowledge code, to indicate said one system resource is not ready to send DMA data in the up direction.

22. A process in accordance with claim 20, in which the error code is a CRC error code to indicate a CRC error in DMA data transmission.

23. A process in accordance with claim 22, and further comprising:

transmitting a stall code, from said one system resource to each of said memory controllers, via the system resource bus coupled to said one system resource, and via the switching logic in the first and second data routers, after transmission of said acknowledge code, to indicate said one system resource is not ready to send DMA data in the up direction.

24. A process in accordance with claim 17, and further comprising:

transmitting a stall code, from said one system resource to each of said memory controllers, via the system resource bus coupled to said one system resource, and via the switching logic in the first and second data routers, after transmission of said acknowledge code, to indicate said one system resource is not ready to accept DMA data transmitted in the down direction from each of said memory controllers at times when the DMA transfer is in the down direction and to indicate said one system resource is not ready to send DMA data in the up direction at times when the DMA transfer is in the up direction.

25. A process in accordance with claims 17, 18, 19, 20, 21, or 24, wherein said switching logic in the first and second data routers includes downstream and upstream switching logic, and wherein the process comprises:

configuring the downstream and upstream switching logic in the first and second data routers, in response to transmission of said start DMA code, and in accordance with said DMA setup information decoded by the first and second data routers;

wherein said upstream switching logic in the first and second data routers is configured to forward codes, from the first system resource bus, via the first data router to said first memory controller, and via the first and second data routers to said second memory controller, at times when said DMA transfer will involve the first system resource bus;

wherein said upstream switching logic in the first and second data routers is configured to forward codes, from the second system resource bus, via the second data router to said second memory controller, and via the second and first data routers to said first memory controller, at times when said DMA transfer will involve the second system resource bus;

wherein said upstream switching logic in the first and second data routers is configured to forward DMA data, from the first system resource bus, via the first data router to said first memory controller, and via the first and second data routers to said second memory controller, a times when said DMA transfer is in the up direction and said DMA transfer will involve the first system resource bus;

wherein said upstream switching logic in the first and second data routers is configured to forward DMA data, from the second system resource bus, via the second data router to said second memory controller, and via the second and first data routers to said first memory controller, at times when said DMA transfer is in the up direction and said DMA transfer will involve the second system resource bus;

wherein said downstream switching logic in the first and second data routers is configured to forward DMA data, from said first memory controller via the first data router, and from said second memory controller via the second and first data routers, to the first system resource bus, at times when said DMA transfer is in the down direction and said DMA transfer will involve the first system resource bus; and wherein said downstream switching logic in the first and second data routers is configured to forward DMA data, from said second memory controller via the second data router, and from said first memory controller via the first and second data routers, to the second system resource bus, at times when said DMA transfer is in the down direction and said DMA transfer will involve the second system resource bus.

26. A process in accordance with claims 17, 18, 19, 20, 21, or 24, wherein said one system resource has a count register for indicating the number of bytes of DMA data to be accessed by said one system resource during said DMA transfer, and further comprising:

transmitting DMA count information during a write transaction, from each of said memory controllers to said one system resource, via the first and second data routers and via the system resource bus coupled to said one system resource, prior to transmission of said start DMA code from each of said memory controllers to said one system resource, wherein said DMA count information specifies a DMA count of the number of bytes of DMA data to be accessed by said one system resource during said DMA transfer;

storing the DMA count in the count register in said one system resource, after transmission of said DMA count information from each of said memory controllers to said one system resource.

27. A process in accordance with claim 26, wherein said switching logic in the first and second data routers includes downstream and upstream switching logic, and wherein the process comprises:

configuring the downstream and upstream switching logic in the first and second data routers, in response to transmission of said start DMA code, and in accordance with said DMA setup information decoded by the first and second data routers;

wherein said upstream switching logic in the first and second data routers is configured to forward codes, from the first system resource bus, via the first data router to said first memory controller, and via the first and second data routers to said second memory controller, at times when said DMA transfer will involve the first system resource bus;

wherein said upstream switching logic in the first and second data routers is configured to forward codes, from the second system resource bus, via the second data router to said second memory controller, and via the second and first data routers to said first memory controller, at times when said DMA transfer will involve the second system resource bus;

wherein said upstream switching logic in the first and second data routers is configured to forward DMA data, from the first system resource bus, via the first data router to said first memory controller, and via the first and second data routers to said second memory controller, at times when said DMA transfer is in the up direction and said DMA transfer will involve the first system resource bus;

wherein said upstream switching logic in the first and second data routers is configured to forward DMA data, from the second system resource bus, via the second data router to said second memory controller, and via the second and first data routers to said first memory controller, at times when said DMA transfer is in the up direction and said DMA transfer will involve the second system resource bus;

wherein said downstream switching logic in the first and second data routers is configured to forward DMA data, from said first memory controller via the first data router, and from said second memory controller via the second and first data routers, to the first system resource bus, at times when said DMA transfer is in the down direction and said DMA transfer will involve the first system resource bus; and wherein said downstream switching logic in the first and second data routers is configured to forward DMA data, from said second memory controller via the second data router, and from said first memory controller via the first and second data routers, to the second system resource bus, at times when said DMA transfer is in the down direction and said DMA transfer will involve the second system resource bus.

28. A process in accordance with claims 17, 18, 19, 20, 21, or 24, wherein said one system resource has a pointer register for indicating a DMA data address to be accessed by said one system resource, and further comprising:

transmitting DMA starting address information during a write transaction, from each of said memory controllers to said one system resource, via the first and second data routers and via the system resource bus coupled to said one system resource, prior to transmission of said start DMA code from each of said memory controllers to said one system resource, wherein said DMA starting address information specifies a DMA data address to be accessed by said one system resource during said DMA transfer;

storing the DMA data address in the pointer register in said one system resource, after transmission of said DMA starting address information from each of said memory controllers to said one system resource.

29. A process in accordance with claim 28, wherein said one system resource has a count register for indicating the number of bytes of DMA data to be accessed by said one system resource during said DMA transfer, and further comprising:

transmitting DMA count information during a write transaction, from each of said memory controllers to said one system resource, via the first and second data routers and via the system resource bus coupled to said one system resource, prior to transmission of said start DMA code from each of said memory controllers to said one system resource, wherein said DMA count information specifies a DMA count of the number of bytes of DMA data to be accessed by said one system resource during said DMA transfer;

storing the DMA count in the count register in said one system resource, after transmission of said DMA count information from each of said memory controllers to said one system resource.

30. A process in accordance with claim 28, wherein said switching logic in the first and second data routers includes downstream and upstream switching logic, and wherein the process comprises:

configuring the downstream and upstream switching logic in the first and second data routers, in response to transmission of said start DMA code, and in accordance with said DMA setup information decoded by the first and second data routers;

wherein said upstream switching logic in the first and second data routers is configured to forward codes, from the first system resource bus, via the first data router to said first memory controller, and via the first and second data routers to said second memory controller, at times when said DMA transfer will involve the first system resource bus;

wherein said upstream switching logic in the first and second data routers is configured to forward codes, from the second system resource bus, via the second data router to said second memory controller, and via the second and first data routers to said first memory controller, at times when said DMA transfer will involve the second system resource bus;

wherein said upstream switching logic in the first and second data routers is configured to forward DMA data, from the first system resource bus, via the first data router to said first memory controller, and via the first and second data routers to said second memory controller, at times when said DMA transfer is in the up direction and said DMA transfer will involve the first system resource bus;

wherein said upstream switching logic in the first and second data routers is configured to forward DMA data, from the second system resource bus, via the second data router to said second memory controller, and via the second and first data routers to said first memory controller, at times when said DMA transfer is in the up direction and said DMA transfer will involve the second system resource bus;

wherein said downstream switching logic in the first and second data routers is configured to forward DMA data, from said first memory controller via the first data router, and from said second memory controller via the second and first data routers, to the first system resource bus, at times when said DMA transfer is in the down direction and said DMA transfer will involve the first system resource bus; and wherein said downstream switching logic in the first and second data routers is configured to forward DMA data, from said second memory controller via the second data router, and from said first memory controller via the first and second data routers, to the second system resource bus, at times when said DMA transfer is in the down direction and said DMA transfer will involve the second system resource bus.

31. A process for transferring data via DMA between components in a computer system, wherein the computer system includes a first primary memory controller, a first mirror memory controller, a second primary memory controller, a second mirror memory controller, a first primary system resource bus and a first mirror system resource bus coupled to a first system resource, a second primary system resource bus and a first mirror system resource bus coupled to a second system resource, a first primary data router coupled to the first primary memory controller and to the first primary system resource bus, a first mirror data router coupled to the first mirror memory controller and to the first mirror system resource bus, a second primary data router coupled to the second primary memory controller and to the second primary system resource bus, a second mirror data router coupled to the second mirror memory controller and to the second mirror system resource bus, wherein each of the data routers includes switching logic for coupling the memory controllers to the system resource buses, wherein the first data routers are coupled to the second system resource buses via the switching logic in the second data routers, and the second data routers are coupled to the first system resource buses via the switching logic in the first data routers, and wherein the process comprises the following steps:

transmitting the same DMA setup information designating a setup write transaction, from each of the memory controllers to one of the system resources to indicate an upcoming DMA transfer, via the first and second data routers and via the pair of system resource buses coupled to said one system resource, wherein said DMA setup information corresponds to said upcoming DMA transfer, and indicates a direction of the DMA transfer as either an up direction from said one system resource to said memory controllers or a down direction from said memory controllers to said one system resource, and indicates which pair of system resource buses the DMA transfer will involve;

decoding said DMA setup information in the first and second data routers, to determine the direction of said DMA transfer, and to determine which pair of system resource buses said DMA transfer will involve;

transmitting a start DMA code, from each of said memory controllers to said one system resource, via the first and second data routers, and via the pair of system resource buses coupled to said one system resource;

configuring the switching logic in the first and second data routers, in response to transmission of said start DMA code, and in accordance with said DMA setup information decoded by the first and second data routers;

wherein said switching logic in the pairs of first and second data routers is configured to forward DMA data, from the pair of first system resource buses, via the switching logic in the pair of first data routers to the pair of first memory controllers, and via the switching logic in the pairs of first and second data routers to the pair of second memory controllers, at times when said DMA transfer is in the up direction and said DMA transfer will involve the pair of first system resource buses;

wherein said switching logic in the pairs of first and second data routers is configured to forward DMA data, from the pair of second system resource buses, via the switching logic in the pair of second data routers to the pair of second memory controllers, and via the switching logic in the pairs of second and first data routers to the pair of first memory controllers, at times when said DMA transfer is in the up direction and said DMA transfer will involve the pair of second system resource buses;

wherein said switching logic in the pairs of first and second data routers is configured to forward DMA data, from one of the first memory controllers via the switching logic in one of the first data routers, and from one of the second memory controllers via the switching logic in one of the second data routers and the other first data router, to the pair of first system resource buses, at times when said DMA transfer is in the down direction and said DMA transfer will involve the pair of first system resource buses; and wherein said switching logic in the pairs of first and second data routers is configured to forward DMA data, from one of the first memory controllers via the switching logic in one of the first data routers and one of the second data routers, and from one of the second memory controllers via the switching logic in the other second data router, to the pair of second system resource buses, at times when said DMA transfer is in the down direction and said DMA transfer will involve the pair of second system resource buses;

transmitting an acknowledge code, from said one system resource to each of said memory controllers, via the pair of system resource buses coupled to said one system resource, and via the switching logic in the first and second data routers, in response to transmission of said start DMA code;

transmitting the same DMA data, after transmission of said acknowledge code, at times when said DMA transfer is in the up direction, from said one system resource to each of said memory controllers, via the pair of system resource buses coupled to said one system resource, and via the switching logic in the first and second data routers;

transmitting the same DMA data, after transmission of said acknowledge code, at times when said DMA transfer is in the down direction, from one of the first memory controllers and from one of the second memory controllers to said one system resource, via the switching logic in the first and second data routers, and via the pair of system resource buses coupled to said one system resource; and transmitting a done code, after transmission of DMA data, from said one system resource to each of said memory controllers, via the pair of system resource buses coupled to said one system resource, and via the switching logic in the first and second data routers, to indicate successful DMA data transmission.

* * * * *